(12) United States Patent
Bishop et al.

(10) Patent No.: US 9,160,136 B1
(45) Date of Patent: Oct. 13, 2015

(54) EXTERNAL DIFFUSION AMPLIFIER

(71) Applicant: LEE LASER, INC., Orlando, FL (US)

(72) Inventors: Donald Bishop, Orlando, FL (US);
Dwight Kimberlin, Orlando, FL (US)

(73) Assignee: LEE LASER, INC., Orlando, FL (US)

( * ) Notice: Subject to any disclaimer, the term of this patent is extended or adjusted under 35 U.S.C. 154(b) by 0 days.

(21) Appl. No.: 14/292,546

(22) Filed: May 30, 2014

(51) Int. Cl.
*H01S 3/00* (2006.01)
*H01S 3/23* (2006.01)
*H01S 3/0941* (2006.01)

(52) U.S. Cl.
CPC ............ *H01S 3/2333* (2013.01); *H01S 3/0941* (2013.01)

(58) Field of Classification Search
CPC .... H01S 3/2308; H01S 3/2333; H01S 3/0941
USPC ......................................... 359/333, 347, 348
See application file for complete search history.

(56) References Cited

U.S. PATENT DOCUMENTS

| | | | |
|---|---|---|---|
| 5,237,576 A | 8/1993 | DiGiovanni et al. | |
| 5,271,031 A | 12/1993 | Baer | |
| 5,321,711 A | 6/1994 | Rapoport et al. | |
| 5,341,389 A | 8/1994 | Payne et al. | |
| 5,441,803 A | 8/1995 | Meissner | |
| 5,497,392 A | 3/1996 | Sawicki et al. | |
| 5,563,899 A | 10/1996 | Meissner et al. | |
| 5,846,638 A | 12/1998 | Meissner | |
| 5,852,622 A | 12/1998 | Meissner et al. | |
| 5,936,984 A | 8/1999 | Meissner et al. | |
| 6,836,357 B2 | 12/2004 | Wang et al. | |
| 7,203,214 B2 | 4/2007 | Butterworth | |
| 7,286,587 B2 | 10/2007 | Budni | |
| 7,376,296 B2 | 5/2008 | Goncharov et al. | |
| 7,408,971 B2 | 8/2008 | Zhang et al. | |
| 7,539,224 B2 | 5/2009 | Rothenberg | |
| 7,590,160 B2 | 9/2009 | Manni | |
| 7,720,121 B2 | 5/2010 | Peng et al. | |
| 7,796,671 B2 * | 9/2010 | Peng et al. | ...................... 372/92 |
| 7,813,389 B2 | 10/2010 | Peng et al. | |
| 7,813,394 B2 | 10/2010 | Peng et al. | |

(Continued)

OTHER PUBLICATIONS

Ralf Wilhelm, Maik Frede, and Dietmar Kracht, Power Scaling of End-Pumped Solid-State Rod Lasers by Longitudinal Dopant Concentration Gradients, IEE Journal of Quantum Electronics, vol. 44, No. 3, Mar. 2008, pp. 232-244.

(Continued)

*Primary Examiner* — Mark Hellner
(74) *Attorney, Agent, or Firm* — Woodling, Krost and Rust

(57) ABSTRACT

A first amplification structure uses a single pass external diffusion amplifier wherein the picosecond beam cross-sectional area is matched to the cross-sectional area of the gain medium. A half waveplate between the gain medium and the incoming beam optimizes the polarization of the beam diameter to the polarization of the gain medium. A second amplification structure uses a double pass external diffusion amplifier wherein the beam cross-sectional area is matched to the cross-sectional area of the gain medium and passed twice therethrough. A half waveplate and a rotator create a right circular polarized beam through the gain medium and a maximum "R" coated reflector resides beyond the external diffusion amplifier and reflects a left circular polarized beam back through the gain medium, the rotator and the half waveplate where it becomes horizontally polarized and is then transmitted out of the amplification structure by the polarization sensitive beam splitter.

48 Claims, 27 Drawing Sheets

(56) References Cited

U.S. PATENT DOCUMENTS

| | | | |
|---|---|---|---|
| 7,817,686 | B2 | 10/2010 | Peng et al. |
| 7,869,481 | B2 | 1/2011 | Vigroux et al. |
| 7,961,771 | B2 | 6/2011 | Manni |
| 8,089,689 | B1 | 1/2012 | Savage-Leuchs |
| 2002/0097769 | A1 | 7/2002 | Vetrovec |
| 2005/0201442 | A1 | 9/2005 | Luo et al. |
| 2006/0239304 | A1 | 10/2006 | Yin et al. |
| 2007/0236781 | A1 | 10/2007 | Fidric |
| 2008/0013586 | A1 | 1/2008 | Spence et al. |
| 2008/0187019 | A1 | 8/2008 | Chung |
| 2009/0097512 | A1 | 4/2009 | Clowes et al. |
| 2009/0245301 | A1 | 10/2009 | Peng et al. |
| 2009/0245304 | A1* | 10/2009 | Peng et al. .......... 372/29.02 |
| 2010/0118899 | A1 | 5/2010 | Peng et al. |
| 2010/0189145 | A1 | 7/2010 | Peng et al. |
| 2010/0272129 | A1 | 10/2010 | Harter et al. |
| 2011/0007760 | A1 | 1/2011 | Clowes et al. |
| 2011/0013652 | A1 | 1/2011 | Knight et al. |
| 2011/0243163 | A1 | 10/2011 | Peng et al. |
| 2011/0267671 | A1 | 11/2011 | Peng et al. |
| 2011/0298156 | A1 | 12/2011 | Hooper et al. |
| 2014/0056321 | A1 | 2/2014 | Peng |

OTHER PUBLICATIONS

Xiaoyuan Peng, Lei Xu, and Anand Asundi, Power Scaling of Diode-Pumped ND:YVO4 Lasers, IEEE Journal of Quantum Electronics, vol. 38, No. 9, Sep. 2002, pp. 1291-1299.

Schaffer et al., Laser Induced Breakdown and Damage in Bulk Transparent Materials Induced by Tightly-Focused Femtosecond Laser Pulses, pp. 1-42, Harvard University, Department of Physics and Division of Engineering and Applied Sciences, Cambridge, MA.

Wei et al., Laser-Induced Damage of Multilayer Oxide Coatings at 248 NM, Journal of the Korean Physical Society, Apr. 2011, pp. 1021-1025, vol. 58, No. 4, Key Laboratory of Materials for High Power Laser, Shanghai Institute of Optics and Fine Mechanics, Chinese Acadamy of Sciences, Shanghai, China.

Lee Laser, LFP-50T Preliminary, High Power Micromachining Picosecond Laser, Orlando, Florida.

Natoli et al., Laser-Induced Damage of Materials in Bulk, Thin-Film, and Liquid Forms, Applied Optics, Jun. 1, 2002, pp. 3156-3166, vol. 41, No. 16, Optical Society of America.

Northrop Gruman, Synoptics, Neodymium: Yttrium Aluminum Garnet-ND: YAG, 2011.

Huang et al., Comparative Study Between Conventional and Diffusion-Bonded ND-Doped Vanadate Crystals in the Passively Mode-Locked Operation, Optics Express, Apr. 26, 2010 pp. 9518-9524, vol. 18, No. 9.

Lee Laser, Model LFP-20T, 1064NM Picosecond Laser (Preliminary), pp. 1-3.

Dorman et al., Unique Fiber-Based Laser Technology Delivers High Pulse Energy and Average Power, Picosecond Micromachining Update, www.LASER-JOURNAL.DE, Sep. 2008, NR. 4, pp. 1-4, Wiley-VCH Verlag GmbH & Co. KGAA, Weinheim.

Coherent, Thermal Considerations in Design of Water-Cooled DPSS Laser Systems, p. 1-6, www.COHERENT.com.

* cited by examiner

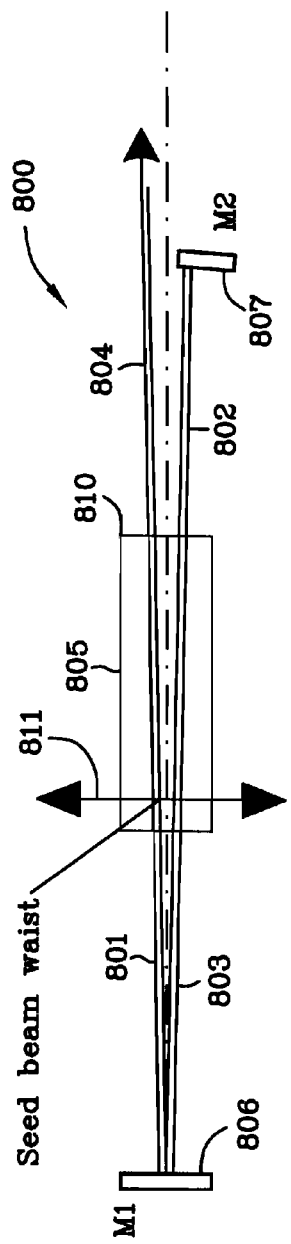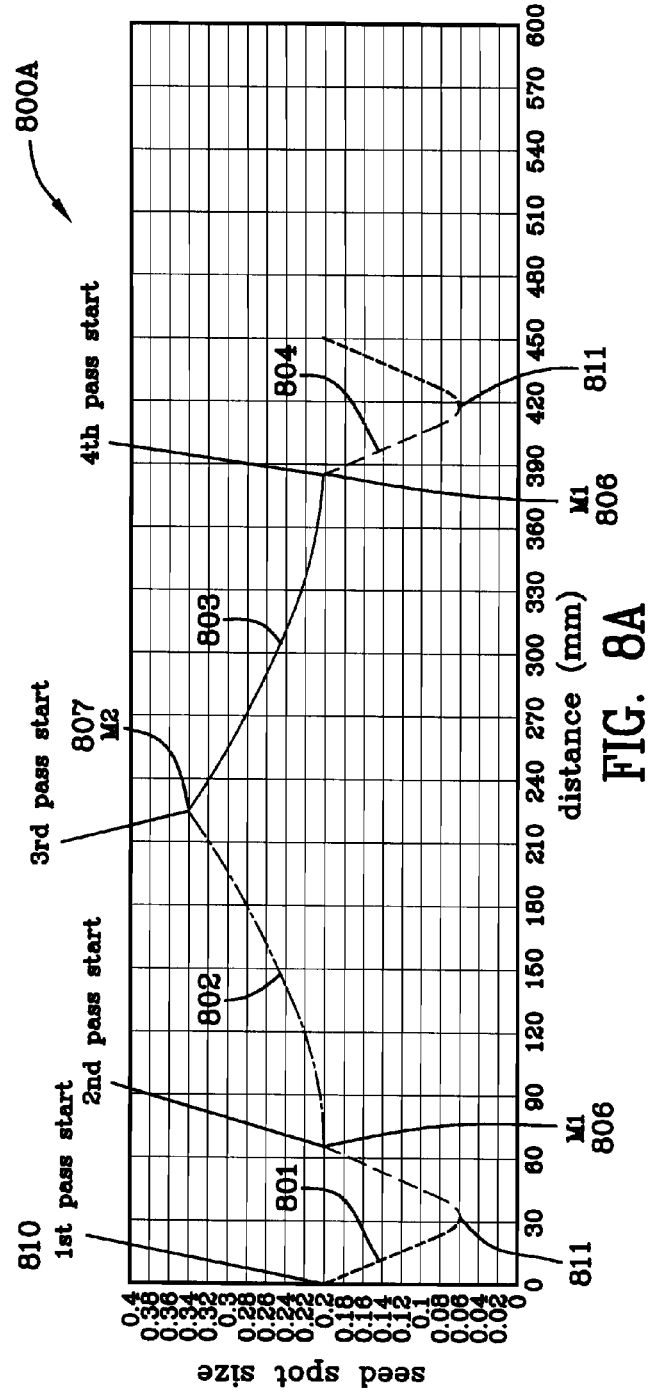
FIG. 8
FIG. 8A

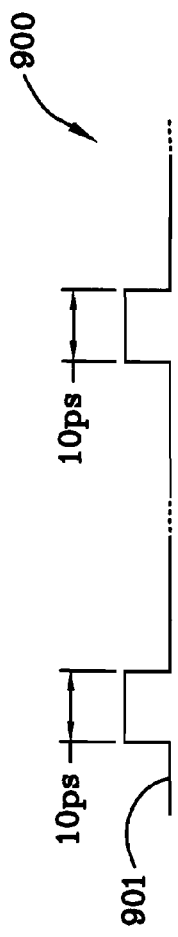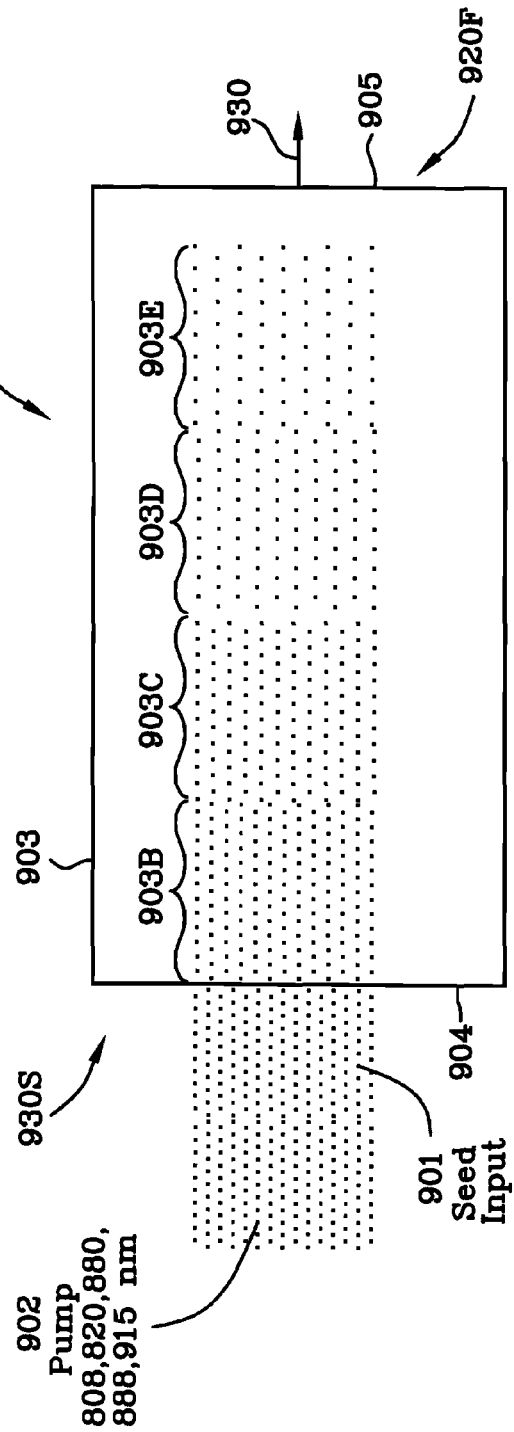
FIG. 9
FIG. 9A

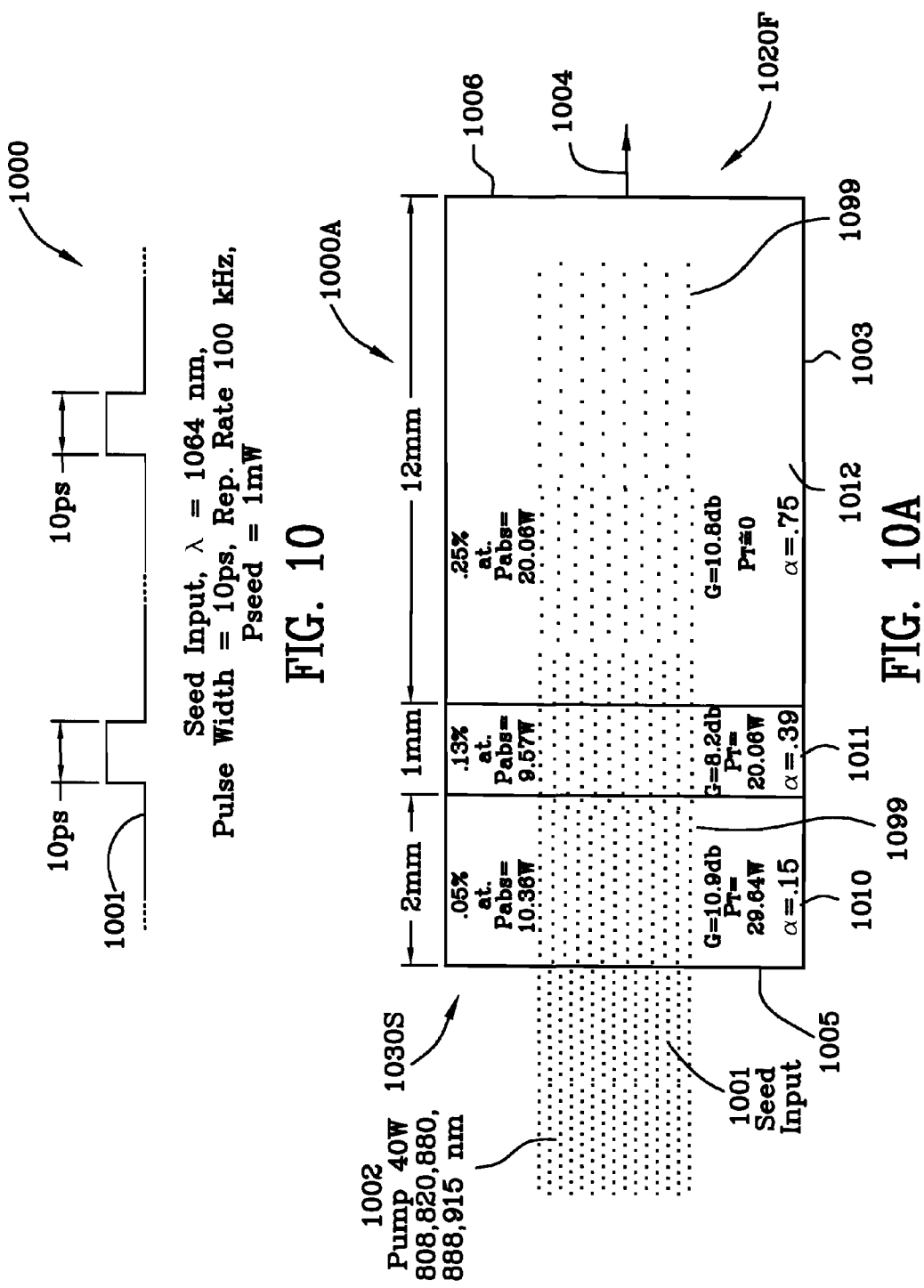

| Dopant Concentration (C%, at.) | Length (L) | Alpha ($\alpha$) | Pabs per segment |
|---|---|---|---|
| 0.05% | 2 | 0.15 | 10.36727 |
| 0.13% | 1 | 0.39 | 9.569686 |
| 0.25% | 12 | 0.75 | 20.06057 |

1000B

Pabs = Pinput $(1-e^{-\alpha L})$

Pinput = Ppump−($\Sigma$Pabs)

Ppump = 40 watts

Alpha = 3C

FIG. 10B

EXTERNAL DIFFUSION AMPLIFIER

FIELD OF THE INVENTION

The invention is in the field of an external diffusion amplifier for the further amplification of a master oscillator power amplifier (MOPA) configuration.

BACKGROUND OF THE INVENTION

U.S. Pat. No. 7,720,121 to Peng et al. states in the Abstract thereof: "High-power, diode-pumped solid state (DPSS) pulsed lasers are preferred for applications such as micromachining, via drilling of integrated circuits, and ultraviolet (UV) conversion. Nd:YVO 4 (vanadate) lasers are good candidates for high power applications because they feature a high energy absorption coefficient over a wide bandwidth of pumping wavelengths. However, vanadate has poor thermomechanical properties, in that the material is stiff and fractures easily when thermally stressed. By optimizing laser parameters and selecting pumping wavelengths and doping a concentration of the gain medium to control the absorption coefficient less than 2 cm-1 such as the pumping wavelength between about 910 nm and about 920 nm, a doped vanadate laser may be enhanced to produce as much as 100 W of output power without fracturing the crystal material, while delivering a 40% reduction in thermal lensing."

U.S. Pat. No. 7,203,214A to Butterworth discloses a "laser comprising: a laser resonator including a gain element of Nd:YV04 having a length of at least 5 mm, said gain element being end-pumped and wherein the pump-light has a wavelength selected to be different from the peak absorption wavelength of the gain element and falling between about 814 and 825 nanometers in order to reduce thermal stresses and breakage of the gain element, such that the pump source can be operated to deliver greater than 22 Watts of power to the gain medium."

The publication entitled, Power Scaling of Diode-Pumped Nd:YVO$_4$ Lasers, IEEE JOURNAL OF QUANTUM ELECTRONICS, VOL. 38, NO. 9, SEPTEMBER 2002, Xiaoyuan Peng, Lei Xu, and Anand Asundi, is incorporated herein by reference hereto in its entirety. This article includes information about Nd doping concentrations and it also includes information about the size of the cross-sectional areas of the gain mediums insofar as their ability to handle pump power levels.

Slabs and rods have been made using diffusion bonded techniques for some time. The primary use in Vanadate is to bond undoped end caps to a high gain doped section to reduce thermal lens effects and increase damage threshold. See www.ulticrystal.com and U.S. Pat. No. 5,936,984, issued Aug. 10, 1999 to Meissner et al. Vanadate can only be grown in lengths up to about 30 mm. Most are used as individual components for end pumped gain assemblies Oscillator or amplifier. This essentially requires mode matching between the pump source and propagating beam.

U.S. Pat. No. 5,936,984, issued Aug. 10, 1999 to Meissner et al. states: "A common problem with lasers in general, and with solid state lasers in particular, is the temperature rise in the laserable medium. This effect is the result of only a percentage of the applied pump energy being converted into useful laser radiation while at least a portion of the remaining energy is transferred into competing mechanisms such as radiationless transitions and absorption by the host lattice. To counteract the thermal effects generated by the pump radiation, typically the laserable medium must be cooled.

Cooling the entire laserable medium of a solid state laser presents a difficult problem. First, the cooling fixture should allow as much of the laserable medium to be cooled as possible. Typically some portion of the laserable medium must reside outside of the cooling fixture in order to create a leak-free joint between the fixture and the medium. Second, the cooling fixture should not interfere with the delivery of pump radiation to the laserable medium. Lastly, even if the entire length of the laserable medium is cooled, the optical coatings on the uncooled end surfaces are not cooled and are therefore subject to degradation due to temperature effects, an effect which is aggravated by the high power density of the incident pump radiation.

Some of the effects noted above which result from non-uniform cooling are further exacerbated in end-pumped laser systems. In this type of laser a lens duct is preferably used to homogenize, focus, and concentrate the radiation from the pump source into the laser rod. The end of the laser rod which is coupled to the lens duct is uncooled. Unfortunately, given the high intensity pump radiation passing through the end face of the laser rod and assuming that the laser rod is doped throughout with lasing ions, the ends of the laser rod can experience a substantial rise in temperature during lasing. This rise in temperature can negatively impact the performance of the laser by accelerating the degradation in the optical coatings, increasing the ground state re-absorption losses in quasi-three-level lasers, and eventually leading to the catastrophic failure of the laser due to thermally induced stress fractures."

Undoped end caps on a short gain medium rod can reduce thermal effects by removing some of the heat from the end faces of the doped part and into the undoped end caps. This reduces the temperature of the gain medium and it also reduces the tendency for thermal fracture of the gain medium.

Picosecond laser design typically utilizes end pumped technology with various amplifier strategies to develop the required gain characteristics. The issue with mode matching is potential heating damage to coatings and bulk rod materials especially as you increase average power and pulse energy. The area of concern is always the last stage where maximum gain and pulse energy occurs. Typical requirements for a relayed beam are spot sizes <0.5 mm in diameter. This leads to potential surface coating and bulk material damage. Obviously, the diameter of the mode matched beam through the gain regions can be increased but this is at the expense of performance.

Typically laser damage consists of point defects in the materials or coatings, inclusions, poor surface preparation or just a lack of cleanliness. Otherwise damage of the coatings or the bulk materials is caused by exceeding the heating damage thresholds of the coatings or bulk materials in the laser.

High power ultrafast technology (picosecond technology) has been developed using a variety of technologies. Typically an ultrafast seed of low power is amplified through a number of stages. A combination of fiber and solid state techniques is employed with methods including cavity dumping and regenerative amplifiers, as examples. Commercially available products are typically limited to pulse energy of 2000 which produces average maximum power of 40 W at a typical repetition rate of 200 kHz.

Typically the exit of the power amplifier of the multistage picosecond is the weak link. End pump amplifiers are mode matched though this region to maximize efficiency. The issue is potential damage to the coatings on surfaces of various optic devices which relay spot dements having diameters in the range of 0.3 mm and 0.6 mm diameter. Further, the issue is also damage to bulk devices.

SUMMARY OF THE INVENTION

A master oscillator power amplifier (MOPA) laser is disclosed.

The amplifier is an optical amplifier having an input signal in the form of a seed laser which generates an output signal with higher optical power. The amplification occurs in a gain medium which is provided with energy from an external source. The gain medium is "pumped" or "energized" from an outside source of energy. Typically, the outside source of energy is light. The pump may be an optical pump or other suitable energy source. The pump may be a diode pumped light source.

The seed laser may include an oscillator, a length of optical fiber (or free space cavity), one or two mirrors, Q-switches with and/or without reflective coatings, and optics. The seed laser preferably operates at a wavelength of 1064 nm (1064 nanometers) but other wavelengths are specifically contemplated. Q-switches may be electro-optic modulators or acousto-optic modulators. Both types of Q-switches are controlled and driven by an electronic driver. For a mode-locked laser with a high repetition rate which gives fairly high pulse energy, a pulse picker is needed to lower the repetition. If an electro-optic pulse picker is used, it may employ a Pockels cell and polarizing optics. The pockels cell manipulates the polarization state and a polarizer then transmits or blocks the pulse depending on its polarization.

If an acousto-optic pulse picker is used, short RF pulses are applied to the acousto-optic modulator deflecting the desired pulse in a slightly modified direction for use while other non-deflected pulses are blocked. An acousto-optic modulator (AOM) may be used for controlling power, frequency or spatial direction of a laser beam with an electrical drive signal. AOM's are based on an acousto-optic effect which modifies the refractive index of a crystal by the application of an oscillating mechanical pressure of a sound wave. As the refractive index is modified, the direction of the desired pulses is changed and then the deflected pulses are useable.

The length of the optical fiber can be varied to change the effective cavity dimensions. The seed laser such as a mode-locked laser produces a pulsed output having pulses with a pulse width of approximately 5-30 picoseconds at a repetition rate of between 10 kHz and 100 MHz. It is specifically contemplated that other pulse widths be used. Specifically, it is contemplated that a range of pulse widths are producible as disclosed herein, namely, pulse widths between 15 milliseconds and 15 femtoseconds may be created having the desired characteristics as disclosed herein. For long pulse widths such as a pulse width of 15 milliseconds, appropriate reduction of the repetition rate is necessary and achievable. The repetition rate can be less than 10 Hz up to 100 MHz. The seed laser includes a first polarization which is subsequently converted to a polarization which matches the polarization of the $Nd:YVO_4$ gain medium. The pulses of the pulsed output of the seed laser are amplified by the $Nd:YVO_4$ gain medium which is optically pumped by an optical pump. A highly reflective mirror is used to control the number of times (passes) that the pulses of the pulsed output of the seed laser make through the generally rectangularly shaped, in cross-section, $Nd:YVO_4$ gain medium. The $Nd:YVO_4$ gain medium may be square in cross-section, or it may be circular in cross-section, or it may be some other shape in cross-section. The first end of gain medium is a planar wedge surface oriented at wedge angle, θ1.

The $Nd:YVO_4$ gain medium includes a first end and a second end. The gain medium may be in the range of 5-30 mm long and may have a cross-section that is between 1 $mm^2$ and 36 $mm^2$. A 5-30 mm crystal is long enough to absorb 99% of a 40 W pump power at 808 nm with a sufficiently and permissibly high Nd doping concentration. Longer crystals are preferable for heat removal. Alternatively, an $Nd:YVO_4$ gain medium having a cross-sectional configuration other than rectangular may be used. For instance, a circular, in cross-section, $Nd:YVO_4$ gain medium may be used. Circular $Nd:YVO_4$ gain mediums with low absorption coefficients having small diameters and long lengths dissipate heat well and protect the crystal against fracture. Nd:YVO4 gain mediums in the shape of a rod may be used.

The Nd concentration at each segment is not limited to be arranged from low to high with the lowest concentration proximate the optical pump. The length of each segment determines absorption length, which coordinates the Nd concentration for the gain.

Other pump wavelengths may be used, for instance, the pump central wavelengths may be at 808 nm, 820 nm, 880 nm, 888 nm or 915 nm, +/−10 nm. The pump may be an end pump or one or more side pumps. If more than one side pump is used, then the side pumps may have different power output levels. Different power output levels may be applied to each segment of the segmented gain medium as desired with each segment being Nd doped as desired. The pump(s) may be a diode pump light source or other suitable light source. Use of pumps other than optical pumps are contemplated as disclosed herein.

The $Nd:YVO_4$ gain medium of the amplifier includes a second polarization. Polarization converting means for matching the first polarization of the seed laser with the second polarization of the $Nd:YVO_4$ gain medium of the amplifier resides between the output lens of the seed laser and the input wedge surface of the first end of the $Nd:YVO_4$ gain medium of the amplifier.

The second end of the $Nd:YVO_4$ gain medium of the amplifier includes a second end surface proximate the diode pump light source operating at 808 nm. More specifically, a 40 Watt diode pump light source (end pump) operates at 808 nm and resides proximate the second end of the $Nd:YVO_4$ gain medium. Other diode pump wattages are contemplated between 30-60 Watts.

The first end of the $Nd:YVO_4$ gain medium includes a wedge surface coated with an anti-reflective coating. The pulses of the pulsed output of the seed laser enter the anti-reflective coating on the wedge surface of $Nd:YVO_4$ gain medium at an incident angle, θ2, along a first exterior path. The incident angle, θ2, is measured with respect to a line which is perpendicular to the wedge surface of the $Nd:YVO_4$ gain medium. It will be noticed that the wedge surface is a planar surface and that it is formed at a wedge angle, θ1. Wedge angle, θ1, is measured with respect to a vertical plane cut through one point of the wedge surface. It will be further noticed that the input seed laser enters the wedge surface at an angle, θ6, with respect to a line parallel to the center line of the gain medium. θ6=θ2−θ1. The wedge angle, θ1, is designed between 3-10° and is preferred to be in the range of 5-7°. θ2, the incident angle of the seed laser is less than or equal to 15°. The angle, θ2, is also the refracted angle of the fourth pass of the pulses in the quad pass example as will be described further hereinbelow. A wedge angle, θ1, of 5-7° yields a preferable reflective angle, θ3, of approximately 0.78°.

Refractive angle θ2' is the angle of refraction made by the seed laser coming into the wedge surface on the first pass. Refractive angle θ2' is measured with respect to a line perpendicular to the wedge surface.

The seed laser is reflected at an internal reflective angle, θ3, within $Nd:YVO_4$ gain medium. The internal reflective angle, θ3, is defined with respect to the centerline of the Nd:YVO$_4$ gain medium. As stated previously, the preferred refractive angle, θ3, is approximately 0.78°. It is desired to minimize the reflective angle, θ3, of the seed laser within the gain medium such that the pulses of the seed laser remain relatively centered with respect to the centerline of the axis through the gain medium so as to effectively transfer as much energy as possible to the laser as it passes through the gain medium. The energy of the pulses from the seed laser is increased as the pulses pass through the gain medium. Additionally, the preferred reflective angle, θ3=0.78°, has to be large enough to ensure separation of the seed laser input into the wedge surface of the gain medium from the seed laser output from the gain medium.

The internal reflective angle, θ3=0.78°, yields a shift with respect to the axis of the gain medium of approximately 0.27 mm for a gain medium that is approximately 20 mm in length. Additionally, if the gain medium is approximately 10 mm in length, then the internal reflective angle, θ3=0.78°, yields a shift with respect to the axis of the gain medium of approximately 0.135 mm.

The seed laser is refracted on the first pass through and within the Nd:YVO$_4$ gain medium along the first path at an angle θ2' as it travels toward the second end surface of the Nd:YVO$_4$ gain medium. The second end surface of the Nd:YVO$_4$ gain medium proximate the pump includes a second coating highly reflective to the seed laser at the 1064 nm wavelength and the second coating is highly transparent to light from the end pump at 808 nm wavelength.

The seed laser is reflected at the internal reflective angle, θ3, by the highly reflective second coating on the second surface of the Nd:YVO$_4$ gain medium and causes the 1064 nm wavelength laser pulses to travel on a second pass through and within the Nd:YVO$_4$ gain medium toward the wedge surface of the Nd:YVO$_4$ gain medium. The path of the seed laser approaches the wedge surface at an incident angle, θ4. The laser pulses exit the wedge surface of the Nd:YVO$_4$ gain medium at a refraction angle, θ5 along a second exterior path. The refraction angle, θ5, and the incident angle, θ4, are measured with respect to a line normal (perpendicular) to the first end of said Nd:YVO$_4$ gain medium.

A pulsed laser having a pulse width of 10 picoseconds plus/minus 5 picoseconds at repetition rates between 10 kHz and 100 MHz is disclosed herein. Pulse energy of 100 µJ at more than 100 kHz produces an average power of 10 J/5 or more than 10 W. The output power is also a function of the input seed laser average power which may range between sub-mW (for example less than one Watt) and multi-watts. With high input seed laser average powers, average output powers which far exceed 10 W can be produced.

Another example includes a segmented gain medium wherein each segment of the gain medium includes a different Nd dopant concentration. The segments of the gain medium may be arranged as desired in regard to doping concentrations. For instance, the segment with the lowest Nd concentration may be adjacent the pump light source. Next, the segment with the next lowest Nd concentration may be adjacent the segment with the lowest Nd concentration. Finally, the third segment with the highest Nd concentration may be last in line. The segments can be arranged in any order of Nd concentration. The Nd concentration of one or more segments may be zero.

Multiple passes of the seed laser pulses through the end pumped gain medium achieves a very high gain. Side pumping the gain medium with one or more optical pumps is disclosed and claimed. The gain medium comprises three diffusion bonded segments having different lengths and dopant concentrations resulting in different gains and distributions. Alternatively, instead of diffusion bonding, the segments may be secured together by using anti-reflective coating between the segments. Scaling the doping percentage by a factor of 3 yields an α=0.15 where α is the absorption coefficient. The absorption efficiency is:

$$\eta = (1-e^{-\alpha L}).$$

It would appear, therefore, without any further knowledge of Nd:YVO$_4$ crystals that an increase in efficiency would be accomplished by using a longer crystal and/or by an increase in the absorption coefficient. However, the absorption coefficient, α, does not, alone, indicate that there are thermal lensing effects and physical limits to coefficient α and applied power. As power applied to the Nd:YVO$_4$ crystal increases, then the concentration of the Nd doping is reduced and the cross section of the crystal (whether rectangular, circular or other shaped cross-section) is then reduced. Lower doping concentration enables use of higher pump power. The publication entitled, Power Scaling of Diode-Pumped Nd:YVO$_4$ Lasers, IEEE JOURNAL OF QUANTUM ELECTRONICS, VOL. 38, NO. 9, SEPTEMBER 2002, Xiaoyuan Peng, Lei Xu, and Anand Asundi, is incorporated herein by reference hereto in its entirety. This article includes information about Nd doping concentrations and it also includes information about cross-sectional areas insofar as their ability to handle power levels.

Pabs per segment is given by the following equation:

$$P\text{abs} = P\text{input}(1-e^{-\alpha L})$$

Power available/transmitted to subsequent segment is given by the following equation.

$$P\text{input} = P\text{pump} - (\Sigma P\text{abs})$$

Applying this system of scaling the pump power by absorbing pump power in segments allows usage of higher pump power and higher energy transfer to the Nd:YVO$_4$ crystal. Higher energy transfer to the Nd:YVO$_4$ crystal results in higher gain of the seed laser as it travels within the gain medium.

Using segments with gradually increased doping concentrations prevents fracturing of the segments. Segment cross-sectional area is reduced and Nd dopant concentration is reduced if it is desired to use a high power optical end pump. Scaling the cross-sectional area down and lowering the Nd dopant concentration enables use of high power pumps which enables large energy/power to the Nd:YVO$_4$ crystal which, in turn, allows energy to be transferred to the pulses of the pulsed output of the seed laser. If the power applied to each segment is calculated and is kept within acceptable limits for its cross sectional area and for the dopant concentration then fracturing of the crystal is prevented.

Each segment can also be treated as one stage of the amplifier with a certain gain. Multiplied gain is provided by multiple stages of amplification, so optimized design of the gain for each segment can be expected to achieve the highest extraction efficiency from a given pump power.

An external diffusion amplifier further amplifies the master oscillator power amplifier (MOPA) configuration. The master power amplifier (MOPA) includes a seed laser and an amplifier which increases the power output of the seed laser to do useful work. An external diffusion amplifier adds additional energy (amplifies energy and power) to the picosecond pulses of the previously amplified pulses.

In the external diffusion amplifier successive gain mediums are diffusion bonded together into a cylindrically shaped rod and a laser is generated using optical side pumps. The diameter of the already amplified beam is matched, or nearly matched, to the rod diameter of the external diffusion amplifier. For example, instead of using a mode matched 0.5 mm beam in the end pump strategy, the beam size is increased to the cross-sectional area of the rod. The diameter of the rod, for example, may be in the range of 2-4 mm which has a cross-sectional area of $\pi mm^2$-4 $\pi mm^2$. The power density in the rod of the external diffusion amplifier is extremely low allowing generation of high power and energy with a short pulse laser, without compromising any coatings or any bulk material of the external diffusion amplifier.

The invention discloses operation of the laser down to a repetition rate of 100 kHz and 20 W (200 uJ pulses) before external diffusion amplification. Operation of the laser over a wide range of repetitions rates is disclosed. In other words, the picosecond laser operates at lower power and the gain mediums of the quad pass amplifiers of the internal amplifier that are end pumped are not thermally stressed at the lower power level thus protecting the coatings on the gain mediums and on other optic components of the laser amplifier. The protection provided by the external diffusion amplifier protects all of the components upstream starting with the seed laser.

By expanding the beam (using positioning/spacing of the beam and/or a lens) and using a half waveplate to optimize the polarization of the beam to the polarization of the circular rod of the external amplifier, 20 W average power output can be taken from the internal amplifier (quad pass amplifiers) and, in a single pass, 50 W average power at a repetition rate of 100 kHz is generated in the external diffusion amplifier with pulse energy of 5000. In other words, with a single pass 70 W average power is attained.

Pulse energy of 500 µJ is obtained without concern of over running the seed laser or damaging the optics by relaying small spot sizes with short pulses. The invention further provides double pass external diffusion amplification which generates average power of 100 W at a repetition rate of 100 kHz. In other words, with a double pass 120 W average power is attained.

Pulse energies greater than or equal to 1000 uJ are contemplated.

A four stage diffusion bonded rod with laser diode side pumps is used. Unlike most end pumped mode matched strategies this allows us to increase the beam size through the external diffusion amplifier to generate higher power, especially at low frequency. This allows higher pulse energies than normal strategies without compromising the coating damage threshold or bulk material threshold.

By incorporating an external side pumped amplifier comprising a diffusion bonded Vanadate rod, the dimensions of the propagating beam can be adjusted to the rod cross sectional area. This significantly reduces the power density on the coatings and allows much higher average power and pulse energy capability. For instance, repetition rates of less than 100 kHz and pulse energies greater than or equal to 5000 produce average power of 50 W.

The cylindrically shaped rods of the external diffusion amplifier are either single or double passed. The cylindrically shaped rods of the external diffusion amplifier can be constructed of various diameters and lengths to obtain the optimum gain increase and minimize damage through high power generation at low frequency. The rods can be constructed of both diffusion bonded and solid rod material of a variety of gain mediums $Nd:YVO_4$, Nd:YAG, $Nd:Al_2O_3$, or Yb:YAG to obtain very high energy and average power at low frequency without risking bulk material or coating damage and maximizing pulse characteristics.

A first method of amplification uses a single pass external diffusion amplifier. The external diffusion amplifier is positioned to match the picosecond beam to the dimensions of the gain medium chosen from one of the gain mediums $Nd:YVO_4$, Nd:YAG, $Nd:Al_2O_3$. In addition to positioning the gain mediums, a lens may be used to adjust the propagating beam to match the dimensions (cross-sectional area) of the gain medium. The gain medium is preferably cylindrically shaped, for instance, a cylindrically shaped rod. Other gain medium shapes can be used. A half-wave plate is positioned between the cylindrically shaped rod gain medium of the external diffusion amplifier and the incoming laser. The incoming laser is from the internal amplifier and the quad pass amplifiers therein. The half waveplate is rotated to optimize the polarity of the beam to the polarity of the rod. Additionally, the single pass external diffusion amplifiers can be arranged in series. In other words, a second single pass external diffusion amplifier is positioned in series with the first single pass amplifier. Optionally, a second half waveplate may be used before the second single pass external diffusion amplifier.

A second method of amplfication uses a double pass external diffusion amplifier. The external diffusion amplifier is positioned to match the picosecond beam to the dimensions of the gain medium which is in the form of a rod. The gain medium is chosen from one of the gain mediums $Nd:YVO_4$, Nd:YAG, $Nd:Al_2O_3$. The beam is passed twice through the gain medium of the external diffusion amplifier. A half waveplate ($\lambda/2$) is positioned between the rotator ($\lambda/4$) and a polarization sensitive beam splitter. The polarization sensitive beam splitter is positioned between the half waveplate ($\lambda/2$) and the incoming laser. The half waveplate ($\lambda/2$) and the rotator ($\lambda/4$) create a right circular polarized beam through the external diffusion amplifier. A maximum "R" coated reflector resides beyond the external diffusion amplifier (i.e., the laser head) and reflects a left circular polarized beam which passes through the external diffusion amplifier (i.e., the laser head), the rotator ($\lambda/4$) and the half waveplate ($\lambda/2$) where it becomes horizontally polarized. The polarization sensitive beam splitter transmits the horizontally polarized beam out of the device.

A first amplification structure uses a single pass external diffusion amplifier wherein the picosecond beam cross-sectional area is matched to the cross-sectional area of the gain medium. A half waveplate between the gain medium and the incoming beam optimizes the gain through the gain medium. A second amplification structure uses a double pass external diffusion amplifier wherein the beam cross-sectional area is matched to the cross-sectional area of the gain medium and passed twice therethrough. A half waveplate and rotator create a right circular polarized beam through the gain medium and a maximum "R" coated reflector resides beyond the external diffusion amplifier and reflects a left circular polarized beam back through the gain medium, the rotator and the half waveplate where it becomes horizontally polarized and is then transmitted out of the amplification structure by the polarization sensitive beam splitter.

It is an object of the invention to provide a laser having a high gain medium.

It is an object to provide a laser which transfers large amounts of power to the $Nd:YVO_4$ gain medium.

It is an object to provide a laser having a high gain medium comprised of segments having appropriate concentrations of Nd dopant and appropriate cross sectional areas to enable large amounts of power to be absorbed by the $Nd:YVO_4$ gain medium.

It is an object to provide a laser having a high extraction efficiency from pump-to-laser even with a fairly low (small) seed signal.

It is an object to provide a laser having a high gain medium comprised of a wedge surface on one end thereof to prevent self lasing.

It is an object to provide a laser having a high gain medium comprised of a wedge surface on one end thereof to provide sufficient separation of the incoming and outgoing pulses.

It is an object to provide a laser having a high gain medium having multiple passes therethrough to increase the gain of the seed laser output.

It is an object to provide a laser having a segmented high gain medium having multiple passes therethrough to increase the gain of the seed laser output.

It is an object to provide a laser having a high gain medium which includes a wedge surface and wherein the incident angle of the incoming pulses of the pulsed output of the seed laser impinge on the wedge surface such that they are refracted at an angle on a first interior path within the high gain medium so as to reside within the pump spot size as they travel within the gain medium thus maximizing energy transfer to the pulses.

It is an object to maintain the seed laser within the pump spot size in the gain medium.

It is an object of the invention to provide an external diffusion amplifier having successive solid state gain mediums diffusion bonded together into a rod and a more powerful laser is generated using optical side pumps.

It is an object of the invention to provide an external diffusion amplifier having a solid state gain medium in the form of a cylindrically shaped rod.

It is an object of the invention to provide a high power picosecond laser generated using optical side pumps in an external diffusion amplifier.

It is an object of the invention to provide side pumps of the external diffusion amplifier wherein the side pumps are laser diodes or lamps.

It is an object of the invention to provide an external diffusion amplifier wherein the propagating beam size cross-sectional area is matched to the cross-sectional area of the rod.

It is an object of the invention to provide an external amplifier which provides high gain without damaging coatings applied to the rod of the external diffusion amplifier.

It is an object of the invention to provide an external diffusion amplifier which provides high gain without damaging the bulk material of rod of the external diffusion amplifier.

It is an object of the invention to provide an external diffusion amplifier which amplifies the average power output and high pulse energy at low frequency for improved control and resolution of the laser output.

It is an object of the invention to provide a rod of an external diffusion amplifier which comprises several diffusion bonded segments and which has a diameter of 2 mm-4 mm.

It is an object of the invention to provide a rod for the external diffusion amplifier which comprises several diffusion bonded segments and which has a cross-sectional area of 3.14 mm$^2$-12.56 mm$^2$.

It is an object of the invention to provide any suitable rod of any suitable cross-section for use as a gain medium of the external diffusion amplifier.

It is an object of the invention to provide a rod for the external diffusion amplifier made of any one of the following gain mediums: Nd:YVO$_4$, Nd:YAG, Nd:Al$_2$O$_3$ or Yb:YAG.

These and other objects will be understood better when reference is made to the drawings and the description hereinbelow.

BRIEF DESCRIPTION OF THE DRAWINGS

FIG. 8 is a schematic of the use of a quadruple pass amplifier including a gain medium, a first mirror, and a second mirror.

FIG. 8A is a graph of the spot size as a function of distance of travel for the schematic of FIG. 8 indicating the first pass, the second pass, the third pass, the fourth pass and the location of the mirror and the second mirror.

FIG. 9 is a schematic presentation of the seed laser at a wavelength of 1064 nm and repetition rate of 100 kHz.

FIG. 9A is a schematic presentation of an optical pump and the seed laser pulsed output residing proximate the second end of the gain medium.

FIG. 10 is a schematic presentation of the seed laser at a wavelength of 1064 nm, repetition rate of 100 kHz.

FIG. 10A is a schematic presentation of an optical pump and the seed laser residing proximate the second end of the gain medium wherein the gain medium comprises three diffusion bonded segments having different lengths and dopant concentrations resulting in different gains and pump power absorption.

FIG. 10B is a chart of the dopant concentration, C % at., segment length, alpha (scaled dopant concentration) and Pabs (absorbed power) per segment.

DESCRIPTION OF THE INVENTION

Figure 1:
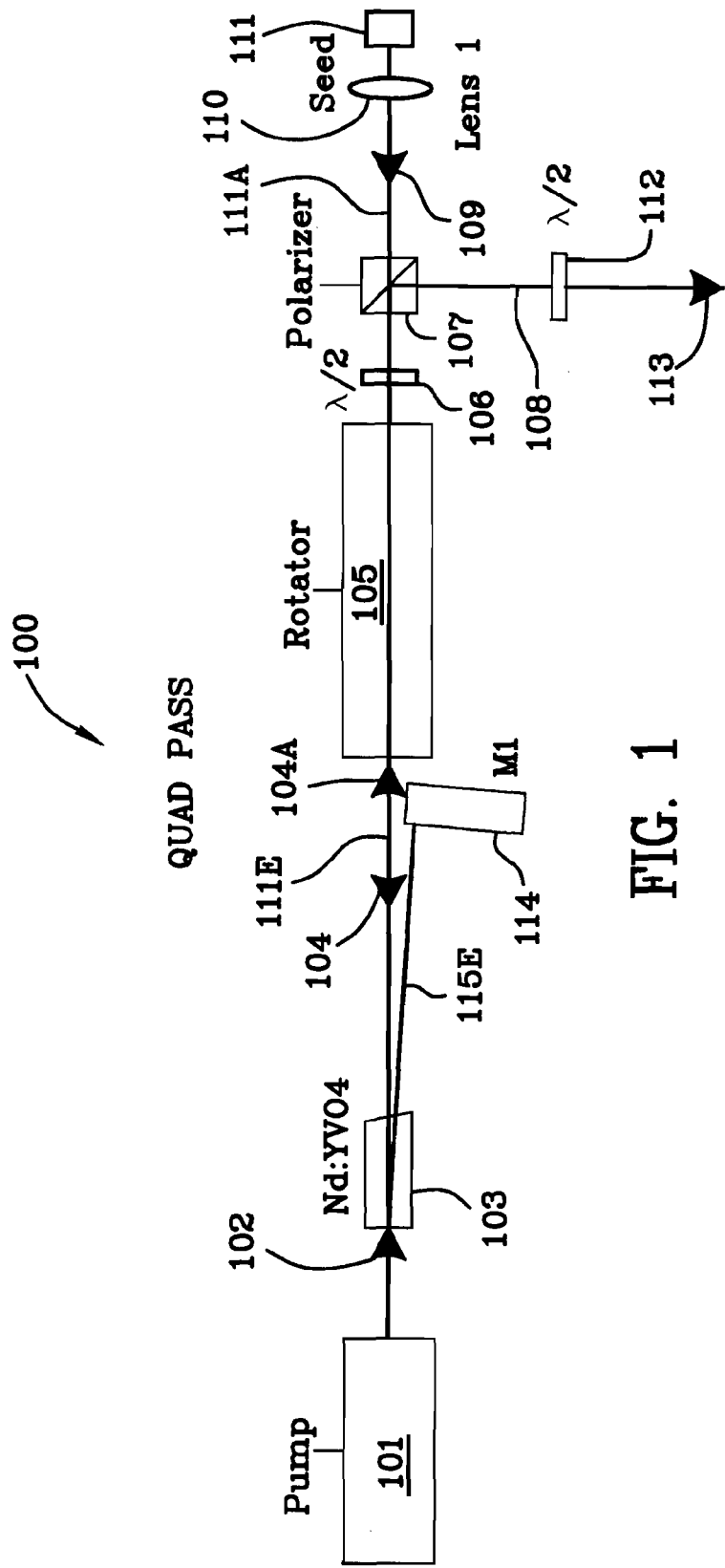
FIG. 1 is a schematic of a laser including a seed laser input, a polarizer, two half wavelength plates, a rotator and a quadruple pass (quad pass) Nd:YVO$_4$ gain medium, wherein a first amplifier includes an optical end pump, the quadruple pass (quad pass) Nd:YVO$_4$ gain medium, and a highly reflective mirror.

FIG. 1 is a schematic 100 of a seed laser 111, seed lens 110, a polarizer 107, two half wavelength plates 106, 112, a rotator 105 and a quadruple pass (quad pass) Nd:YVO$_4$ gain medium 103, wherein the amplifier includes an optical end pump 101, the gain medium 103, and a highly reflective mirror 114. The seed laser spot size is substantially determined by the selection of the lens 110. Determination of the laser spot size in the gain medium required is based on desired gain. The gain volume within the Nd:YVO$_4$ gain medium 103 is dependent on the spot size of the optical end pump and doping concentration of Nd. It is desirable to use an appropriately sized spot size of the seed laser and an appropriately sized spot size of the optical end pump.

Optical end pump 101 is preferably a diode end pump. Gain medium 103 has a wedge shaped end surface 103A coated with an anti-reflective coating. Wedge end surface 103A is on the first end of the gain medium 103. Second end surface 101C of the gain medium is flat and coated with a highly transparent (transmissive) coating at a wavelength of 808 nm and the coating is highly reflective at a wavelength of 1064 nm.

Seed laser 111 produces a pulsed output 111A having pulses with a pulse width of approximately 10 picoseconds, plus or minus 5 picoseconds, at a repetition rate of between 10 kHz and 100 MHz and at a wavelength of 1064 nm. The pulses comprise light having a wavelength of 1064 nm. As the pulses come into and through the gain medium 103 they impinge on the second end surface 101C and are reflected by the highly reflective coating thereon.

Referring to FIG. 1, Nd:YVO$_4$ gain medium 103 is end pumped by laser diodes operating at a wavelength of 808 nm. Other pump wavelengths may be used, for instance, the pump central wavelengths may be at 808 nm, 820 nm, 880 nm, 888 nm or 915 nm, +/−10 nm. The pump may be an end pump or one or more side pumps. See FIGS. 1C, 1D and 1E. The pump may be a diode pump light source or other suitable light source. Arrow 102 indicates the flow of power into the gain medium. Gain medium 103 crystal is AR-coated (anti-reflective coated) for the wavelength of 1064 nm on the wedged surface 103A. Second end surface 101C of the gain medium 103 is HR-coated (highly reflective coated) for wavelengths of 1064 nm and is HT-coated (highly transmissive) at 808 nm on the pump surface. A highly transmissive coating is used for pumping at the other wavelengths, namely, 820 nm, 880 nm, 888 nm and 915 nm. This means that surface 101C reflects the amplified seed laser 104 coming out rotator 105. A polarized seed laser at the wavelength of 1064 nm passes through polarizer 107, half-lambda wave plate 106, and a rotator 105 to the gain medium 103. Reference numerals 104/104A indicate bidirectional flow of the pulses/lasers at different times.

Still referring to FIG. 1, the seed laser travels four (4) times within gain medium 103. The amplified laser output 104A is separated by the polarizer 107 which shifts the polarization by 90° with respect to the polarization of the output pulses of the seed laser 111A.

Gain medium 103 can be circular, rectangular, square or other shape in cross-section. The gain medium may be any shape in cross-section. If the cross-sectional shape is rectangular, the sides of the rectangle are generally equal in length making the cross-section a square. Each side of the rectangle is between 1-6 mm and the length of the gain medium is between 5-30 mm. Generally rectangularly shaped gain mediums are used. Cylindrically shaped, in cross-section, rods may be used and heat transfer from rods of small diameter is good.

Figure 1A:
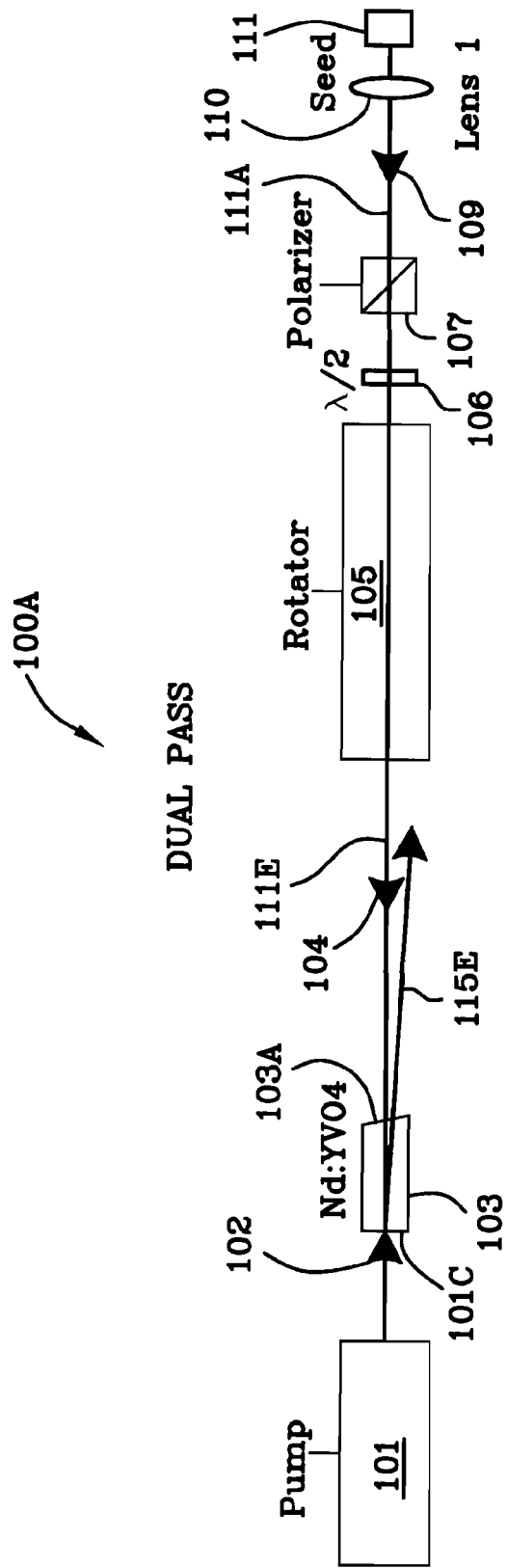
FIG. 1A is a schematic of a laser including a seed laser input, a polarizer, two half wavelength plates, a rotator and a double pass (dual pass) Nd:YVO$_4$ gain medium, wherein a second amplifier includes an optical end pump, the double pass (dual pass) Nd:YVO$_4$ gain medium, and a highly reflective mirror.
Figure 1B:
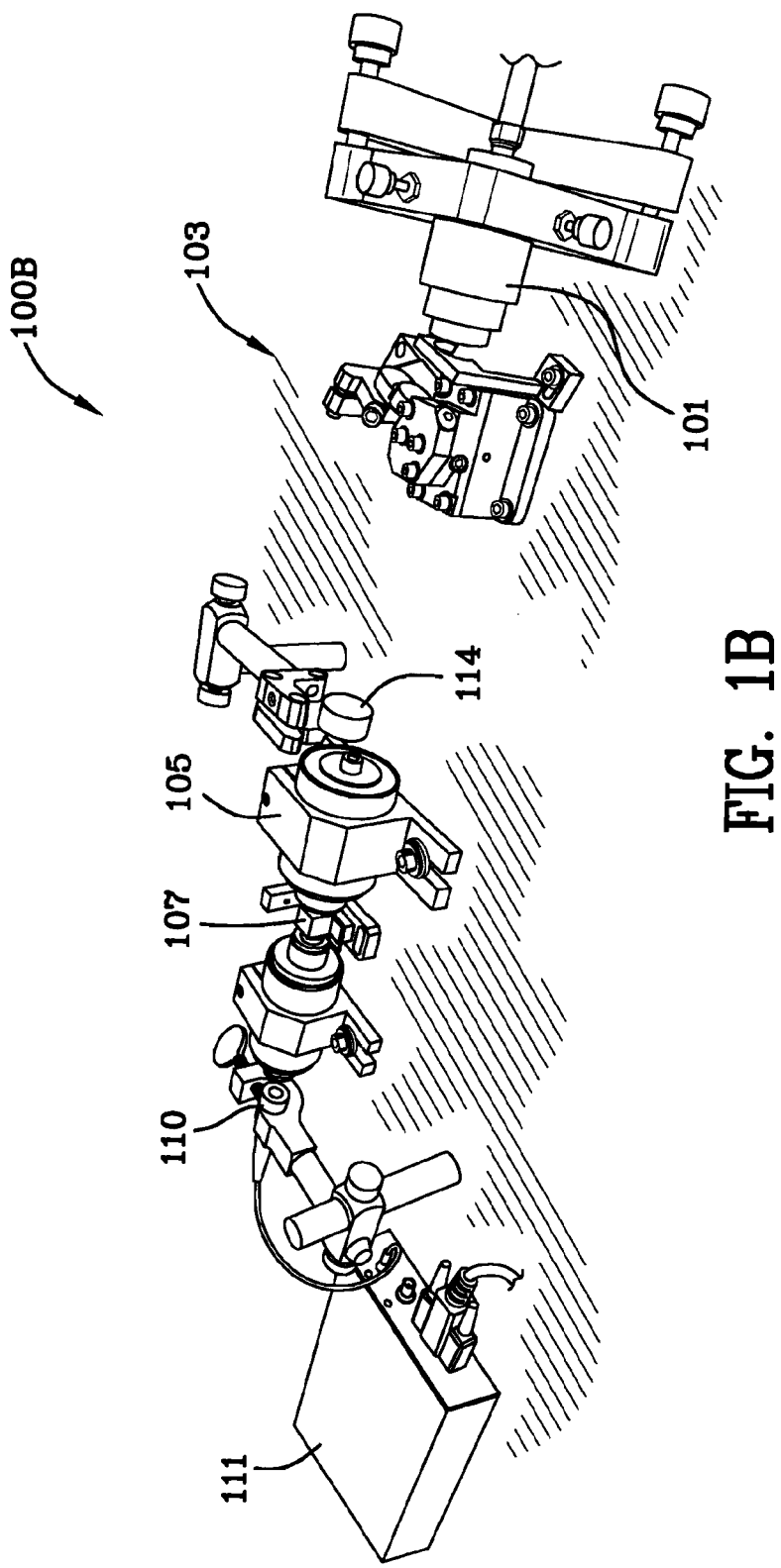
FIG. 1B is a perspective view of the schematic of FIG. 1.

Still referring to FIG. 1, seed laser 111 emits pulses along path 111A into and through polarizer 107, half wave plate 106, and rotator 105 wherein the polarization is converted to the polarization of the gain medium 103. FIG. 1A is a schematic 100A of the example of a dual pass amplifier which is created by the removal of mirror M1. FIG. 1B is a perspective view 100B of the schematic of FIG. 1 illustrating the seed laser 111, the lens 110, polarizer 107, rotator, gain medium 103 housed within a cooling chamber, and an optical pump 101.

Figure 1C:
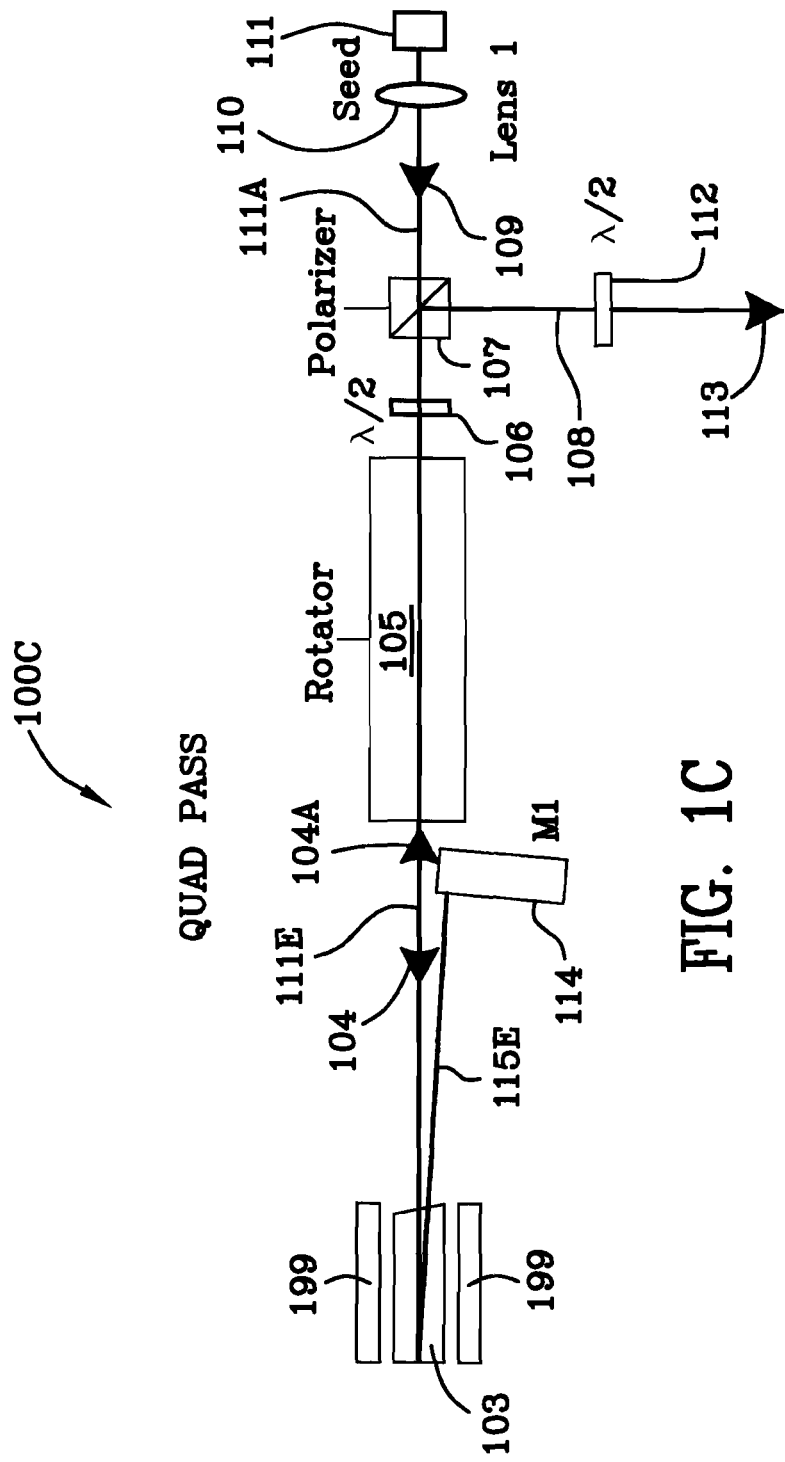
FIG. 1C is a schematic view of a laser including an optically side pumped Nd:YVO$_4$ gain medium.
Figure 1D:
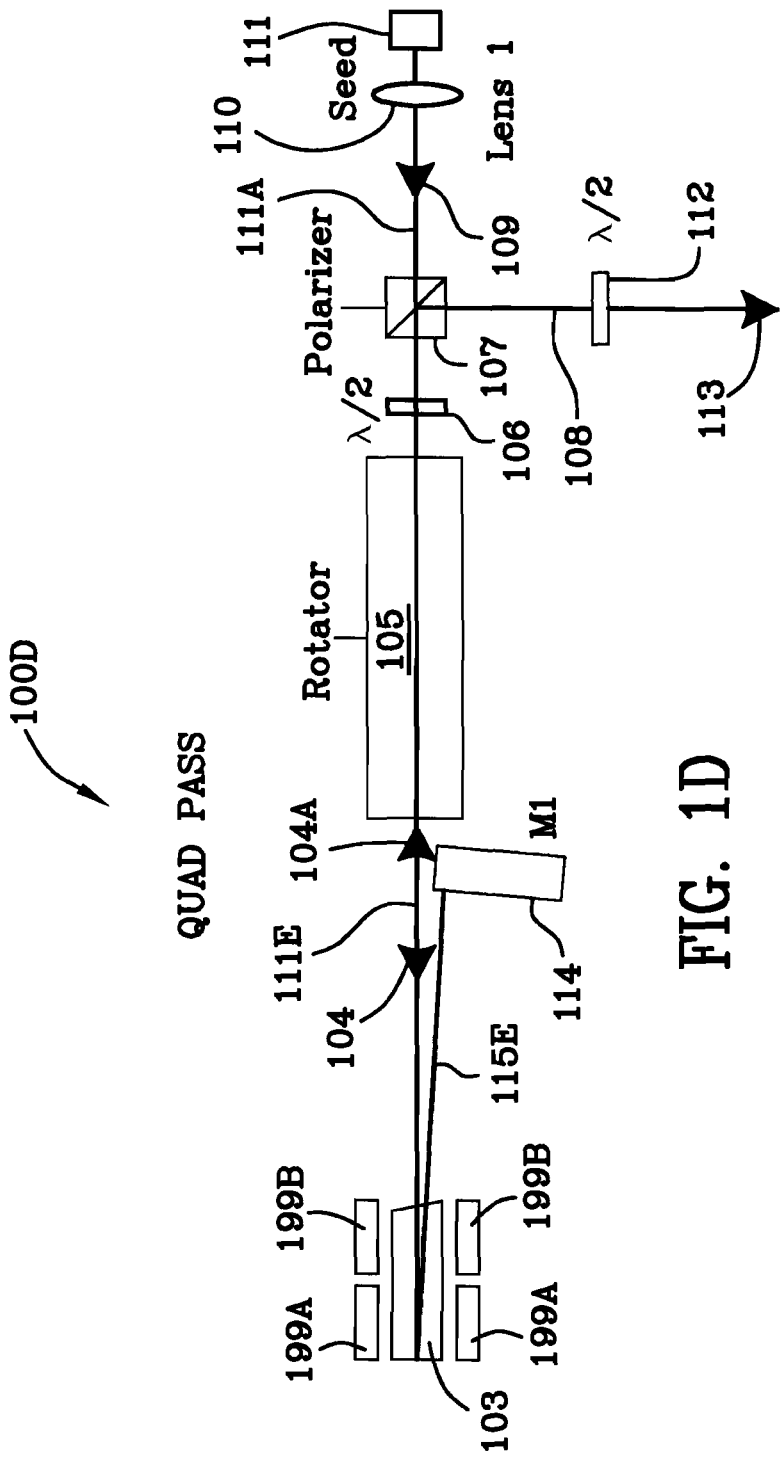
FIG. 1D is a schematic view of another example of a laser including an optically side pumped Nd:YVO$_4$ gain medium.
Figure 1E:
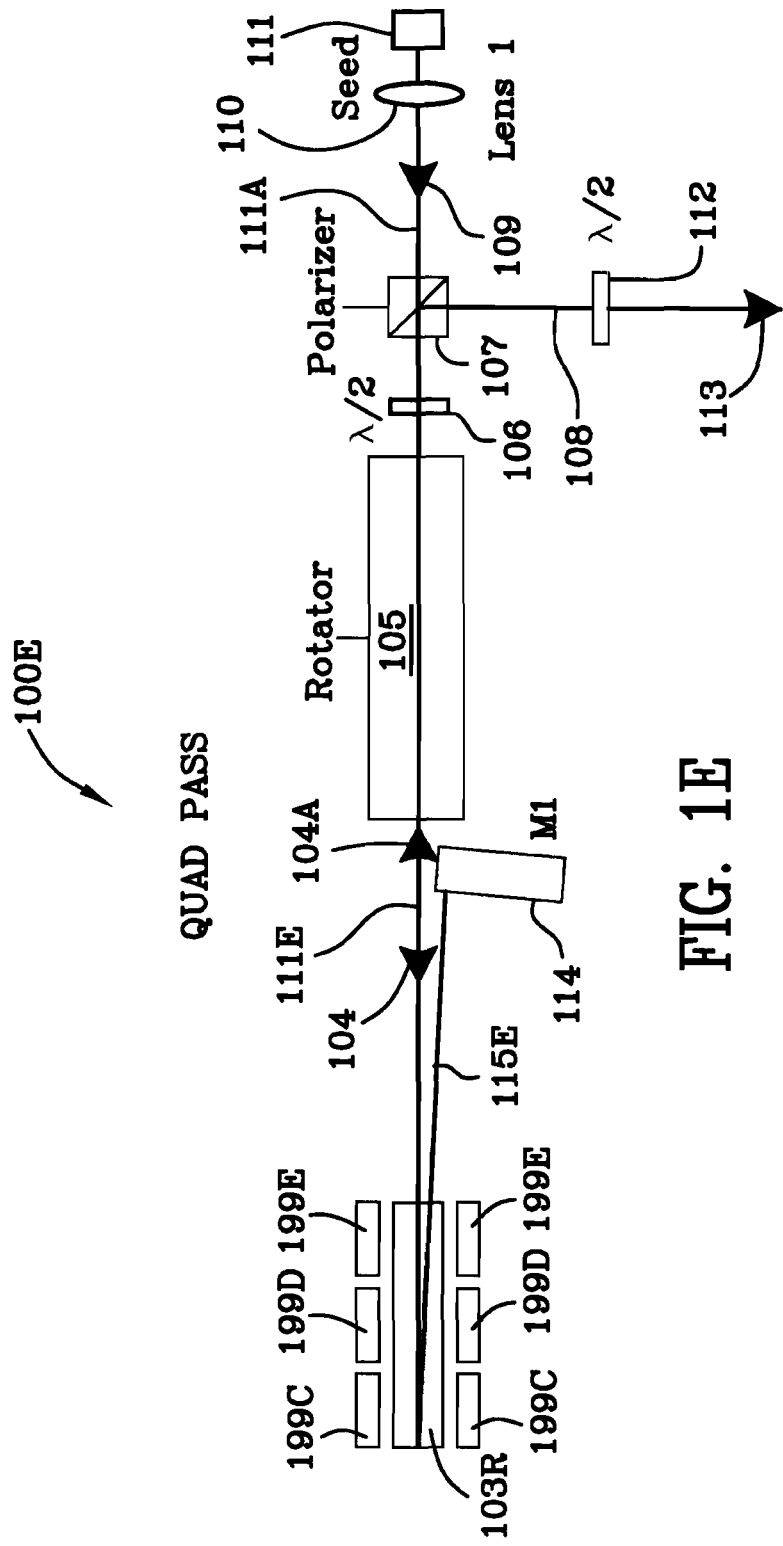
FIG. 1E is a schematic view of another example of a laser including an optically side pumped Nd:YVO$_4$ gain medium.

FIG. 1C is a schematic view 100C of a laser including an optically side pumped Nd:YVO$_4$ gain medium 103. Side pump 199 is illustrated surrounding, as desired, partially or completely, the gain medium 103. FIG. 1D is a schematic view 100D of another example of a laser including an optically side pumped Nd:YVO$_4$ gain medium 103 having first optical side pump 199A and second optical side pump 199B surrounding, as desired, partially or completely, the gain medium 103. FIG. 1E is a schematic view 100E of another example of a laser including an optically side pumped Nd:YVO$_4$ gain medium 103R having three optical side pumps, 199C, 199D, and 199E surrounding, as desired, partially or completely, the gain medium 103R.

Figure 2:
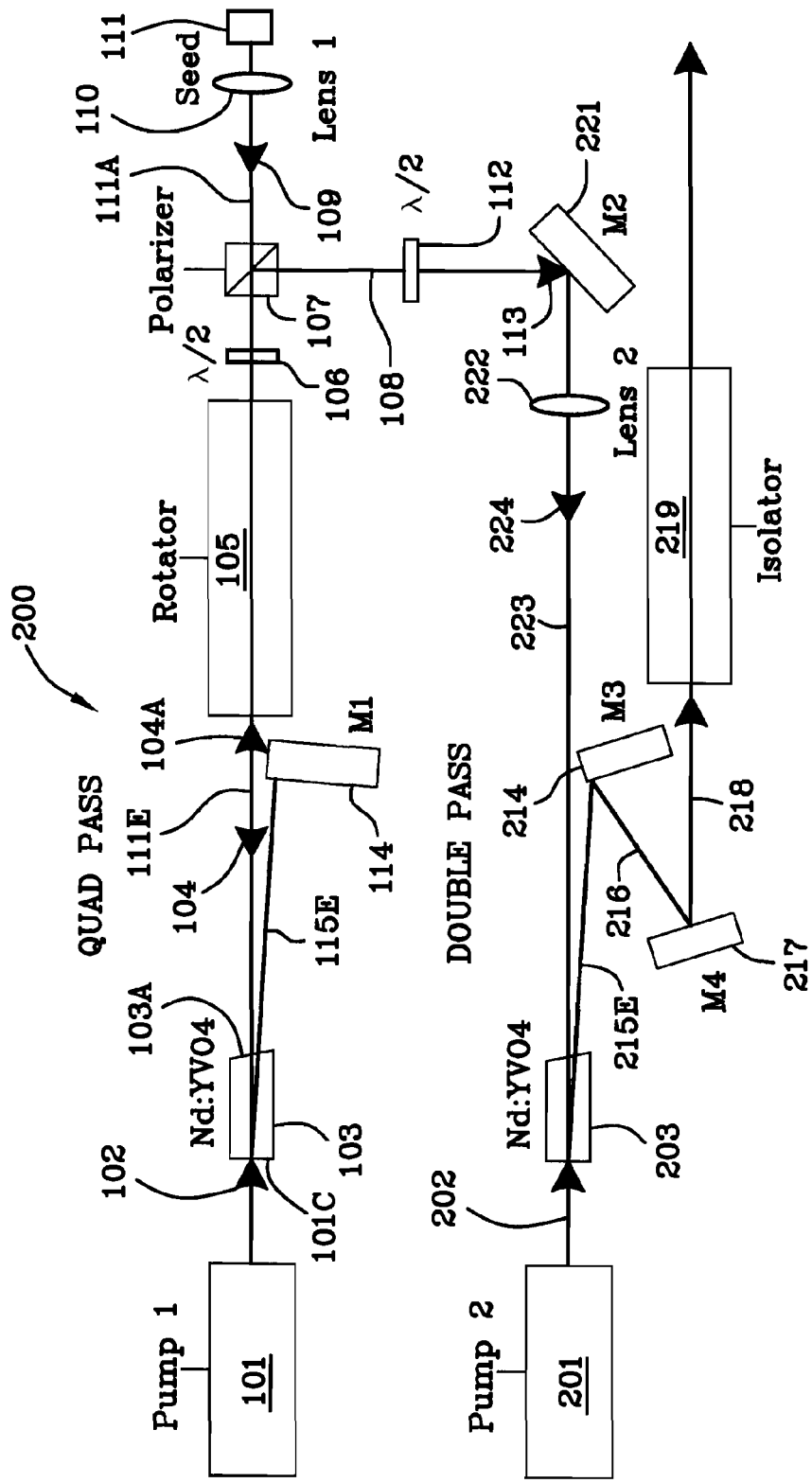
FIG. 2 is a schematic illustrating a first amplifier having a quadruple pass (quad pass) Nd:YVO$_4$ gain medium coupled with a second amplifier having a double pass (dual pass) gain medium, the first amplifier includes an optical end pump and the second amplifier includes an optical end pump, and, four mirrors are employed in the example of FIG. 2.

FIG. 2 is a schematic 200 illustrating a first amplifier having a quadruple pass (quad pass) Nd:YVO$_4$ gain medium 103 coupled with a second amplifier having a double pass (dual pass) gain medium 203. The first amplifier includes an optical end pump 101 and the second amplifier includes an optical end pump 201. Mirrors M1 (114), M2 (221), M3 (214) and M4 (217) are employed in the example of FIG. 2. An isolator 219 is also employed in the example set forth in FIG. 2. Polarizer 107 has a high polarization extinction ratio and provides natural isolation between the quad pass amplifier and the seed laser. Rotator 105 functions to block feedback power from the dual pass amplifier.

Figure 3:
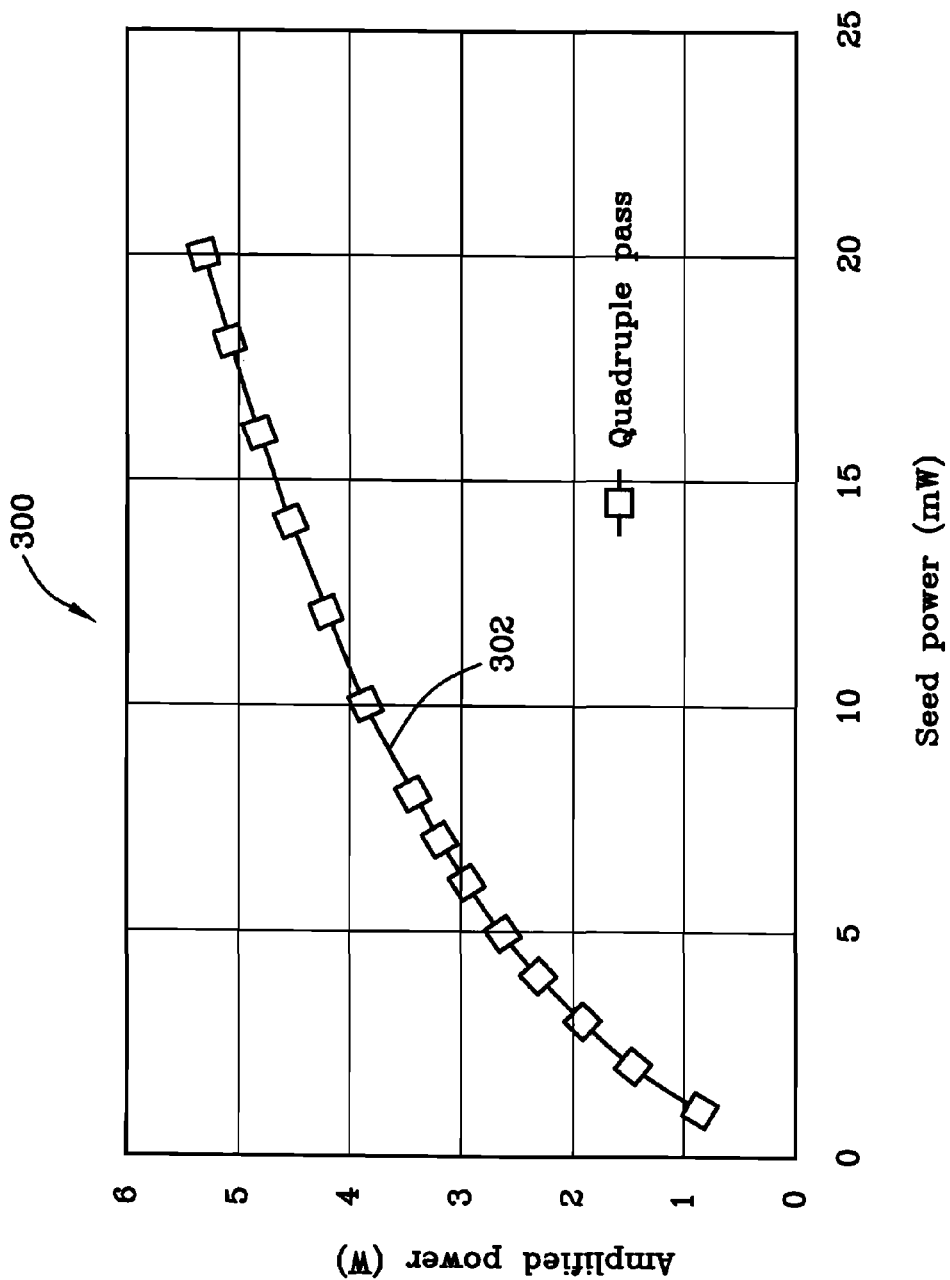
FIG. 3 is a graph indicating power amplification of various mW average seed power input signals for the quad pass schematic of FIG. 1.
Figure 4:
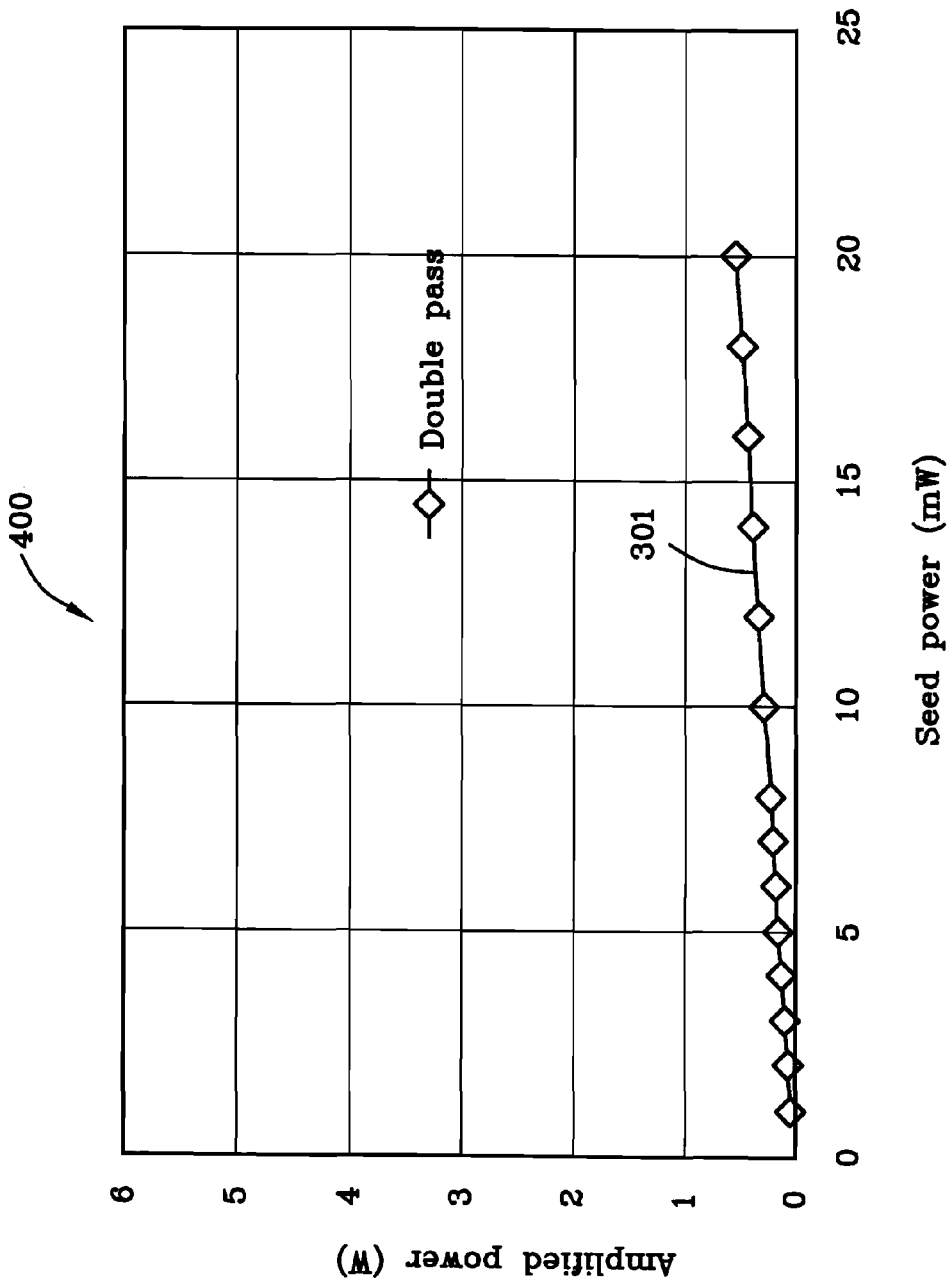
FIG. 4 is a graph indicating power amplification of various mW average seed power input signals for the dual pass schematic of FIG. 1A.

FIG. 3 is a graph 300 indicating power amplification of various mW average seed power pulses for the quad pass 302 of FIG. 1 and the dual pass 301 of FIGS. 1A and 2. Quad-pass 302 shows better amplification gain than double-pass 301 as illustrated in FIG. 4. Seed power of 1-2 mW can be amplified to around 1.5 W with 30 W pump. With higher pump power up to 35 W, and with seed laser average power of 20 mW, greater than 5 W output power can be achieved with a single stage, quad pass amplifier.

FIG. 4 is a graph 400 indicating power amplification of various mW average seed power input signals for the dual pass schematic of FIG. 1A.

Figure 5:
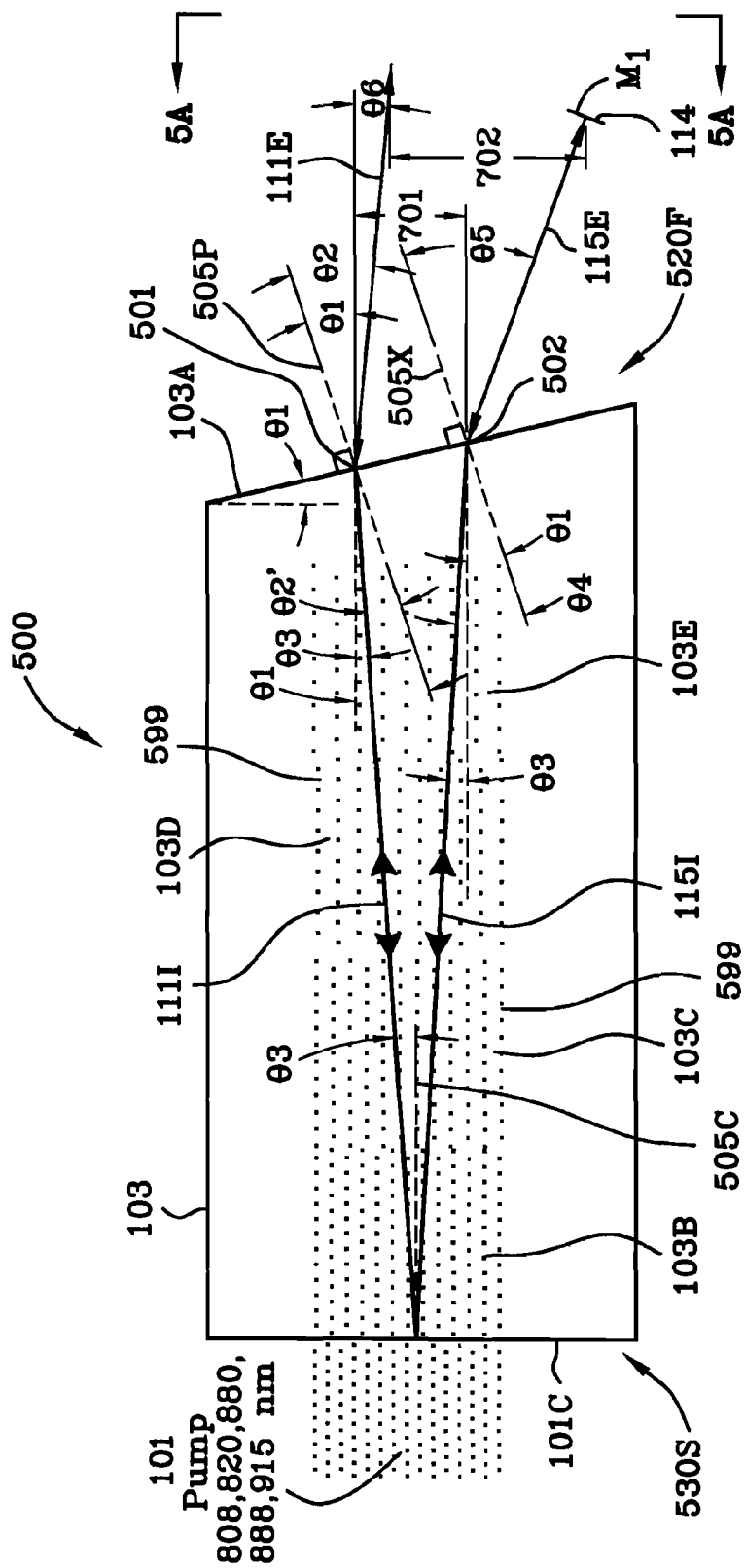
FIG. 5 is a schematic indicating a Nd:YVO$_4$ gain medium having a wedge surface at the first end of the gain medium and having a second end surface at the second end of the gain medium together with the first exterior path of the seed laser, the first interior path of the amplified seed laser, the second interior path of the amplified seed laser and the second exterior path of the amplified seed laser.

FIG. 5 is a schematic 500 indicating a Nd:YVO$_4$ gain medium 103 having a wedge surface 103A at the first end 520F of the gain medium and having a second end surface 101C at the second end 530S of the gain medium 103. FIG. 5 illustrates the first exterior path 111E of the seed laser, the first interior path 111I of the first-time amplified seed laser, the second interior path 115I of the second-time amplified seed laser and the second exterior path 115E of the second-time amplified seed laser.

In the dual pass amplifier of FIG. 1A, the incoming laser makes two passes through the gain medium. Incoming pulses arrive along first exterior path 111E at incident angle θ2 where they impinge on wedge surface 103A and are then refracted along first interior path 111I at refraction angle θ2' until they impinge on the second surface 101C. Along first interior path 111I the laser is sometimes referred to herein as the first-time amplified laser. The laser is then reflected on a second pass at a reflection angle θ3 along second interior path 115I toward wedge surface 103A. Along second interior path 115I the laser is sometimes referred to herein as the second-time amplified laser. The laser then arrives at wedge surface 103A at incident angle θ4 where it is refracted at refraction angle θ5 along second exterior path 115E. In the dual pass example illustrated in FIG. 1A, M1 is not shown.

FIG. 4 is a graph indicating power amplification of various mW average seed power input signals for the dual pass schematic of FIG. 1A.

Referring to FIGS. 1 and 5, in the quad pass amplifier, a mirror 114 (M1) is used to return the laser back to the gain medium 103. Referring to FIG. 5, in contemplation of the quad pass amplifier illustrated in FIGS. 1 and 2, a highly reflective mirror 114 reflecting the laser along the second exterior path 115E to wedge surface 103A at location 502 and at incident angle θ5 where the laser is refracted along second interior path 115I at refraction angle θ4 as the third-time amplified laser. The laser is sometimes referred to herein as the third-time amplified laser as it is refracted along second interior path 115I at refraction angle θ4. The third-time amplified laser proceeds along second interior path 115I and impinges on the highly reflective surface 101C where it is reflected as the fourth-time amplified laser along the first interior path 111I along internal reflective angle θ3 toward wedge surface 103A. The laser is sometimes referred to herein as the fourth-time amplified laser as it is travels along the first interior path 111I at incidental angle θ2'. First interior path 111I resides at incidental angle θ2' with respect to a line perpendicular to wedge surface 103A. Once the fourth-time amplified laser impinges on wedge surface 103A it is refracted at refraction angle θ2 and first exit path 111E where the fourth-time amplified laser is directed toward and through rotator 105, half wave plate 106, polarizer 107 and half wave plate 112 where the fourth-time amplified laser proceeds in the direction of arrow 113.

FIG. 1 illustrates the quadruple pass amplifiers with four stages of amplification. Each time the laser passes through the gain medium the laser is amplified and picks up more energy. FIG. 1A illustrates the dual pass amplifier where there are two stages of amplification. FIG. 2 illustrates the combination of the quadruple pass (quad amplification, FIG. 1) and the dual pass (double amplification, FIG. 1A) enabling six stages of amplification.

Figures 5A, 5B:
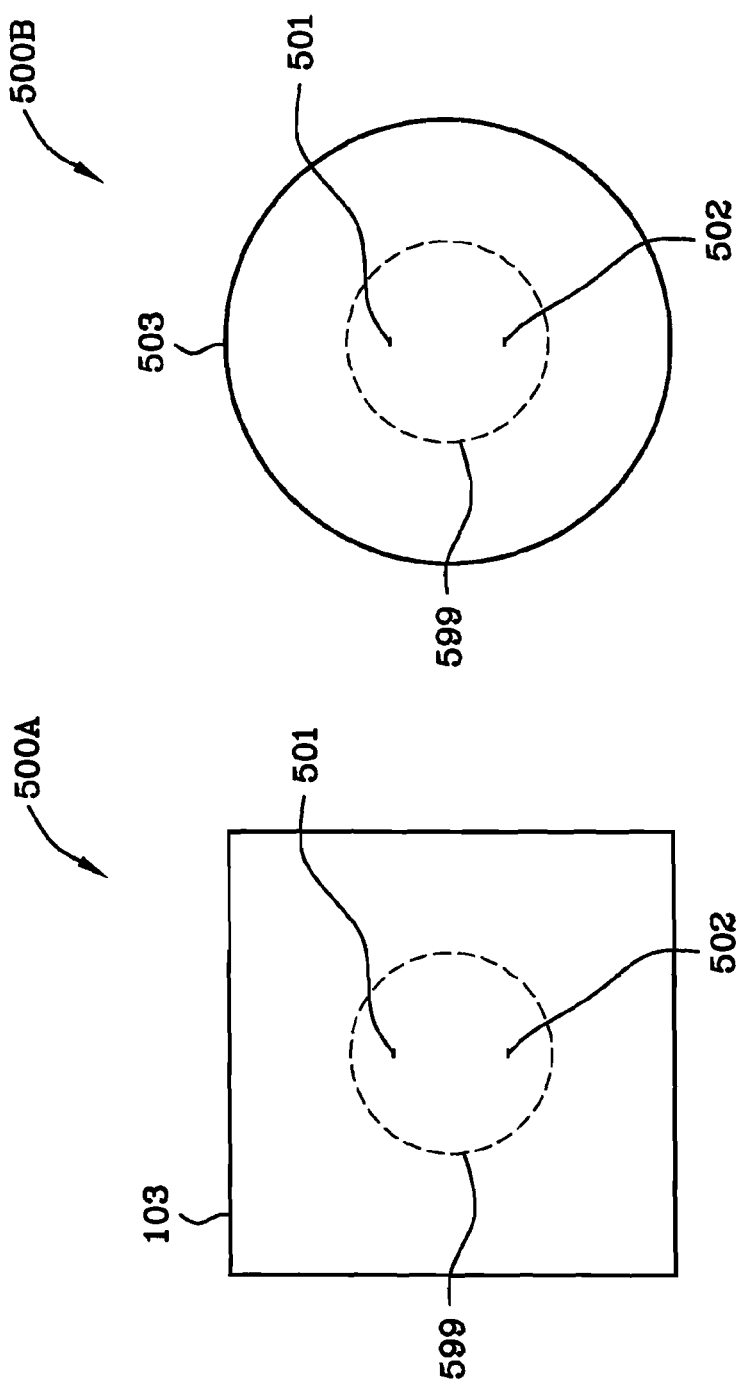
FIG. 5A is an end view of FIG. 5 along the lines 5A-5A.
FIG. 5B is an end view of a circular, in cross-section, Nd:YVO$_4$ gain medium.

FIG. 5A is an end view 500A of FIG. 5 along the lines 5A-5A. FIG. 5A illustrates the entrance location 501 on the wedge surface 103A of the incoming pulses along the first exterior path 111E. FIG. 5A also illustrates the exit location 502 on the wedge surface 103A of the exiting pulses along the second exterior path 115E. In the example where the gain medium is used as a quadruple pass amplifier, the location 502 becomes the entrance location for the third pass and the location 501 becomes the exit location for the fourth pass.

Still referring to FIGS. 5 and 5A, a diode pump 101 is illustrated proximate second end surface 101C which is highly transparent (transmissive) at the wavelength of 808 nm and highly reflective at the wavelength of 1064 nm. If other pumping wavelengths (820 nm, 880 nm, 888 nm, and 915 nm) are used then surface 101C is highly transmissive at these wavelengths. Surface 101C is coated and the coating has the aforementioned characteristics at respective wavelengths. Reference numerals 103B, 103C, 103D, and 103E illustrate regions of the Nd:YVO$_4$ gain medium 103. Region 103B is in proximity to the end surface 101C where relatively high energy/power is transferred. The concentration of the stippling (dots)/volume indicates the relative amount of energy/power transferred to the gain medium. It will also be noticed from FIG. 5 that the energy is transferred to the cylindrical core of the gain medium and the energy transfer is defined by the spot size of the pump energy entering the gain medium. Region 103C has fewer dots/volume indicating that the relative amount of energy/power transferred to the gain medium is less than in region 103B. Similarly, regions 103D and 103E have progressively still fewer dots/volume indicating the relative amount of energy/power transferred to the gain medium is lower as a function of the distance from the 808 nm pump. Reference numeral 599 represents schematically the radial extent of the diode end pump radiating power at a wavelength of 808 nm. Other pump wavelengths may be used, for instance, the pump central wavelengths may be at 808 nm, 820 nm, 880 nm, 888 nm or 915 nm, +/−10 nm. The pump may be an end pump or one or more side pumps. The pump may be a diode pump light source or other suitable light source. Other types of pumps may be used.

Still referring to FIGS. 5 and 5A, an important part of the quad pass and dual pass amplifier structure is the gain medium 103, which includes gain material, a doping concentration, cross-sectional area, length, structure and coating. Nd:YVO$_4$ is the material of the gain medium. Nd:YVO$_4$ has a high emission cross section and enough bandwidth to allow a pulse width of 10 picoseconds. Nd:YVO$_4$ is a naturally polarized crystal and it is a-cut. The polarization of the laser generated is along the c-axis of the crystal. The Nd:YVO$_4$ gain medium 103 as illustrated in FIG. 5 is uniformly doped. Uniform doping is sometimes referred to as homogeneous doping. Doping concentrations of between 0.05-3.0% at. (atomic weight percentage) are used in the naturally polarized Nd:YVO$_4$ crystal. The example of the Nd:YVO$_4$ gain medium is uniformly doped at a concentration in the range of 0.05-3.0% at. Nd:YVO$_4$ stands for and means Neodymium-doped Yttrium Vanadate.

Figure 11:
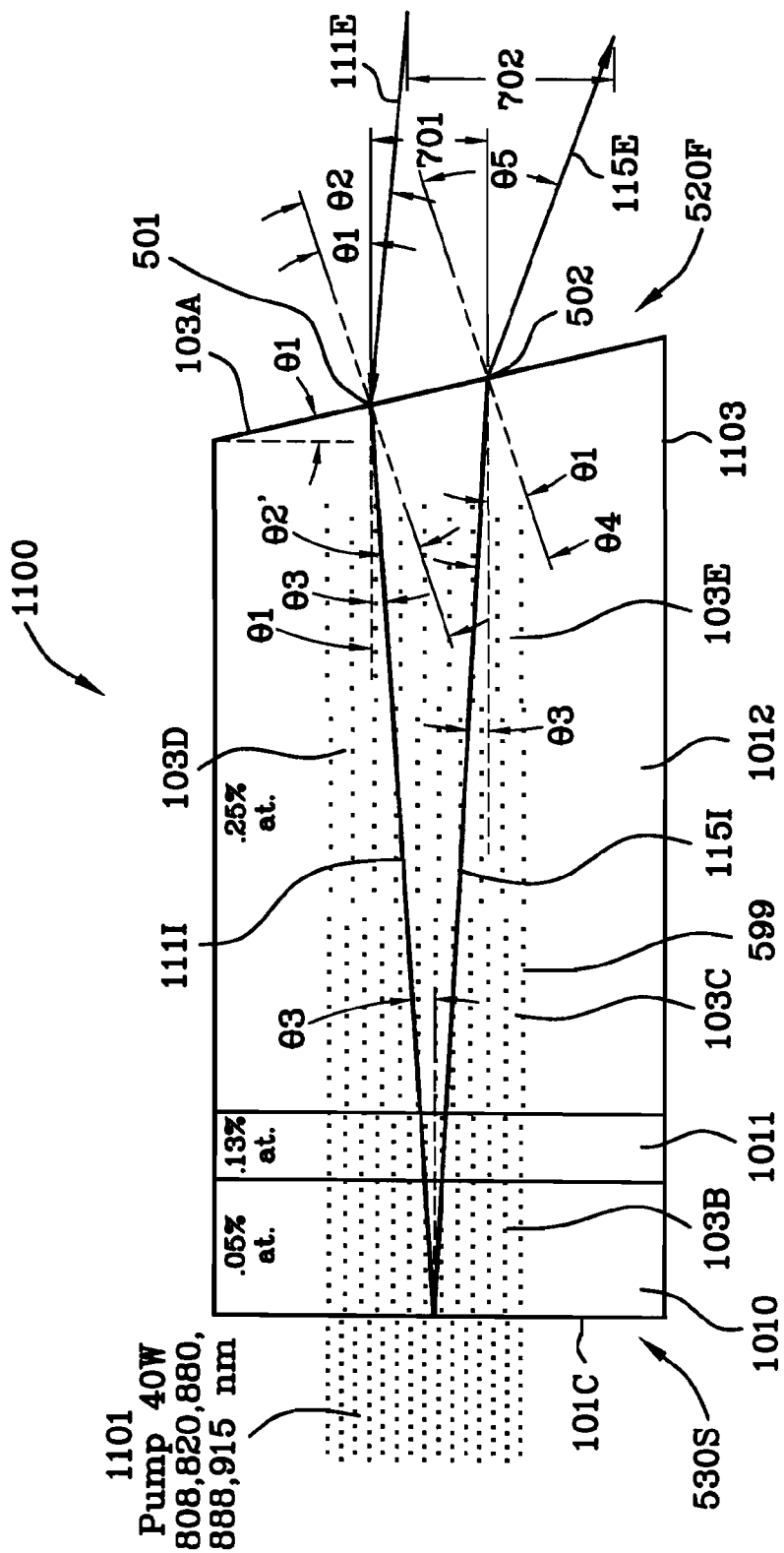
FIG. 11 is a schematic similar to FIG. 5 wherein the Nd:YVO$_4$ gain medium comprises three segments with different doping concentration for each segment.

Designing an appropriate doping concentration is dependent on many factors. Besides gain and thermal lensing effects, one important factor is the maximum pump power applied (typically 30-60 W) and the dimensions of the cross-section of the Nd:YVO$_4$ crystal. The optimized pump spot size is typically in the range of 0.3 to 2 mm in diameter. As pump power increases, then dopant concentration is expected to be lower. Lower doping concentration enables use of higher pump power. The power applied by an end pump to a Nd:YVO$_4$ crystal is limited by the structure of the crystal itself. If too much power is applied to a crystal of given dopant concentration, it will fracture due to thermally induced tensile stress. Relatively more power can be applied to an Nd:YVO$_4$ crystal gain medium having a small cross-section, for example, 1 mm$^2$, as compared to a gain medium having a large cross-section, for example, 36 mm$^2$. Further, relatively more pump power can be applied to an Nd:YVO$_4$ crystal having a low Nd concentration, for example, 0.05% at. Furthermore, relatively more pump power can be applied using a larger pump spot radius. Therefore, sizing a uniformly doped crystal must take into account all of the foregoing considerations. FIGS. 10-11 illustrate and disclose a segmented gain medium. The pump spot size must be large enough to completely envelope the seed laser as they pass through the gain medium. Therefore, sizing a segmented doped crystal must also take into account all of the foregoing considerations.

Nd:YVO$_4$ is a naturally polarized crystal and is preferably 5 to 30 mm in length which can absorb more than 99% pump power at 808 nm and 3 nm bandwidth (FWHM) at an appropriate doping concentration. In addition, longer crystals provide more surface area for heat removal. The pump spot size is typically 0.3 to 2 mm in diameter. The cross section of the crystal may be as small as 4 mm$^2$ as the seed laser spot size in the crystal is around 0.4-0.6 mm in diameter. Therefore, the preferred size of the crystal has a cross-section of 4 mm$^2$ which provides enough aperture for the laser.

The cross-sectional dimensions of Nd:YVO$_4$ may be between 1 mm$^2$ to 36 mm$^2$. Doping concentrations which range between 0.05% at. to 3.00% at. can be determined by the maximum pump power applied (typically 30-50 W) and pump beam spot size.

As previously stated, the first end surface 103A of Nd:YVO$_4$ gain medium 103 is a planar wedge surface as shown in FIG. 5. The wedge surface design of the gain medium 103 is an important aspect of the amplifiers. The wedge surface eliminates the Etalon effect caused by two parallel surfaces. Two parallel surfaces of a gain medium in effect form an optical cavity. The etalon effect broadens pulse width and it forms self-lasing within the pumped gain medium. Self-lasing is undesirable as it destroys control of the output of the laser. The wedge surface 103A eliminates self-lasing between surfaces 103A, 101C of the gain medium 103. Even if AR (anti-reflective) coatings are applied on both sides of the crystal, potential lasing can happen between parallel first and second surfaces of a gain medium. Use of the wedge surface also helps to reduce the self-lasing effect between the surface of the gain medium and other optical surfaces used in the amplifier.

Still referring to FIG. 5, the wedge surface 103A of the gain medium 103 provides a wider separation angle between incoming pulses of the pulsed output along first exterior path 111E and outgoing pulses along the second exterior path 115E. The wedge surface 103A is perpendicular to the a-c plane of Nd:YVO$_4$ where the polarization of the amplified laser is in the a-c plane. The wedge surface 103A is AR-coated at wavelength of 1064 nm, and the second surface 101C is HT-coated at wavelengths of 808 nm and HR coated at wavelength of 1064 nm. Appropriate coatings are used in connection with the operating wavelengths.

Still referring to FIG. 5, the first end of the generally rectangularly shaped Nd:YVO$_4$ gain medium includes a wedge surface 103A coated with an anti-reflective coating. The seed laser enters the anti-reflective coating on the wedge surface 103A of the Nd:YVO$_4$ gain medium at an incident angle, θ2. The incident angle, θ2, is measured with respect to a line 505P which is perpendicular to the wedge surface 103A of the Nd:YVO$_4$ gain medium 103. It will be noticed that the wedge surface is a planar surface and that it is formed at a wedge angle, θ1. Wedge angle, θ1, is measured with respect to a vertical plane cut through one point of the wedge surface. It will be further noticed that the input seed laser enters the wedge surface at an angle, θ6, along line 111E with respect to a line parallel to the center line of the gain medium. Reference is made to FIG. 5 where it is seen that θ6=θ2−θ1. The wedge angle θ1 may vary between 5-7° as it is desired and preferred to maintain the incidental angle, θ2, of the seed laser less than or equal to 15°. A wedge angle of 5-7° yields a preferred internal reflective angle, θ3, of approximately 0.78°.

It is an object to provide a laser having a high gain medium which includes a wedge surface. It will be noticed from FIG. 5 that the laser arrives on path 111E which is not aligned with the centerline 505C of the gain medium The incident angle θ2 is selected such that the seed laser impinge on the wedge surface and are refracted at an angle θ2' on a first interior path 111I within the high gain medium so as to reside within the pump spot size as they travel within the gain medium thus maximizing energy transfer to the laser. Reference numeral 599 represents the radial extent of the pump spot size. It is desired to match the laser within the pump spot size in the gain medium. Most of the energy of the pump tends to concentrate along the centerline 505C of the gain medium.

The seed laser is refracted at an angle θ2' it impinges wedge surface 103A. The seed laser is reflected from surface 101C at an internal reflective angle, θ3, along the second path 115I within the Nd:YVO$_4$ gain medium 103. The internal reflective angle, θ3, is defined with respect to the centerline 505C of the Nd:YVO$_4$ gain medium. Additionally, the preferred internal reflective angle, θ3, is approximately 0.78°. It is desired to minimize the reflective angle, θ3, of the seed laser within the gain medium 103 such that it remains relatively centered with respect to the centerline of the axis through the gain medium so the seed laser can effectively extract the pump energy as they pass through the gain medium. Energy pumped into the gain medium is concentrated within the spot size of the end pump. If the incoming pulses of the seed laser match within the pump spot size within the Nd:YVO$_4$ gain medium, the pump spot size overlaps the seed laser on the first interior path 111I and the second interior path 115I of the laser and energy is efficiently transferred to the laser.

Additionally, the internal preferred reflective angle, θ3=0.78°, has to be large enough to ensure separation of the seed laser coming into the planar surface forming a wedge surface of the Nd:YVO$_4$ gain medium from the amplified laser exiting the planar surface of the gain medium.

The internal reflective angle, θ3=0.78°, yields a shift with respect to the axis of the gain medium of approximately 0.27 mm for a gain medium that is approximately 20 mm in length. Additionally, if the gain medium is approximately 10 mm in length, then the preferred refractive angle, θ3=0.78°, yields a shift with respect to the axis of the gain medium of approximately 0.135 mm.

The seed laser is refracted on the first pass (first-time amplified) along a first interior path 111I through and within the Nd:YVO$_4$ gain medium as it travels toward the second end surface 101C of the Nd:YVO$_4$ gain medium. The second end surface 101C of the Nd:YVO$_4$ gain medium proximate the pump includes a second coating highly reflective to the seed laser at the 1064 nm wavelength and the second coating is highly transparent to light from the end pump at 808 nm wavelength.

The seed laser is reflected at the internal reflective angle, θ3, by the highly reflective second coating on the second end surface 101C of the Nd:YVO$_4$ gain medium and causes the 1064 nm wavelength laser to travel on a second pass (second time amplified) along a second interior path 115I through and within the Nd:YVO$_4$ gain medium toward the wedge surface 103A of Nd:YVO$_4$ gain medium. The laser pulses exit the wedge surface of the Nd:YVO$_4$ gain medium at a refraction angle, θ5. The diffraction angle, θ5, is measured with respect to a line normal (perpendicular) to the first end of Nd:YVO$_4$ gain medium.

FIG. 5A is an end view 500A of FIG. 5 along the lines 5A-5A illustrating a square, in cross-section, gain medium. Reference numeral 599 is the radial extent of the pump spot size in the gain medium. Reference numerals 501, 502 indicate the entrance and exit locations, respectively, of the laser. FIG. 5B is an end view 500B of a circular, in cross-section, Nd:YVO$_4$ gain medium.

Figure 6:
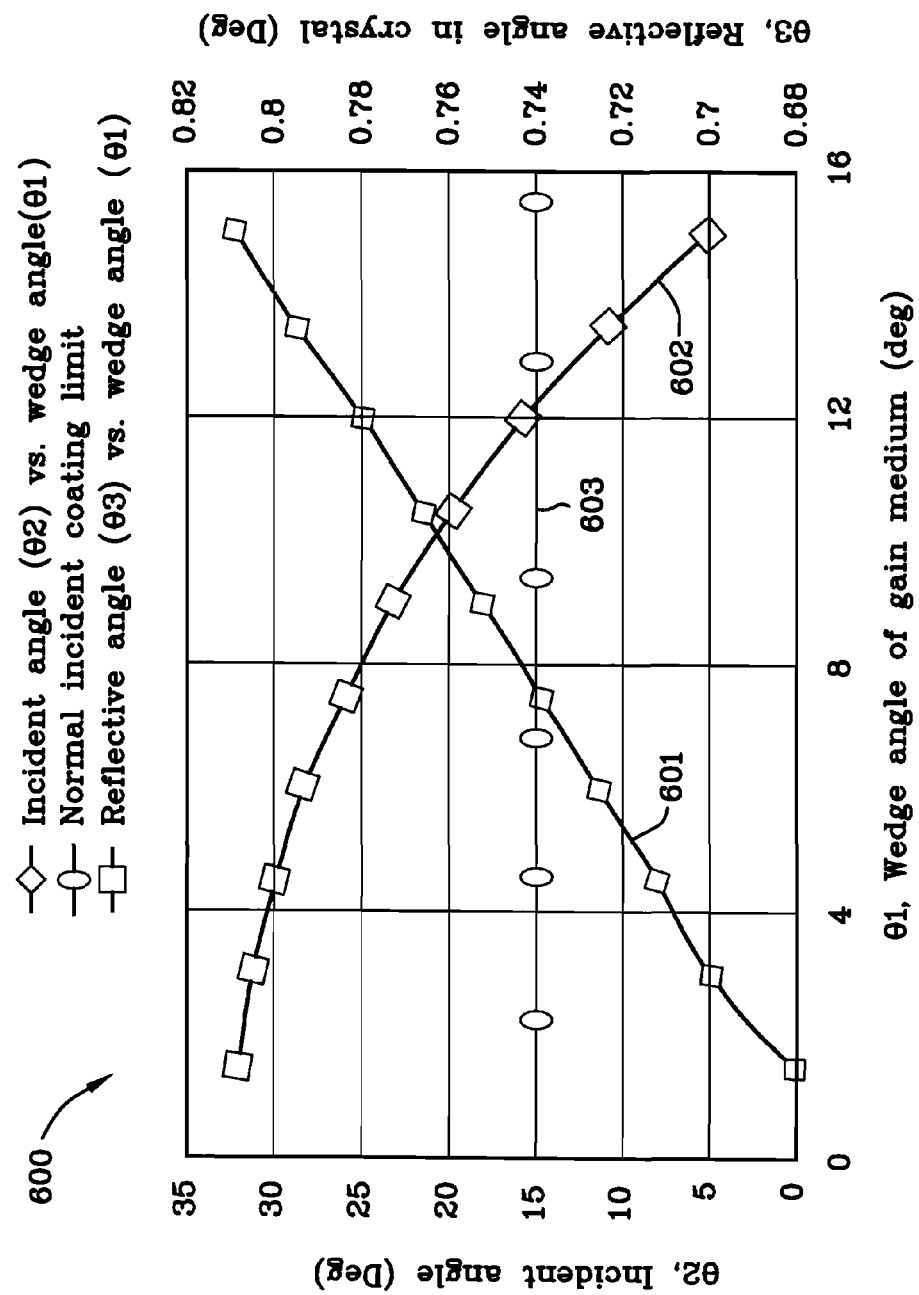
FIG. 6 is a graph of the wedge angle of: Nd:YVO$_4$ gain medium versus the incident angle of the seed laser; and, the wedge angle of the Nd:YVO$_4$ gain medium versus the internal reflected angle of the seed laser in the gain medium.

FIG. 6 is a graph 600 of: the wedge angle θ1 of the Nd:YVO$_4$ gain medium versus the incident angle θ2 of the pulses of the pulsed output of the seed laser, 601; the wedge angle θ1 of the Nd:YVO$_4$ gain medium versus the internal reflected angle θ3 in the gain medium, 602; and, the wedge angle θ1 of the Nd:YVO$_4$ gain medium versus normal incident coating limit, 603.

Therefore, based on normal incident AR-coating a wedge angle of 5-7° corresponds to an incident angle of about 15°, and the internal reflective angle is approximately 0.78°.

Figure 7:
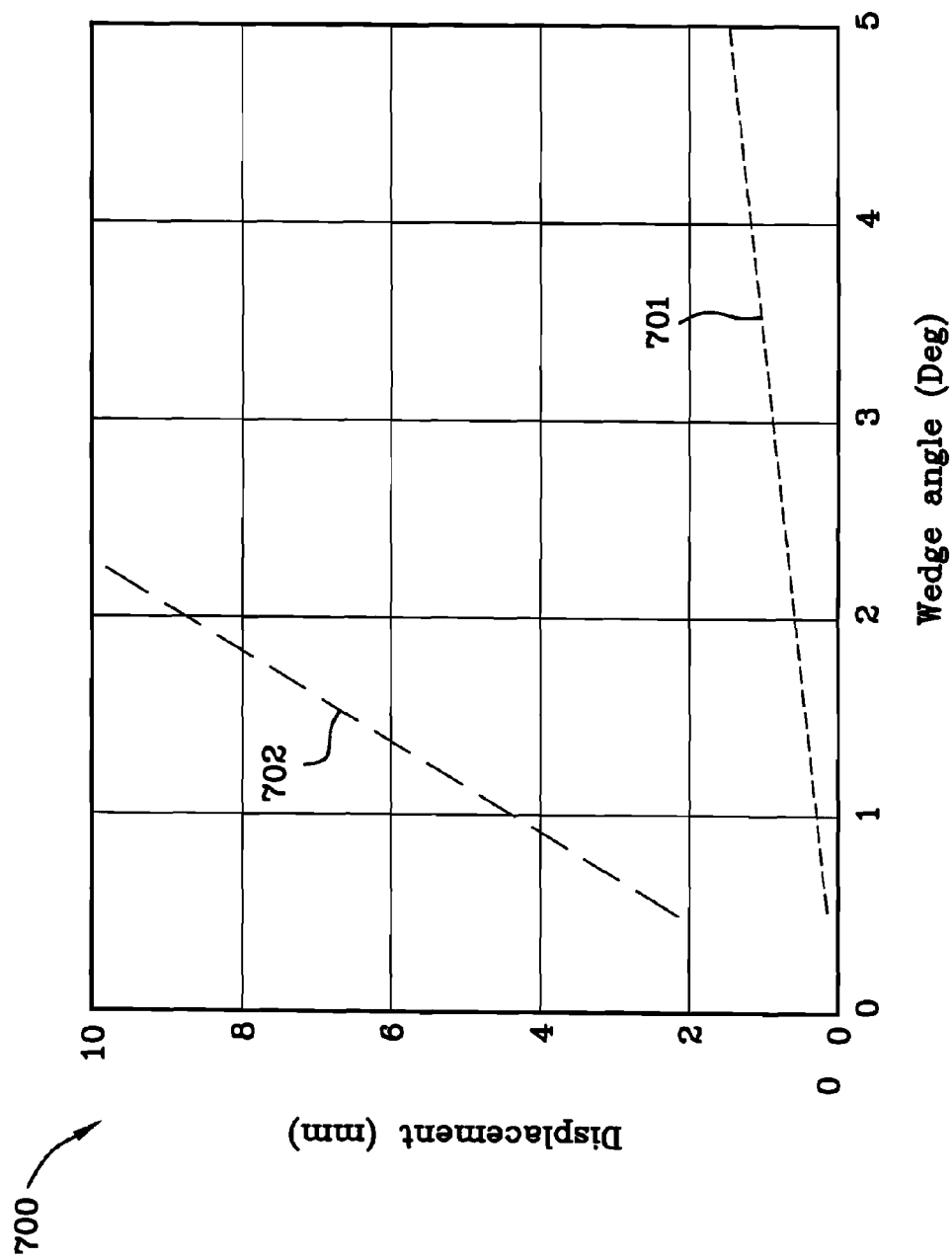
FIG. 7 is graphical plot of: the separation distance at the first end surface of the gain medium of input path of the laser from the output path of the laser as a function of wedge angle; and, the distance between mirror M1 to the incoming seed laser.

FIG. 7 is a graphical: plot 701 of the separation distance on the first end surface 103A of input path 111E of the incoming laser from the output path 115E of the exiting pulses as a function of wedge angle θ1; and, plot 702 of the incoming seed laser 111E as a function of wedge angle θ1.

FIG. 8 is a schematic 800 of a quadruple pass amplifier including a Nd:YVO$_4$ gain medium 805, a first mirror 806, and a second mirror 807. FIG. 8A is a graph 800A of the spot size of the seed laser as a function of distance of travel for the schematic of FIG. 8 indicating the first pass 801, the second pass 802, the third pass 803, the fourth pass 804 and the location of the flat mirror 806 and the second curved mirror 807. The first pass 801 is approximately 64 mm in length, the second pass 802 is approximately 161 mm in length, the third pass 803 is approximately 161 mm in length, and the fourth pass 804 is approximately 64 mm in length. Reference numeral 810 represents the starting point of the first pass 801 in the gain medium 810. Reference numeral 811 is the seed beam waist and it is desirable to position the seed laser waist coincident with the waist of the optical pump (not shown) in FIG. 8. The seed laser waist is located approximately 2 mm inside the gain medium away from the pump surface (not shown in FIG. 8).

In a quad-pass amplifier, the mode match of laser and pump mode is very critical for each pass. Normally the mode match ratio between laser and pump spot (spot diameter of the laser)/(spot diameter of the pump) is from 0.6-1.2. FIG. 8A shows laser beam propagation of quad-pass amplifier. In consideration of the thermal lensing effect of the gain medium in a high-power pump, the proper design of M1 and M2 illustrated in FIG. 8A controls the spot size of laser mode for second, third, and fourth pass to match the pump mode.

FIG. 9 is a schematic 900 presentation of the seed laser at a wavelength of 1064 nm, repetition rate of 100 kHz, and with a pulse width of 10 picoseconds. No average power is specified with respect to the pulse stream illustrated in FIG. 9. FIG. 9A is a schematic 900A of an optical pump 902 and the seed laser 901 residing proximate the second end 904 the Nd:YVO$_4$ gain medium 903. In this example the seed input 901 is coincident with the pump 902 and the seed input enters the second end surface 904 of the second end 930S of the gain medium 903. Second end surface 904 permits transmission of the diode pump radiation at 808 nm and the seed laser 901 at 1064 nm. The amplified laser exits the second end surface 905 of the second end 920F of the gain medium as indicated by arrow 930.

Still referring to FIG. 9A, arrow 930S indicates the second end of the gain medium 903 and arrow 920F denotes the first end of gain medium 903. Reference numerals 903B, 903C, 903D, and 903E illustrate regions of the Nd:YVO$_4$ gain medium 903. Region 903B is in proximity to the end surface 904 where relatively high energy/power is absorbed. The concentration of the stippling (dots)/volume indicates the relative amount of energy/power absorbed in the gain medium. It will also be noticed from FIG. 9A that the power is absorbed in the gain medium 903. The extraction efficiency is related to the seed laser power, and the gain. From region 903B to 903E, the power absorbed in each segment exponentially decays along the pump axis.

FIG. 10 is a schematic 1000 presentation of the pulses of the pulsed output 1001 of the seed laser at a wavelength of 1064 nm, repetition rate of 100 kHz, pulse width 10 picoseconds, and, average power around 1 mW.

FIG. 10A is a schematic 1000A of an optical pump 1002 operating at a wavelength of 808 nm, and the seed laser 1001 residing proximate the second end of the gain medium wherein the gain medium comprises three diffusion bonded segments 1010, 1011, 1012 having different lengths and dopant concentrations resulting in different gain distributions in each segment. More specifically, FIG. 10A is a schematic 1000A of end pumped segmented medium illustrating a diffusion bonded gain medium, Nd:YVO$_4$, comprising three segments 1010, 1011, 1012 with the dopant concentration of Nd in atomic weight percent, % at., for each segment, the power absorbed, $P_{abs}$, for each segment; the power transmitted $P_T$, for each segment; the optical gain, G, for each segment; and, the absorption coefficient, a, for each segment. FIG. 10B is a chart 100B of the dopant concentration, C % at., segment length in mm, a (scaled dopant concentration) and Pabs (absorbed power) per segment. Alternatively, instead of diffusion bonding, the segments 1010, 1011 and 1012 may be secured together by using anti-reflective coating between the segments.

Referring to FIGS. 10A and 10B, the first segment 1010 has the lowest Nd doping concentration 0.05% and is 2 mm long. Scaling the doping percentage by a factor of 3 yields an $\alpha=0.15$ where $\alpha$ is the absorption coefficient. The absorption efficiency is $$\eta = (1 - e^{-\alpha L}).$$

It would appear, therefore, without any further knowledge of Nd:YVO$_4$ crystals that an increase in efficiency would be accomplished by using a longer crystal and/or by an increase in the absorption coefficient. However, the absorption coefficient does not indicate that there are physical limits to coefficient $\alpha$ and applied power. As power applied to the Nd:YVO$_4$ crystal increases, then the concentration of the Nd doping is reduced and the cross section of the crystal is then reduced. Lower doping concentration enables use of higher pump power.

Referring again to FIGS. 10A and 10B, a seed laser in the range of mW is applied to the segmented medium which has a cross sectional area of 4 mm$^2$. In this example, the pump power is 40 W and the pump spot size is 0.5 mm in diameter. Pabs per segment is given by the following equation:

$$P\text{abs} = P\text{input}(1 - e^{-\alpha L})$$

Since 40 W of end pumped power is applied to the first segment, the Pabs=40 $(1 - e^{(-(0.15)(2))})$ W=10.36 Watts leaving 29.64 W available to the second segment 1011. The power available/transmitted to subsequent segment is given by the following equation.

$$P\text{input} = P\text{pump} - (\Sigma P\text{abs})$$

$P$ input to segment 1011=40 W−(10.36 W)=29.64 W.

Therefore, 29.64 W is available/transmitted through to the second segment 1011. Note that 40 W could be safely applied to the first segment 1010 without the risk of fracture because the doping concentration of Nd is small, to wit, 0.05% at.

Next, the remaining unabsorbed 29.64 W is applied to segment 1011 which has an Nd concentration of 0.13% at. and is 1 mm long which yields Pabs=29.64 $(1 - e^{(-(0.39)(1))})$ W=9.57 W. The power available/transmitted to the third segment, 1012, is:

$P$input to segment 1012=40 W−(10.36+9.57)W=20.07 W.

Now, the power available or transmitted to the third diffusion bonded segment 1012 is 20.07 W. Since the third segment is 0.25% at. Nd doped and is 12 mm long, the $$P\text{abs} = 20.07(1 - e^{(-(0.75)(12))})W = 20.07 \text{ W}.$$

Applying this system of scaling the pump power by absorbing pump power in segments allows usage of higher pump power and higher energy transfer to the Nd:YVO$_4$ crystal. Higher energy transfer to the Nd:YVO$_4$ crystal results in higher gain of the seed laser as it travels within the gain medium.

Each segment can be treated as one stage of an amplifier. An example is given to illuminate the concept. Segment 1010 produces a gain of 10.9 dB, so for a small signal seed laser such as around 1 mW input and approximately 10 W pump power absorbed, the average power amplified from the first segment is 12.5 mW. Gain is calculated as follows:

$$\text{Gain} = 10\left(\log_{10}\frac{P\text{out}}{P\text{in}}\right)\text{dB}$$

Segment 1011 produces a gain of 8.2 dB so for a 12.5 mW average power seed input and 10 W pump power absorbed, the amplified average power exiting the second segment 1011 is 83 mW. Similarly, segment 1012 produces a gain of 10.8 dB so for a 83 mW power seed input and approximately 20 W pump power absorbed, the amplified average power exiting the third segment is 1 W. The integrated gain (overall gain) of 3 segments is 30 dB.

If it is a single crystal design, the gain will be 28.7 dB with 1 mW seed laser and 40 W pump power. The output power is 743 mW. Apparently the multi-segment gain is improved more than 34% as 1000 mW/743 mW=1.34.

Using segments with gradually increased doping concentrations prevents fracturing of the segments as the power input to each segment is at an acceptable level the crystal can absorb without fracturing.

Using segments with different doping concentrations, the gain distribution can be optimized to obtain high extraction efficiency.

The publication entitled, Power Scaling of Diode-Pumped Nd:YVO$_4$ Lasers, IEE JOURNAL OF QUANTUM ELECTRONICS, VOL. 38, NO. 9, SEPTEMBER 2002, Xiaoyuan Peng, Lei Xu, and Anand Asundi, is incorporated herein by reference hereto in its entirety.

FIG. 11 is a schematic 1100 similar to FIG. 5 wherein the Nd:YVO$_4$ gain medium comprises three segments 1110, 1011, 1012 with different doping concentration for each segment. FIG. 11 is an example similar to the example of FIG. 10A with the exception that FIG. 11 depicts a dual pass amplifier. The seed laser is amplified as they travel on both the first interior path 111I and the second exterior path 115I. The gain is therefore greater in the dual pass configuration and the gain is still greater in the quad pass configuration.

Figure 12:
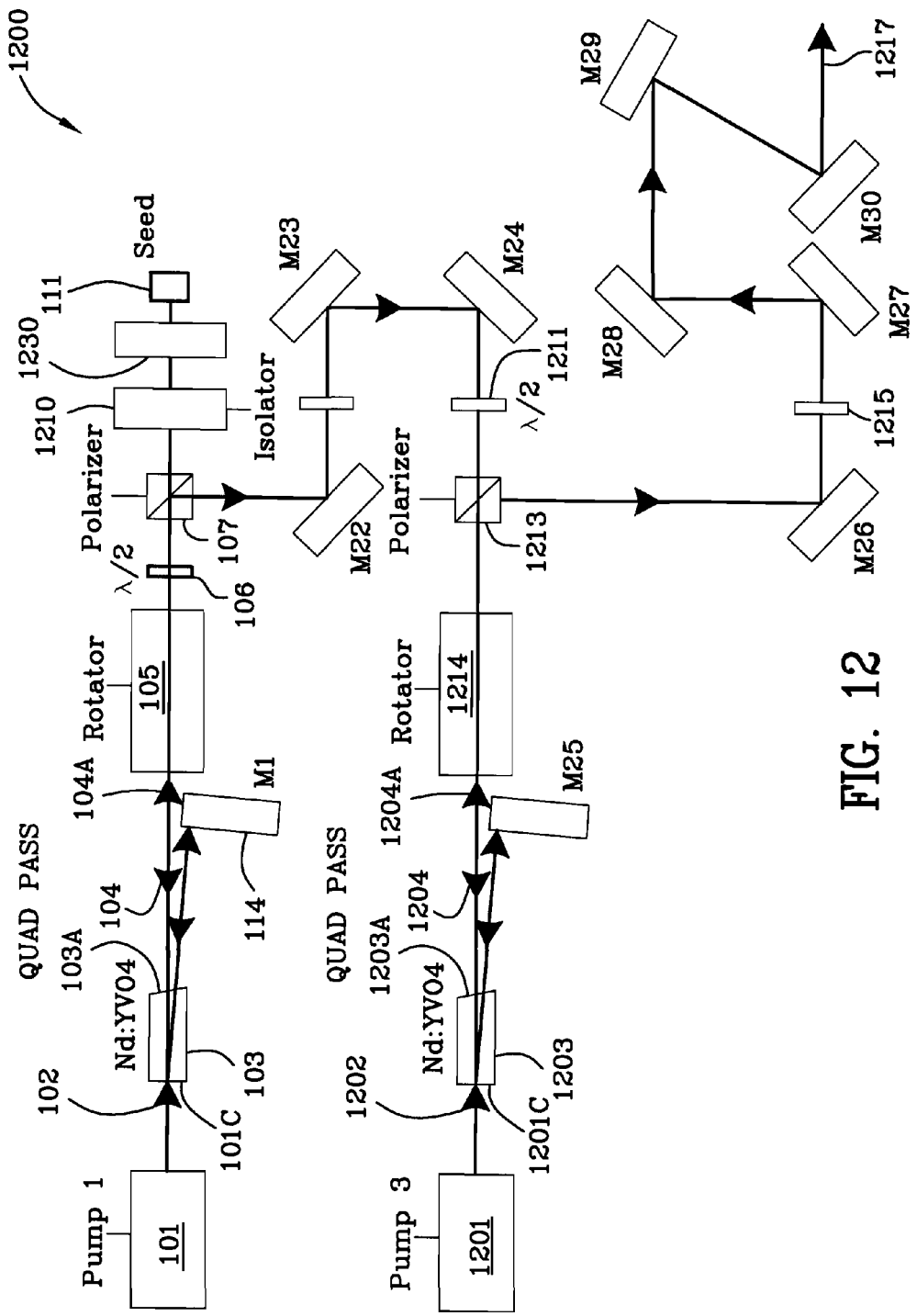
FIG. 12 is a schematic illustrating an internal amplifier comprising: a first amplifier having a quadruple pass (quad pass) Nd:YVO$_4$ gain medium coupled with a second amplifier having a quadruple pass (quad pass) Nd:YVO$_4$ gain medium, the first amplifier includes an optical end pump and the second amplifier includes an optical end pump, a lens, and, a number of mirrors M1, and M22-M30.

FIG. 12 is a schematic 1200 illustrating an internal amplifier comprising: a first amplifier having a quadruple pass (quad pass) Nd:YVO$_4$ gain medium 103 coupled with a second amplifier having a quadruple pass (quad pass) Nd:YVO$_4$ gain medium 1203. The first amplifier 103 includes an optical end pump 101 and the second amplifier 1203 includes a third optical end pump 1201, and, a number of mirrors M1, and 21-M30. Mirrors M26-M30 shown in FIG. 12 and mirror M31 position the first amplified output laser 1217 for further amplification by the external diffusion amplifiers 1270 or 1271. The first quad pass amplifier illustrated in the upper portion of FIG. 12 has the same structure and operates as discussed above in connection with FIGS. 1, 1C, 1D, 1E and 2. FIG. 12 illustrates the combination of two quadruple pass stages of amplification for a total of eight stages of amplification. The output of the first quad amplifier is fed to the second quad amplifier. The first amplified output laser 1217 is fed to the external diffusion amplifier.

As stated substantially above but repeated herein for clarity, the following is stated in connection with FIG. 12. FIG. 1 is a schematic 100 of a seed laser 111, seed lens 110, a polarizer 107, two half wavelength plates 106, 112, a rotator 105 and a quadruple pass (quad pass) Nd:YVO$_4$ gain medium 103, wherein the amplifier includes an optical end pump 101, the gain medium 103, and a highly reflective mirror 114. The seed laser spot size is substantially determined by the selection of the lens 110. Determination of the laser spot size in the gain medium required is based on desired gain. The gain volume within the Nd:YVO$_4$ gain medium 103 is dependent on the spot size of the optical end pump and doping concentration of Nd. It is desirable to use an appropriately sized spot size of the seed laser and an appropriately sized spot size of the optical end pump.

Optical end pump 101 is preferably a diode end pump. Gain medium 103 has a wedge shaped end surface 103A coated with an anti-reflective coating. Wedge end surface 103A is on the first end of the gain medium 103. Second end surface 101C of the gain medium is flat and coated with a highly transparent (transmissive) coating at a wavelength of 808 nm and the coating is highly reflective at a wavelength of 1064 nm.

Seed laser 111 produces a pulsed output 111A having pulses with a pulse width of approximately 10 picoseconds, plus or minus 5 picoseconds, at a repetition rate of between 10 kHz and 100 MHz and at a wavelength of 1064 nm. The pulses comprise light having a wavelength of 1064 nm. As the pulses come into and through the gain medium 103 they impinge on the second end surface 101C and are reflected by the highly reflective coating thereon.

Referring to FIG. 12, Nd:YVO$_4$ gain mediums 103, 1203 are end pumped 101, 1203 by laser diodes operating at a wavelength of 808 nm. Other pump wavelengths may be used, for instance, the pump central wavelengths may be at 808 nm, 820 nm, 880 nm, 888 nm or 915 nm, +/−10 nm. The pump may be an end pump or one or more side pumps. See FIGS. 1C, 1D and 1E. The pump may be a diode pump light source or other suitable light source. Arrows 102, 1202 indicate the flow of power into the respective gain mediums 103, 1203. Gain mediums 103, 1203 are AR-coated (anti-reflective coated) for the wavelength of 1064 nm on the wedged surfaces 103A, 1203A. Second end surfaces 101C, 1201C of the gain mediums 103, 1203 are HR-coated (highly reflective coated) for wavelengths of 1064 nm and are HT-coated (highly transmissive) at 808 nm on the pump surface. A highly transmissive coating is used for pumping at other wavelengths, namely, 820 nm, 880 nm, 888 nm and 915 nm. This means that surfaces 101C, 1201C reflect the amplified lasers 104, 1204 coming out rotators 105, 1214. A polarized seed laser at the wavelength of 1064 nm passes through polarizer 107, half-lambda wave plate 106, and a rotator 105 to the gain medium 103. Reference numerals 104/104A indicate bidirectional flow of the pulses/lasers at different times. In similar fashion, the laser at the wavelength of 1064 nm passes through polarizer 1213, half-lambda waveplate 1211, and rotator 1214 to the gain medium 1203. Reference numerals 1204/1204A indicate bidirectional flow of the pulses/lasers at different times.

Still referring to FIG. 12, reference numeral 1210 is an isolator and it may be optionally used as polarizer 107 provides a high extinction ratio which effectively isolates and protects the seed laser 111. Similarly, polarizer 1213 provides a high extinction ratio which effectively isolates and protects the first quad pass amplifier from the higher power laser generated by the second quad pass amplifier.

Still referring to FIG. 12, the seed laser (propagating beam) travels four (4) times within gain medium 103. The amplified laser output 104A is separated by the polarizer 107 which shifts the polarization with respect to the polarization of the output pulses of the seed laser 111A. The propagating beam travels four (4) times within gain medium 1203. The amplified laser output 1204A is separated by the polarizer 1213 which shifts the polarization with respect to the polarization of the output pulses of the first quad pass amplifier.

Still referring to FIG. 12, mirrors M22, M23, and M24 direct the propagating beam through half waveplate 1211 and then through polarizer 1213. Thereafter, the propagating beam passes through rotator 1214 whereupon the propagating beam is further amplified by the second quad pass amplifier. Still referring to FIG. 12, the propagating beam travels four (4) times within gain medium 1203 whereupon mirror M25 is used as mirror M1 is used in connection with the first quad pass amplifier. The amplified laser output 1204A is separated by the polarizer 1213 which shifts the polarization with respect to the polarization of the output of the first quad pass amplifier. The amplified laser output of the second quad pass amplifier exits polarizer 1213 and is directed through mirrors M26, M27, 28, M29, M30 and exits the internal amplifier as indicated by reference numeral 1217 as the first amplified output laser. The spacing and positioning of the mirrors adjust the beam size of laser 1217. Alternatively, and/or additionally, a lens 1215 may be used to adjust the cross sectional area and shape of beam 1217.

Figure 13:
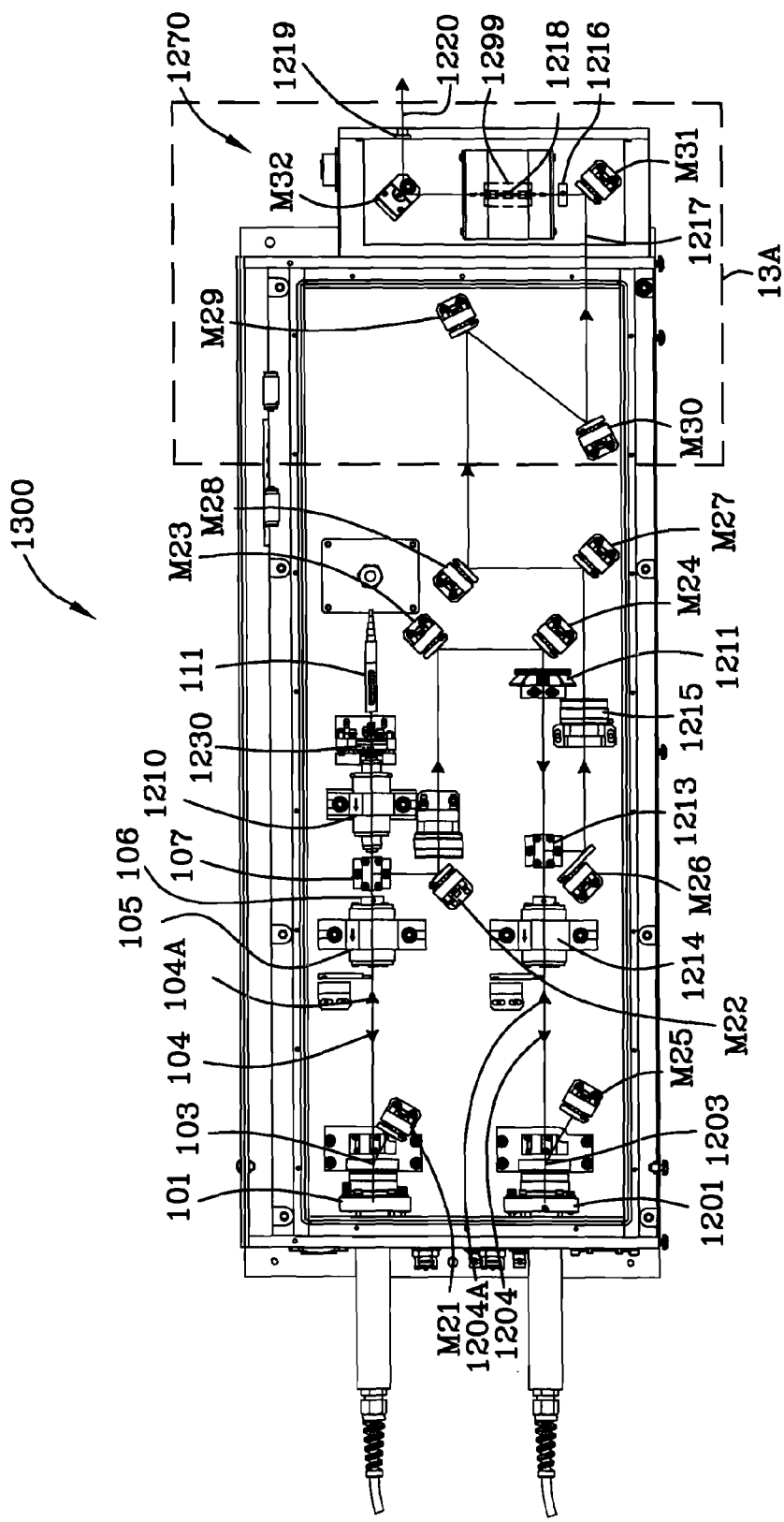
FIG. 13 is a schematic top view illustrating the components used in the schematic of FIGS. 12 and 12A, namely, a first and second quadruple pass gain amplifiers and an external diffusion amplifier.
Figure 14:
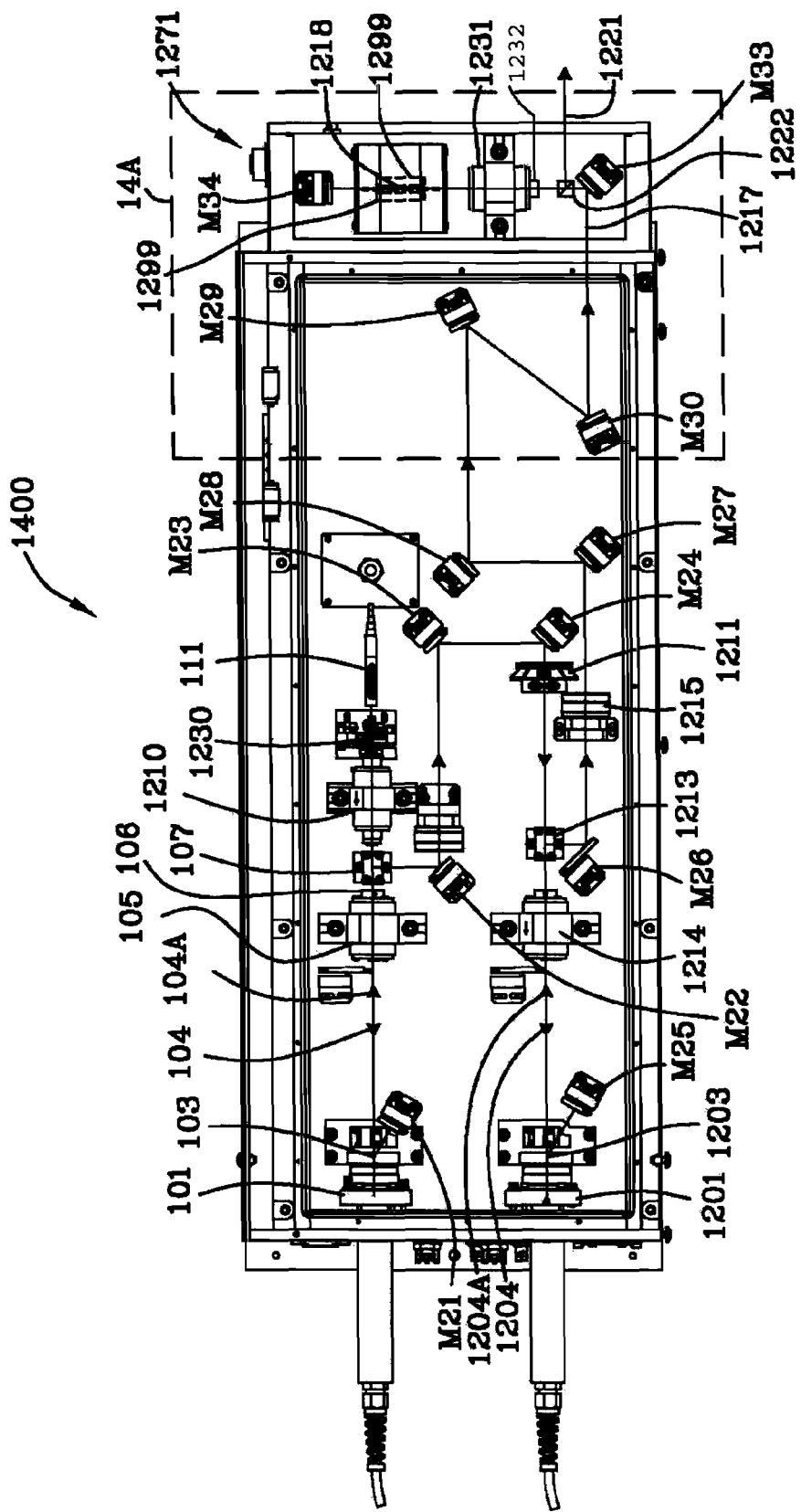
FIG. 14 is a schematic top view illustrating the components of the double pass external diffusion amplifier used in the schematic of FIGS. 12 and 12B.

By internal amplifier it is meant the amplification which occurs due the first and second quadruple pass (quad pass) amplifiers 103, 1203 which are mounted within the main housing as illustrated in FIGS. 13 and 14 by reference numeral 1301.

An external diffusion amplifier further amplifies the master oscillator power amplifier (MOPA) configuration. The master power amplifier (MOPA) includes a seed laser and an amplifier stages which increases the power output of the seed laser (propagating beam) to do useful work. The external diffusion amplifier further amplifies the laser.

Figures 12A, 12B:
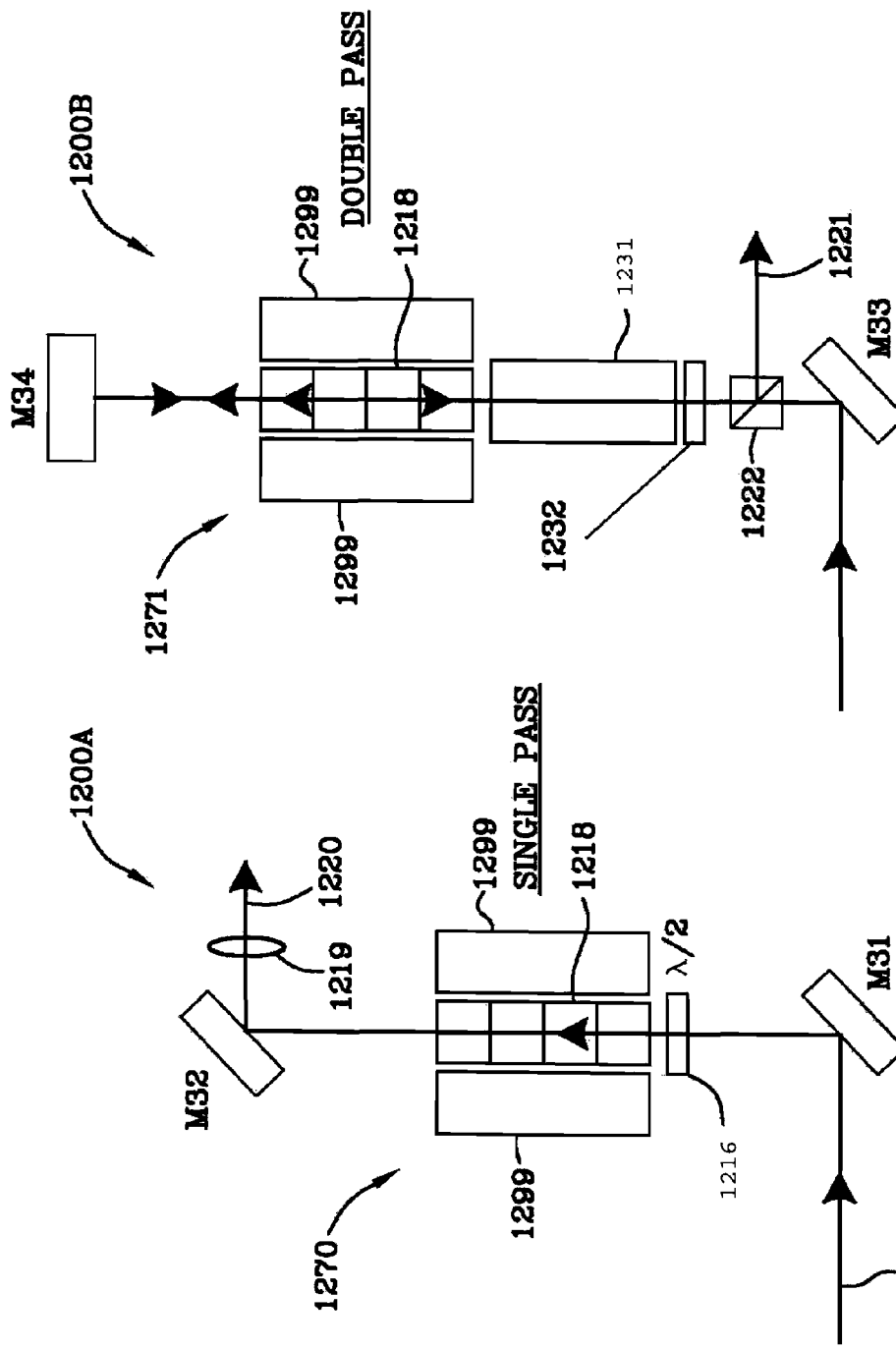
FIG. 12A is an enlarged schematic illustrating the single pass example of the external diffusion amplifier and the optical side pump.
FIG. 12B is an enlarged schematic illustrating the double pass example of the external diffusion amplifier and the optical side pump.
Figure 12D:
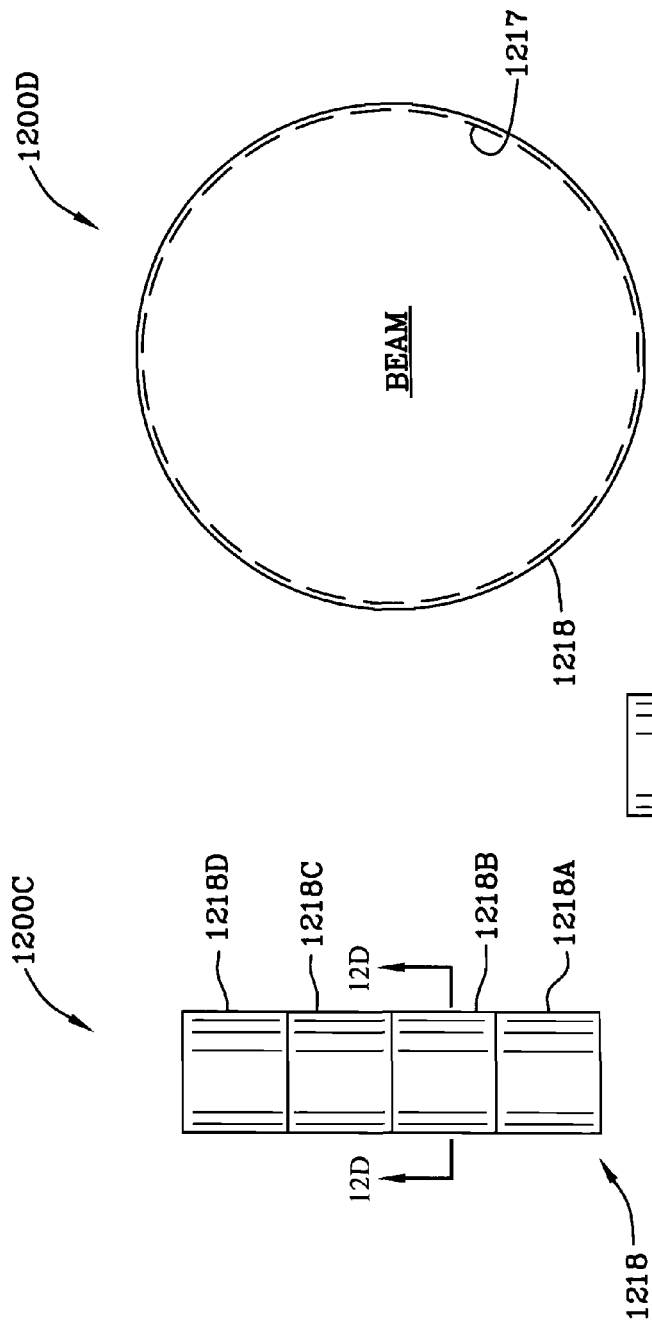
FIG. 12D is an enlarged schematic illustration of a cross section of the gain medium in the shape of a cylindrical rod indicating in dashed lines the spot size of the picosecond laser within the gain medium of the rod.
Figure 12E:
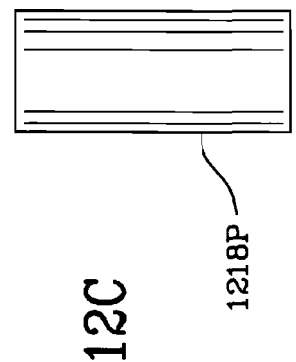
FIG. 12E is an enlarged schematic illustrating a one piece rod (gain medium).
Figure 12C:
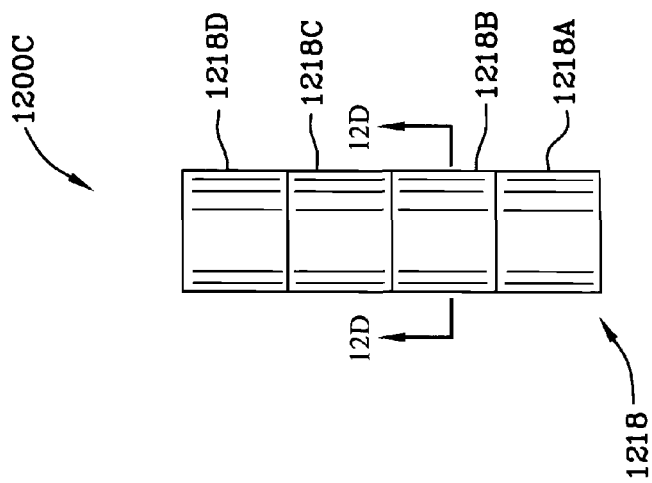
FIG. 12C is an enlarged schematic illustrating the diffusion bonded example of the rod of the external diffusion amplifier.

Referring to FIG. 12C, an enlarged schematic illustrates the diffusion bonded example of the rod 1218 of the external diffusion amplifier 1270, 1271. In the external diffusion amplifier 1270 successive gain mediums 1218A, 1218B, 1218C, 1218D are diffusion bonded together into a rod 1218 and an amplified laser output 1220, 1221 is generated using three optical side pumps 1299 and the propagating beam 1217. Reference is also made to FIG. 12A which is an enlarged schematic 1200A illustrating the single pass example of the external diffusion amplifier 1270 and the optical side pump 1299 as is illustrated in FIGS. 12 and 13. FIGS. 12A and 12B illustrate the diffusion bonded cylindrically shaped gain medium 1218.

The diameter of the beam which was amplified by the internal quad pass amplifiers 103, 1203 is matched, or nearly matched, to the rod diameter 1218 of the external diffusion amplifier 1270, 1271 as illustrated in FIGS. 13 and 14 and others. FIG. 12D is an enlarged schematic 1200D illustration of a cross section of the rod 1218 indicating in dashed lines 1217 the spot size of the beam of the picosecond laser within the gain medium of the rod 1218.

In the instant invention, the first amplified output laser beam 1217 diameter may be increased with enlarging means 1215 to approximate the cross-sectional area of the rod 1218. See FIGS. 12 and 12D. The enlarging means may include a lens 1215. Lens 1215 adjustably enlarges the output beam of the second quadruple pass amplifier of the internal amplifier. Alternatively, the first amplified output laser beam may be expanded by properly positioning the beam with respect to the distance from the polarizer 1213 to the waveplate 1216. The diameter of the gain medium rod 1218, for example, may be in the range of 2-4 mm which has a cross-sectional area of $\pi mm^2$-4 $\pi mm^2$. Various materials including Nd:YVO$_4$, Nd:YAG, Nd:Al$_2$O$_3$ or Yb: YAG can be used for the gain medium 1218 in the external diffusion amplifiers 1270, 1271. Reference numeral 1270 indicates the single pass external diffusion amplifier and reference numeral 1271 indicates the dual pass (double pass) external diffusion amplifier.

The power density in the gain medium rod 1218 of the external diffusion amplifier is extremely low allowing generation of high power and energy with a short pulse laser, without compromising any coatings or any bulk material of the external diffusion amplifier. Further, since the gain of the gain medium rod 1218 is high, the power levels in the internal amplifier can be kept beneath threshold damage limits for the coatings and bulk materials used in the internal amplifier. For instance, the coatings used on the gain mediums 103, 1203 are protected by operation of the internal amplifier beneath threshold damage limits.

The invention allows operation of the laser down to a repetition rate of 100 kHz and 20 W (200 µJ pulses) in the internal amplifier before external diffusion amplification. In other words, the picosecond laser operates at lower power and the gain mediums 103, 1203 that are end pumped 101, 1201 are not thermally stressed at lower power levels thus protecting the coatings on the gain mediums and on other optic components of the quad pass amplifiers of the internal laser amplifier. The protection provided by the external diffusion amplifiers 1270, 1271 protects all of the components upstream starting with the seed laser 111.

Employing means 1215 for expanding 1215 the beam as illustrated in FIG. 12, and positioning the expanding means properly, and by using a half waveplate (λ/2) 1216 to optimize the polarization of the beam to the polarization of the gain medium 1218 of the external diffusion amplifier power transfer to the picosecond pulses is maximized. For example, 20 W average power output from the first amplified output laser 1217 can be taken from the internal amplifier and, in a single pass in the external diffusion amplifier, 50 W of additional average power at a repetition rate of 100 kHz is generated in the external diffusion amplifier with pulse energy of 5000. In other words, with a single pass through the external diffusion amplifier, 70 W average power is attained and output as the second amplified output laser 1220.

Figure 14A:
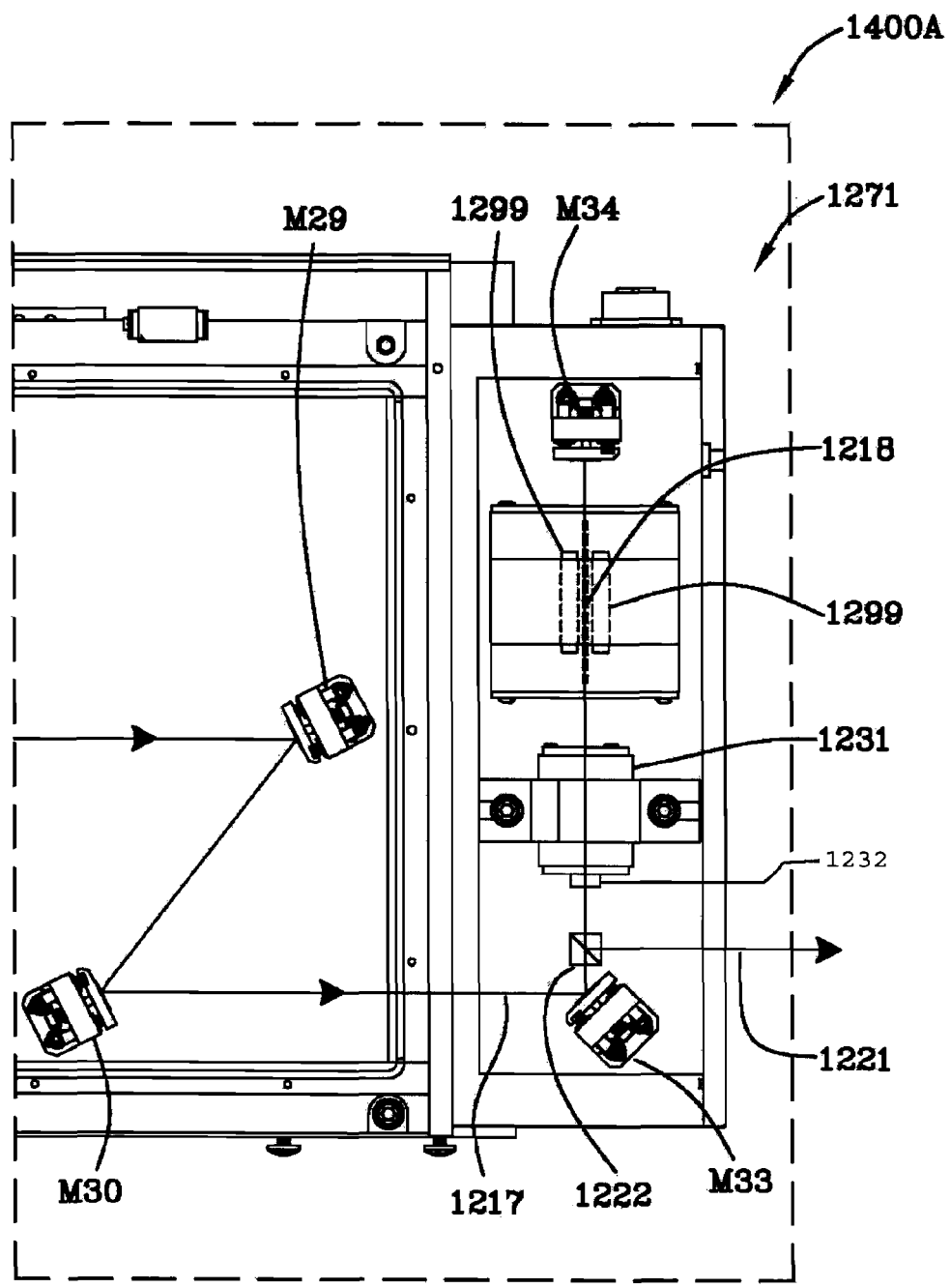
FIG. 14A is enlarged portion of FIG. 14 illustrating the double pass external diffusion amplifier.

By way of example and without limitation, pulse energy of 500 µJ is obtained without concern of over running the seed laser 111 or damaging the optics by relaying small spot sizes with short pulses. The invention further provides double pass external diffusion amplification 1271 as illustrated in FIGS. 12B, 14, and 14A which generates an additional average power of 100 W at a repetition rate of 100 kHz. In other words, with a double pass external diffusion amplifier 1271, 120 W average power is attained. Pulse energies greater than or equal to 1000 uJ can be realized.

Referring to FIGS. 12A and 12B, a four stage 1218A, 1218B, 1218C, 1218D diffusion bonded gain medium rod 1218 with laser diode 1299 side pumps is used in both the single pass external diffusion amplifier 1270 and in the dual pass external diffusion amplifier 1271. Unlike most end pumped mode matched strategies used in the related art, the invention increases the beam size through the gain medium of the external diffusion amplifier 1270, 1271 to generate higher power, especially at low frequency (low repetition rate). This allows higher pulse energies than related art strategies without compromising the coating damage threshold or bulk material threshold.

By incorporating an external side pumped amplifier comprising a diffusion bonded gain medium rod, the cross sectional dimensions of the propagating beam can be adjusted to the rod cross sectional area. The adjustment of the propagating beam 1217 (first amplified output laser) occurs through the use of a lens 1215 and/or through the positioning of the propagating beam 1217 with respect to the gain medium 1218. Expanding the propagating beam 1217 as illustrated in FIG. 12D significantly reduces the power density on the coatings in the internal quad pass amplifiers 103, 1203 and in the external diffusion amplifiers 1270, 1271. Expansion of the propagating beam allows much higher average power and pulse energy capability. For instance, repetition rates of less than 100 kHz and pulse energies greater than or equal to 500P produce average power of 50 W as stated above.

The rods 1218 of the external diffusion amplifier are either single pass 1270 or double pass 1271. The rods of the external diffusion amplifier 1270, 1271 can be constructed of various diameters and lengths to obtain the optimum gain increase and minimize damage through high power generation at low frequency. The rods 1218 can be constructed of both diffusion bonded 1218A, 1218B, 1218C, 1218D or one-piece solid rod material 1218P of a variety of gain mediums Nd:YVO$_4$, Nd:YAG, Nd:Al$_2$O$_3$, or Yb:YAG to obtain very high pulse energy and average power at low frequency without risking bulk material or coating damage and maximizing pulse characteristics throughout the entire system comprising the internal quad pass amplifiers 103, 1203 and the external diffusion amplifiers 1270, 1271.

Figure 13A:
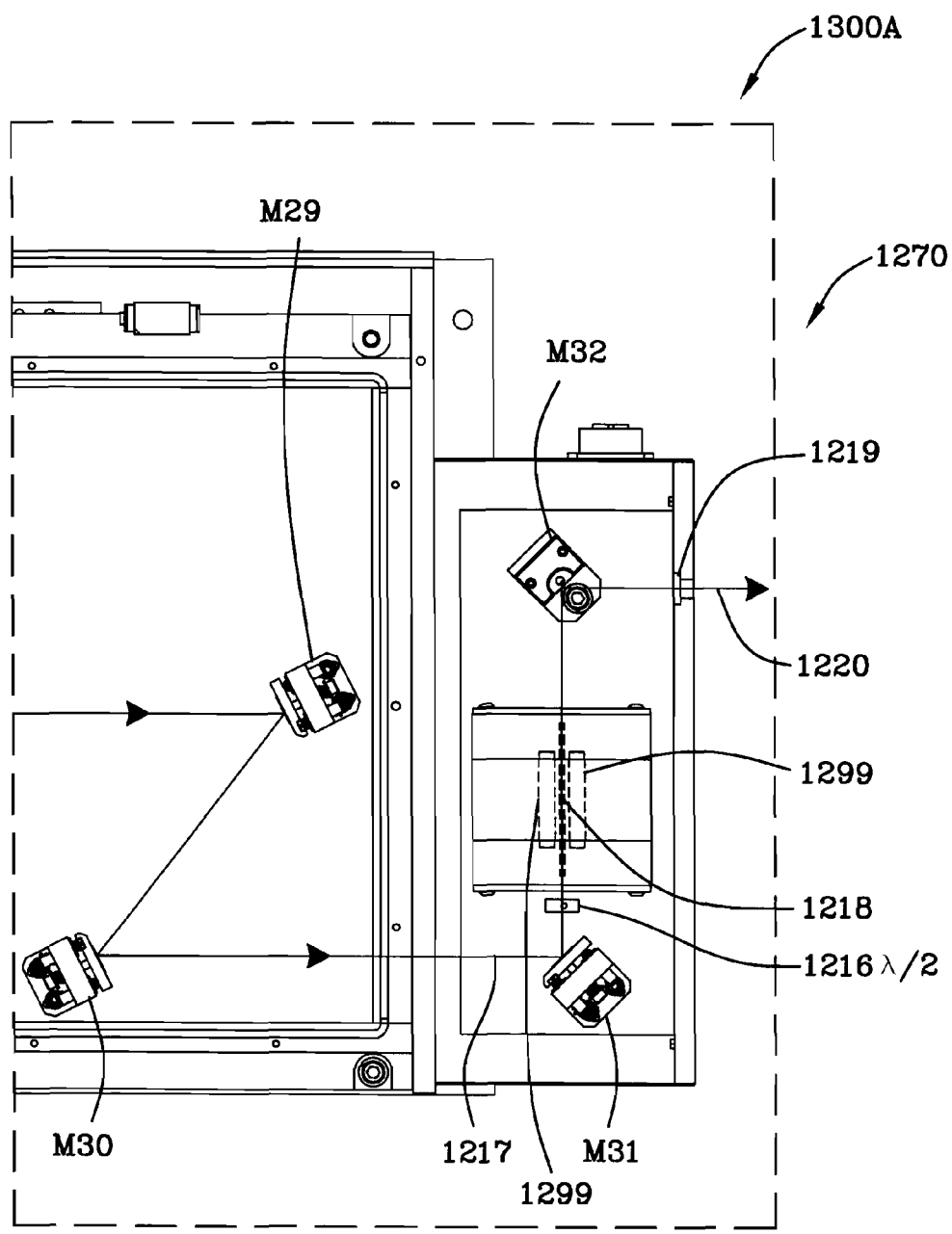
FIG. 13A is an enlarged portion of FIG. 13 illustrating the single pass configuration of the external diffusion amplifier.

A first method of amplification uses a single pass external diffusion amplifier 1270 as illustrated in FIG. 12A. FIG. 13 is a schematic top view 1300 illustrating the components in the schematic of FIGS. 12 and 12A, namely, first and second quadruple pass gain mediums 103, 1203 amplified and a single pass external diffusion amplifier 1270. FIG. 13A is an enlarged portion 1300A of FIG. 13 illustrating the single pass external diffusion amplifier. Propagating beam 1217 (first amplified output laser) is directed by mirror M31 into half waveplate 1216 and the polarization is optimized to the Nd:YAG gain medium 1218. As the propagating beam passes through the gain medium 1218 the picosecond pulses gain energy and average power of the beam transmitted from the external amplifier is increased. The second amplified laser output beam 1220 exits through lens 1219.

The external diffusion amplifier 1270 (and its components) is positioned through the use of mirrors M26-M31 to match the picosecond beam to the cross sectional area of the gain medium chosen from one of the gain mediums Nd:YVO$_4$, Nd:YAG, Nd:Al$_2$O$_3$. By way of example only, Nd:YAG is employed as the gain medium with: dimensions of 2 mm in diameter and 65 mm in length; Nd concentration of 0.6-0.7% at; and, an anti-reflective coating AR1064, available from Northrup Grumman. The anti-reflective coating is understood by those skilled in the art to cover the gain mediums 1218, 1218P illustrated in FIGS. 12C and 12E. The anti-reflective coating permits the picosecond pulses having a pulse width of 10 picoseconds, plus or minus 5 picoseconds, and at a wavelength of 1064 nm to pass through the ends of the cylindrically shaped rod 1218. Alternatively, and/or additionally, a lens 1215 may be used to match the picosecond beam to the cross sectional area of the gain medium. See FIG. 12. The gain medium is preferably in the shape of a cylindrical rod 1218, 1218P. FIG. 12E is an enlarged schematic 1200E illustrating a one piece cylindrically shaped rod (gain medium 1218P). One piece gain mediums 1218P are shorter than diffusion bonded gain mediums 1218 due to manufacturing limitations. Shapes other than a cylindrical rod may be used with reduced efficiency as the incoming propagating beam is generally circularly shaped in cross section. A half waveplate 1216 is positioned between the cylindrically shaped gain medium 1218 of the external diffusion amplifier 1270 and the incoming laser (first amplified output laser) 1217 from the internal quad pass amplifiers 103, 1203. The incoming laser 1217 is from the second quad pass amplifier 1203. The half-wave plate 1216 is rotated to optimize the polarization of the beam to the polarization of the diffusion bonded gain medium 1218 to maximize output. To the extent possible, the polarization of the beam is matched to the polarization of the gain medium 1218. One example of the diffusion bonded gain medium 1218 is a cylindrical-shaped rod having dimensions of 2 mm in diameter by 65 mm in length, and an Nd concentration of 0.6-0.7% at., and, an anti-reflective coating AR1064, available from Northrup Grumman. Other rod diameters, lengths and shapes are specifically contemplated.

Figure 13B:
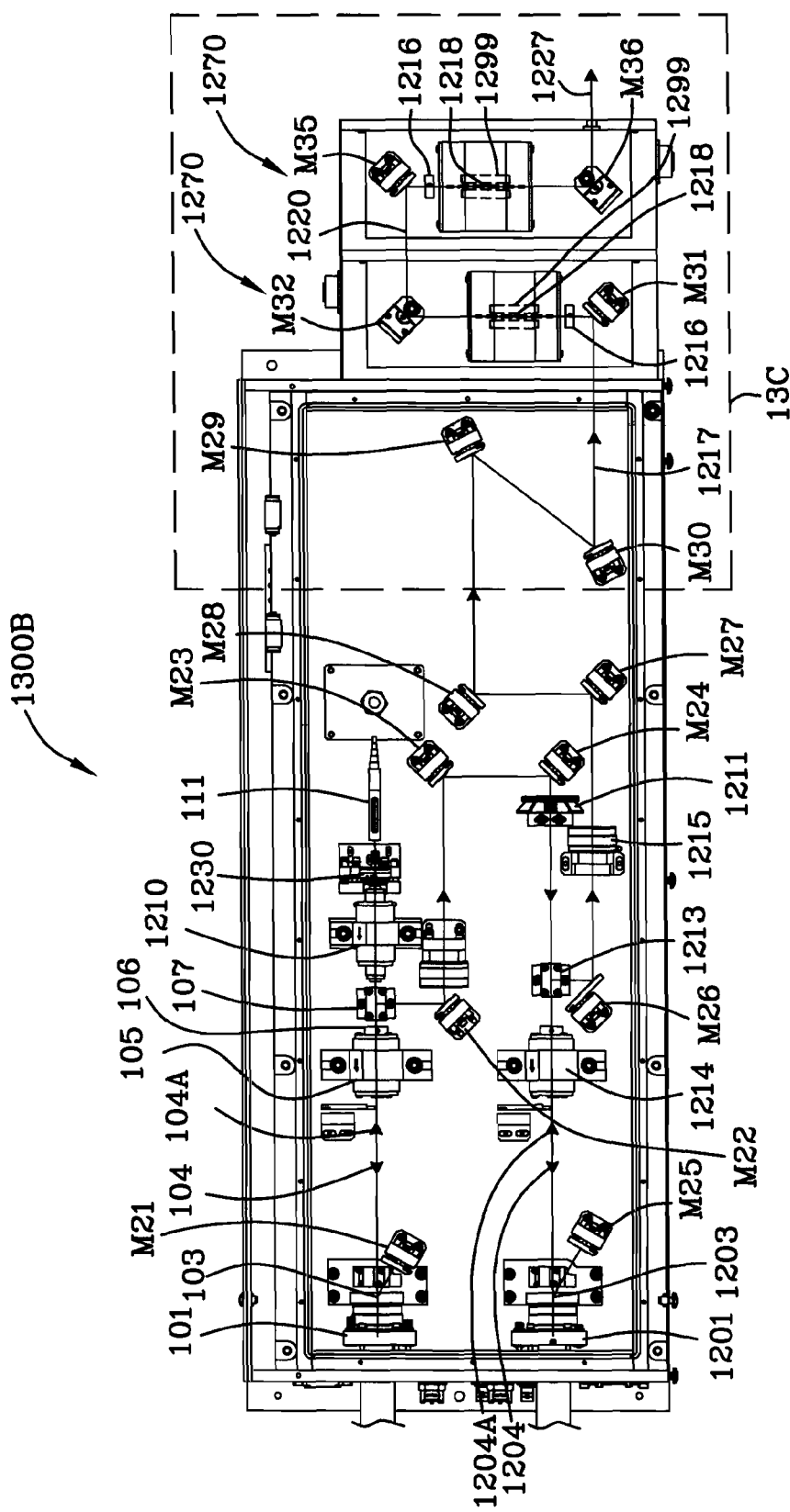
FIG. 13B is a schematic top view similar to FIG. 13 illustrating two single pass external diffusion amplifiers in series.
Figure 13C:
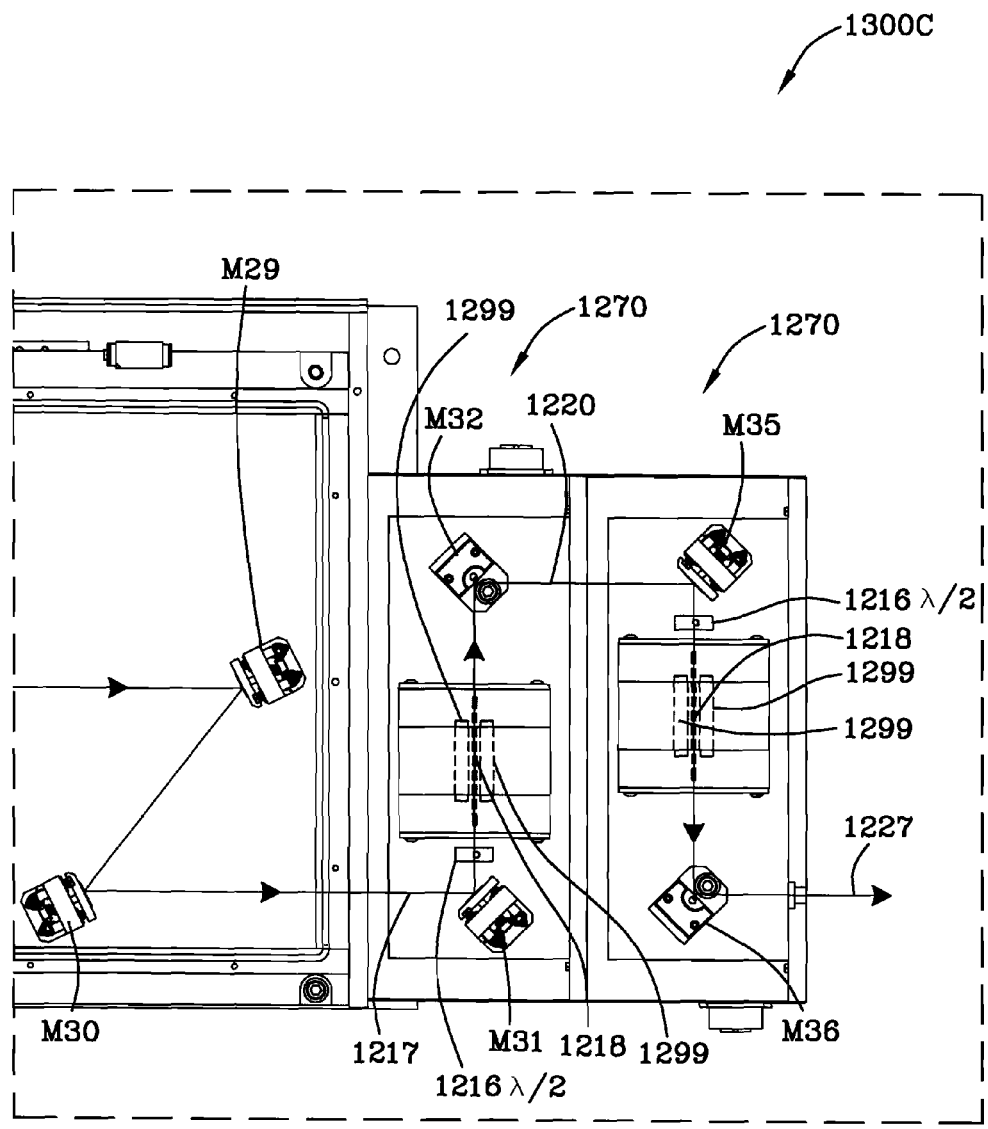
FIG. 13C is an enlarged schematic of a portion of FIG. 13B.

Additionally, the single pass external diffusion amplifiers 1270, 1270 can be arranged in series as illustrated in FIGS. 13B and 13C. FIG. 13B is a schematic top view 1300B similar to FIG. 13 illustrating two single pass external diffusion amplifiers 1270 arranged in series. FIG. 13C is an enlarged schematic 1300C of a portion of FIG. 13B illustrating the first and second external diffusion amplifiers in series. The second amplified output laser beam 1220 is transmitted out of the first single pass external diffusion amplifier 1270 to mirror M35 of the second single pass external diffusion amplifier. The output beam 1220 of the first single pass external diffusion amplifier 1270 is directed using mirror M35 into a second single pass external diffusion amplifier 1270 for further power amplification as illustrated in FIG. 13B. A second half waveplate 1216 is illustrated in FIG. 13B for polarization optimization within the second gain medium 1218 of the second single pass external diffusion amplifier 1270. As the propagating beam 1220 passes through the second gain medium 1218 its energy is further increased and is transmitted out as third amplified output laser beam 1227. More specifically, the energy of the picosecond pulses of the propagating beam are further increased.

A second method of amplification uses a double pass external diffusion amplifier 1271. The external diffusion amplifier 1271 is positioned through the use of mirrors M26-M31 to match the picosecond beam cross sectional area to the cross sectional area of the gain medium which is cylindrically shaped in the form of a rod. Alternatively, and/or additionally, a lens 1215 may be used to match the picosecond beam to the cross sectional area of the gain medium. The gain medium 1218 is chosen from one of the gain mediums Nd:YVO$_4$, Nd:YAG, Nd:Al$_2$O$_3$. The beam is passed twice through the gain medium of the external diffusion amplifier as indicated by the unnumbered arrows pointed in opposite directions in FIG. 12B.

FIG. 14 is a schematic top view 1400 of the double pass external diffusion amplifier 1271 illustrating the components used in the schematic of FIGS. 12 and 12B. FIG. 14A is an enlarged portion 1400A of FIG. 14 illustrating the double pass external diffusion amplifier 1271.

A polarization sensitive beam splitter 1222 is positioned between the half waveplate ($\lambda$/2) 1232 and the incoming laser 1217 (first amplified output laser). A half waveplate ($\lambda$/2) 1232 is positioned between the rotator ($\lambda$/4) 1231 and the incoming propagating beam/laser 1217 (first amplified output laser). Rotator ($\lambda$/4) 1231 rotates the entering propagating beam of polarized light 45° in the forward direction and an additional 45° of non-reciprocal rotation in the reverse direction while maintaining the propagating beam's polarization. The half waveplate ($\lambda$/2) 1232 and the rotator ($\lambda$/4) 1231 create a right circularly polarized beam through the gain medium 1218 of the external diffusion amplifier. A maximum "R" coated reflector M34 resides beyond the gain medium 1218 (i.e., the laser head) of the diffusion amplifier 1271 and reflects a left circularly polarized beam which passes through the gain medium 1218 (i.e., the laser head) of the external diffusion amplifier, the rotator ($\lambda$/4) 1231 and the half waveplate ($\lambda$/2) 1232 where it becomes horizontally polarized. The polarization sensitive beam splitter 1222 transmits the horizontally polarized beam 1221 out of the external diffusion amplifier. See FIG. 12B.

A first amplification structure uses a single pass external diffusion amplifier 1270 wherein the picosecond beam cross-sectional area 1217 is matched, or substantially matched, to the cross-sectional area of the gain medium 1218. The external diffusion amplifier 1271 is positioned through the use of mirrors M26-M31 to match the picosecond beam cross sectional area to the cross sectional area of the gain medium which is cylindrically shaped in the form of a rod. Alternatively, and/or additionally, a lens 1215 may be used to match the cross-sectional area of the picosecond beam to the cross sectional area of the gain medium. The dashed line 1217 indicates the boundaries of the enlarged beam substantially filling the cross sectional area of the cylindrical rod 1218 as illustrated in FIG. 12D. A half waveplate 1216 between the gain medium 1218 and the incoming beam 1217 optimizes the polarization of the beam 1217 to that of the gain medium for passage through the gain medium 1218.

Three optical side pumps 1299 are used in the external diffusion amplifiers 1270, 1271 and they are preferably laser diodes. Any type of optical side pumps may be used including lamps. Side pump central wavelengths may be at 808 nm, 820 nm, 880 nm, 888 nm or 915 nm, +/−10 nm and the optical side pumps may be in the configuration of a 3 bar array. Different power levels may be supplied by the pumps are required by the external diffusion amplifier. Use of pumps other than optical pumps is contemplated by the instant invention disclosed herein.

A second amplification structure uses a double pass external diffusion amplifier 1271 wherein the beam 1271 cross-sectional area is matched to the cross-sectional area of the gain medium and passed twice therethrough as illustrated in FIG. 12B. FIG. 12B is an enlarged 1200B schematic illustrating the double pass example of the external diffusion amplifier 1271 and the optical side pumps 1299. A half waveplate 1232 and rotator ($\lambda$/4) 1231 create a right circularly polarized beam through the gain medium during the first pass therethrough and a maximum "R" coated reflector M34 resides beyond the gain medium 1218 of the external diffusion amplifier 1271 and reflects a left circularly polarized beam back through the gain medium 1218 on the second pass therethrough. The left circularly polarized beam passes through the rotator ($\lambda$/4) 1231 and the half waveplate 1232 where it becomes horizontally polarized and is then transmitted out of the amplification structure by the polarization sensitive beam splitter 1222 as the third amplified output laser 1221.

Gain medium 1218 may be a diffusion bonded gain medium formed in segments diffusion bonded together. Diffusion bonding gain medium segments of, for example, Nd.YAG or Nd:YVO$_4$ in the form of cylindrical rods which enables power transfer to each of the segments 1218A, 1218B, 1218C, 1218D from the side pumps. The diffusion bonded gain segments are longer in length than the one piece rod 1218P and, hence, more energy is transferred to the pulses resulting in high gain and high average power output. In other words, energy is transmitted to the picosecond pulses in each segment as they pass from segment to segment which enables efficient and substantial energy transfer to the pulses which, in turn, raises the average power of the picosecond pulse laser. Substantial gain is achieved as the pulses travel through the diffusion bonded gain medium segments.

REFERENCE NUMERALS

100—schematic of quadruple pass amplifier
100A—schematic of dual pass amplifier
100B—schematic perspective view of the example of FIG. 1

27

100C—schematic perspective of optical side pump arrangement
100D—schematic view another example of a laser including an optically side pumped Nd:YVO$_4$ gain medium.
100E—schematic view of another example of a laser including an optically side pumped Nd:YVO$_4$ gain medium.
101, 1201—808 nm, 820 nm, 880 nm, 888 nm, 915 nm, +/−10 nm end pump
101C, 1201C—coated end surface of the crystal, coating is highly transparent to 808 nm pumping from end pump 101, coating is highly reflective at the 1064 nm incoming seed signal embedded within the picosecond pulses
102, 1202—arrow indicating direction of 808 nm, 820 nm, 880 nm, 888 nm, 915 nm end pump
103, 1203—Nd:YVO$_4$ crystal, gain medium
103A, 1203A—planar wedge surface of crystal, coated with anti-reflective coating
103B, 103C, 103D, 103E—intensity variation of pump within gain medium
103R—Nd:YVO$_4$ crystal, gain medium
104—arrow indicating direction of seed laser input
104A—arrow indicating direction of amplified output signal from the crystal 103 into rotator 105
105, 1214, 1231 ($\lambda$/4)-rotator
106, 112, 1211, 1216, 1232—$\lambda$/2 waveplate
107, 1213, 1222—polarizer with high extinction ratio
108—output of polarizer in the direction of $\lambda$/2 wave plate 112
109—arrow indicating direction of seed laser
110, 1215, 1219—lens
111—seed laser
111A—lens output
111B—position after rotator 105 in regard to the seed laser input 111A to crystal 103, position before rotator 105 in regard to the amplified output signal from the quadruple pass amplifier
111E—first exterior path of laser
111I—first interior path of laser within gain medium 103
111B—first exterior path of laser
113—arrow indicating output of amplified laser signal
114—mirror reflecting amplified signal back to quad pass amplifier for further amplification
115E—second exterior path of laser
115I—second interior path of laser within gain medium 103
199—optical side pump, 808 nm, 820 nm, 880 nm, 888 nm, 915 nm, +/−10 nm
199A—optical side pump, 808 nm, 820 nm, 880 nm, 888 nm, 915 nm, +/−10 nm
199B—optical side pump, 808 nm, 820 nm, 880 nm, 888 nm, 915 nm, +/−10 nm
199C—optical side pump, 808 nm, 820 nm, 880 nm, 888 nm, 915 nm, +/−10 nm
199C—optical side pump, 808 nm, 820 nm, 880 nm, 888 nm, 915 nm, +/−10 nm
199D—optical side pump, 808 nm, 820 nm, 880 nm, 888 nm, 915 nm, +/−10 nm
199E-199C—optical side pump, 808 nm, 820 nm, 880 nm, 888 nm, 915 nm, +/−10 nm
200—quad pass preamplifier in combination with a dual pass power amplifier
201—second 808 nm pump for energizing second Nd:YVO$_4$ crystal, gain medium
203—second Nd:YVO$_4$ crystal, gain medium
214—mirror M3
215—signal from gain medium 203 to mirror M3, reference numeral 214,
216—signal between mirror 214 and mirror 217

28

217—mirror M4
218—path of laser signal toward isolator 219
219, 1210, 1212—isolator
221—second mirror for directing light to dual pass amplifier
222—lens
223—path of amplified laser signal to dual pass amplifier
224—arrow indicating direction of amplified laser signal to dual pass amplifier
300—graph of low seed powers (1-25 mW) and amplified power in Watts
301—dual pass amplified power
302—quad pass amplified power
400—graph 400 indicating power amplification of various mW average seed power input signals for the dual pass schematic of FIG. 1A.
500—schematic diagram of the gain medium 103
500A—endview of the gain medium 103
500B—end view of the circular, in cross-section, gain medium
501—entrance location of incoming pulses to the gain medium
502—exit location of pulses from the gain medium
503—circular in cross-section gain medium
505C—centerline of gain medium 103
505P, 505X—perpendicular lines with respect to the wedge surface 103A
520E—arrow indicating first end of the gain medium 103
530S—arrow indicating second end of the gain medium 103
599—radial extent of pump spot size in gain medium
600—graph of wedge angle $\theta$1 vs. incident angle $\theta$2, and, graph of wedge angle $\theta$1 vs. reflective angle $\theta$3
601—plot of graph of wedge angle $\theta$1 vs. incident angle $\theta$2
602—plot of wedge angle $\theta$1 vs. reflective angle $\theta$3
700—graph of distance between mirror M1 to centerline as a function of wedge angle $\theta$1, 702; graph of separation distance of input beam from output beam as a function of wedge angle $\theta$1, 701; graph of separation of incidental angle $\theta$2 minus refraction angle $\theta$5 as a function of wedge angle $\theta$1, 703;
701—plot of separation distance on the first end surface 103A of input beam from output beam as a function of wedge angle $\theta$1
702—plot of distance between mirror M1 to the seed laser incoming 111E as a function of wedge angle $\theta$1
800—quad pass amplifier design using M1, a mirror 806, and M2, a mirror 807, and a gain medium 805
801—first pass, approximately 64 mm in length
802—second pass, approximately 161 mm in length
803—third pass, approximately 161 mm in length
804—fourth pass, approximately 64 mm in length
805—gain medium, Nd:YVO$_4$
806—mirror, M1
807—mirror, M2
810—start of first pass in gain medium
900—pulse train/signal of the seed input having wavelength of 1064 nm, pulse width 10 ps, repetition rate of 100 kHz, average power around 1 mW
900A—schematic of end pumped gain medium 903
901—seed input
902—808 nm pump
903—gain medium, Nd:YVO$_4$
903B, 903C, 903D, 903E—intensity variation of pump within gain medium
904—second end surface coated with highly transparent coating at both 808 nm and 1064 nm
920E—first end of the gain medium
930—arrow indicating laser output

29

930S—second end of the gain medium
1000—schematic of the seed input having wavelength of 1064 nm, pulse width 10 ps, repetition rate of 100 kHz, average power around 1 mW
1000A—schematic of end pumped segmented medium illustrating a diffusion bonded gain medium, Nd:YVO$_4$, comprising three segments with the dopant concentration of Nd in atomic weight percent, at., for each segment, the power absorbed, P$_{abs}$, for each segment; the power transmitted P$_T$, for each segment; the segment gain, G; and, the absorption coefficient, a, for each segment
1000B—table for three segment gain medium, Nd:YVO$_4$, illustrating dopant concentration, length, the absorption coefficient, a, and the power absorbed, P$_{abs}$, along with the equation for the power absorbed
1001—seed input having wavelength of 1064 nm, pulse width 10 ps, repetition rate of 100 kHz, average power around 1 mW
1002—808 nm pump
1003—gain medium, Nd:YVO$_4$
1004—arrow indicating laser output of gain medium 1003
1005—second end surface of the second end of gain medium 1003 having coating highly transparent (transmissive) to 808 nm and 1064 nm wavelengths
1006—first end surface of gain medium 1003 having anti-reflective coating highly transparent (transmissive) to 808 nm and 1064 wavelengths
1010—first segment 2 mm in length, Nd concentration 0.05% at. Pabs=10.4 W, Gain=10.9 dB, Pt=29.6 W, α=0.15
1011—second segment 1 mm in length, Nd concentration 0.13% at. Pabs=9.6 W, Gain=8.2, Pt=20.1 W, α=0.30
1012—third segment 12 mm in length, Nd concentration 0.25% at. Pabs=20.1 W, Gain=10.8, Pt=0.1 W, α=0.75
1020F—arrow indicating the first end of gain medium 1003
1030S—arrow indicating the second end of gain medium 1003
1100—schematic diagram of segmented gain medium for use in connection with seed input signal
1110—first segment 2 mm in length, Nd concentration 0.05% at. Pabs=10.4 W, Gain=10.9 dB, Pt=29.6 W, α=0.15
1111—second segment 1 mm in length, Nd concentration 0.13% at. Pabs=9.6 W, Gain=8.2 dB, Pt=20.1 W, α=0.30
1112—third segment 12 mm in length, Nd concentration 0.25% at. Pabs=20.1 W, Gain=10.8 dB, Pt=0 W, α=0.75
1200—schematic illustrating a first amplifier having a quadruple pass (quad pass) Nd:YVO$_4$ gain medium coupled with a second amplifier having a quadruple pass (quad pass) Nd:YVO$_4$ gain medium, the first amplifier includes an optical end pump and the second amplifier includes an optical end pump, and, a number of mirrors and/or a lens for adjusting the cross-sectional area of the first amplified output laser
1200A—is an enlarged schematic illustrating the single pass example of the external diffusion amplifier and the optical side pump
1200B—is an enlarged schematic illustrating the double pass example of the external diffusion amplifier and the optical side pump
1200C—is an enlarged schematic illustrating the diffusion bonded example of the rod of the external diffusion amplifier
1200D—is an enlarged schematic illustration of a cross section of the rod indicating in dashed lines the spot size of the picosecond laser within the gain medium of the rod
1200E—is an enlarged schematic illustrating a one piece Vanadate rod (gain medium)

30

1217—first amplified output laser, arrow indicating picosecond laser output entering the external diffusion amplifier
1218—circularly shaped rod bonded or single segment gain medium in the form of a circular rod made of Nd:YVO$_4$, Nd:YAG, Nd:Al$_2$O$_3$, or Yb:YAG
1218A, 1218B, 1218C, 1218D—segments of diffusion bonded Nd:YVO$_4$, Nd:YAG, Nd:Al$_2$O$_3$, or Yb:YAG
1218P—single rod made from Nd:YVO$_4$, Nd:YAG, Nd:Al$_2$O$_3$, or Yb:YAG
1220—second amplified output laser, output from single pass configuration of external diffusion amplifier
1221—third amplified output laser, output from double pass configuration of external diffusion amplifier
1222—beam splitter
1227—output of the second external diffusion amplifier in series
1230—fiber port
1270—single pass external diffusion amplifier
1271—dual pass external diffusion amplifier
1299—side pumps, laser diode pumps or lamp pumps
1300—is a schematic top view illustrating the devices used in the schematic of FIGS. 12 and 12A, namely, a first and second quadruple pass gain stage and an external diffusion amplifier
1300A—is an enlarged portion of FIG. 13 illustrating the single pass configuration of the external diffusion amplifier
1300B—is a schematic top view similar to FIG. 13 illustrating two single pass external diffusion amplifiers
1300C—is an enlarged schematic of a portion of FIG. 13B
1400A—schematic top view illustrating the devices used in the schematic of FIGS. 12 and 12B
1400B—enlarged portion of FIG. 14 illustrating the double pass configuration of the external diffusion amplifier
M1-M4, M21-M36—mirrors
θ1—wedge angle
θ2—incident angle (up to 15°) for the first pass of the seed laser along path 111E; refractive angle for the fourth pass of seed laser along path 111E;
θ2'—refractive angle for the first pass of the seed laser along path 111I; incident angle for the fourth pass of the seed laser along path 111I in the quad pass example
θ3—internal reflective angle (0.78°) which impinges on surface 101C, highly reflective at 1064 nm;
θ4—incident angle for the second pass of the seed laser along path 115I; refractive angle for the third pass along path 115I in the quad pass example
θ5—refractive angle for the second pass of the seed laser along path 115E; incident angle for the third pass of the seed laser along path 115E in the quad pass $$P\text{abs}=P\text{input}(1-e^{-\alpha L})$$

$$P\text{input}=P\text{pump}-(\Sigma P\text{abs})$$

$$\text{Gain} = 10\left(\log_{10}\frac{P\text{out}}{P\text{in}}\right)\text{dB}$$

The invention has been set forth by way of example. Those skilled in the art will recognize that changes may be made to the examples without departing from the spirit and the scope of the appended claims.

The invention claimed is:
1. A laser amplifier, comprising:
an internal amplifier includes a first amplified output laser, said first amplified output laser includes a beam having a cross-sectional area;

a half waveplate aligned with said beam of said first amplified output laser;

an external diffusion amplifier, said external diffusion amplifier includes a diffusion bonded gain medium, said diffusion bonded gain medium has a polarization, and, said diffusion bonded gain medium has a cross-sectional area;

said external diffusion amplifier aligned with said half waveplate, said beam of said first amplified output laser aligned with said diffusion bonded gain medium of said external diffusion amplifier;

said diffusion bonded gain medium of said external diffusion amplifier being side pumped;

an adjustable lens for expanding said beam of said first amplified output laser;

said beam of said first amplified output laser passes into and through said lens expanding said beam, said expanded beam of said first amplified output laser passes into and through said half waveplate;

said adjustable lens matching said cross-sectional area of said beam of said first amplified output laser to said cross-sectional area of said diffusion bonded gain medium; and, said half waveplate optimizes the polarization of said beam to said polarization of said diffusion bonded gain medium; and, said first amplified output laser being further amplified by said external diffusion amplifier and exits as a second amplified laser output.

2. A laser amplifier as claimed in claim 1 wherein said diffusion bonded gain medium is a diffusion bonded is Nd:YVO$_4$.

3. A laser amplifier as claimed in claim 1 wherein said diffusion bonded gain medium is a diffusion bonded Nd:YAG.

4. A laser amplifier as claimed in claim 1 wherein said diffusion bonded gain medium is a diffusion bonded Nd:Al$_2$O$_3$.

5. A laser amplifier as claimed in claim 1 wherein said side pump is a laser diode.

6. A laser amplifier as claimed in claim 1 wherein said side pump is a lamp.

7. A laser amplifier, comprising:

an internal amplifier includes a first amplified output laser, said first amplified output laser includes a beam having a cross-sectional area;

a half waveplate aligned with said beam of said first amplified output laser;

an external diffusion amplifier, said external diffusion amplifier includes a gain medium, said gain medium has a polarization, and, said gain medium has a cross-sectional area;

said external diffusion amplifier aligned with said half waveplate, said beam of said first amplified output laser aligned with said gain medium of said external diffusion amplifier;

said gain medium of said external diffusion amplifier being side pumped;

an adjustable lens for expanding said beam of said first amplified output laser;

said beam of said first amplified output laser passes into and through said lens expanding said beam, said expanded beam of said first amplified output laser passes into and through said half waveplate;

said adjustable lens matching said cross-sectional area of said beam of said first amplified output laser to said cross-sectional area of said gain medium; and, said half waveplate optimizes the polarization of said beam to said polarization of said gain medium; and, said first amplified output laser being further amplified by said external diffusion amplifier and exits as a second amplified laser output.

8. A laser amplifier as claimed in claim 7 wherein said gain medium is Nd:YVO$_4$.

9. A laser amplifier as claimed in claim 7 wherein said gain medium is Nd:YAG.

10. A laser amplifier as claimed in claim 7 wherein said gain medium is Nd:Al$_2$O$_3$.

11. A laser amplifier as claimed in claim 7 wherein said side pump is a laser diode.

12. A laser as claimed in claim 7 wherein said side pump is a lamp.

13. A laser amplifier, comprising:

an internal amplifier includes a first amplified output laser, said first amplified output laser includes a beam having a cross-sectional area;

an adjustable lens for expanding said beam of said first amplified output laser;

a polarization sensitive beam splitter, said polarization beam splitter in alignment with said expanded beam of said first amplified output laser;

a half waveplate resides after said polarization sensitive beam splitter and is aligned with said expanded beam of said first amplified output laser;

a rotator, said rotator resides after said half waveplate, and, said rotator is in alignment with said expanded beam of said first amplified output laser and with said half waveplate;

an external double pass diffusion amplifier, said external double pass diffusion amplifier includes a diffusion bonded gain medium, and, said diffusion bonded gain medium has a cross-sectional area;

said diffusion bonded gain medium of said external diffusion amplifier aligned with said half waveplate and said rotator;

said diffusion bonded gain medium of said double pass external diffusion amplifier aligned with said expanded beam of said first amplified output laser;

said adjustable lens matching said cross-sectional area of said beam of said first amplified output laser to said cross-sectional area of said diffusion bonded gain medium;

a mirror after said double pass external diffusion amplifier, said mirror aligned with said double pass external diffusion amplifier;

said diffusion bonded gain medium of said external diffusion amplifier being side pumped;

said half waveplate and said rotator generate a right circularly polarized beam output which is passed through said diffusion bonded gain medium of said double pass external diffusion amplifier exiting therefrom as a second amplified output laser;

said right circularly polarized beam is reflected by said mirror as a left circularly polarized beam which then passes through said diffusion bonded gain medium of said double pass external diffusion amplifier a second time where it is amplified again and where it becomes horizontally polarized by passing through said rotator and half waveplate exiting therefrom as a third amplified output laser; and, said polarization sensitive beam splitter transmitting said horizontally polarized third amplified output laser beam out of said laser amplifier.

14. A laser amplifier as claimed in claim 13 wherein said diffusion bonded gain medium is Nd:YVO$_4$.

15. A laser amplifier as claimed in claim 13 wherein said diffusion bonded gain medium is Nd:YAG.

16. A laser amplifier as claimed in claim 13 wherein said diffusion bonded gain medium is Nd:Al$_2$O$_3$.

17. A laser amplifier as claimed in claim 13 wherein said side pump is a laser diode.

18. A laser amplifier as claimed in claim 13 wherein said side pump is a lamp.

19. A laser amplifier, comprising:
   an internal amplifier includes a first amplified output laser, said first amplified output laser includes a beam having a cross-sectional area;
   an adjustable lens for expanding said beam of said first amplified output laser;
   a polarization sensitive beam splitter, said polarization beam splitter in alignment with said expanded beam of said first amplified output laser;
   a half waveplate resides after said polarization sensitive beam splitter;
   said half waveplate aligned with said expanded beam of said first amplified output laser and, said half waveplate aligned with said polarization sensitive beam splitter;
   a rotator, said rotator resides after said half waveplate, and, said rotator is in alignment with said half wave plate and said expanded beam of said first amplified output laser;
   an external double pass diffusion amplifier, said external double pass diffusion amplifier includes a gain medium, and, said gain medium has a cross-sectional area;
   said gain medium of said external diffusion amplifier aligned with said rotator and said waveplate;
   said gain medium of said double pass external diffusion amplifier aligned with said expanded beam of said first amplified output laser;
   said adjustable lens matching said cross-sectional area of said expanded beam of said first amplified output laser to said cross-sectional area of said gain medium;
   a mirror after said double pass external diffusion amplifier, said mirror aligned with said double pass external diffusion amplifier;
   said gain medium of said external diffusion amplifier being side pumped;
   said rotator and said half waveplate generates a right circularly polarized beam output which is passed through said gain medium of said double pass external diffusion amplifier exiting therefrom as a second amplified output laser;
   said right circularly polarized beam is reflected by said mirror as a left circularly polarized beam which then passes through said gain medium of said double pass external diffusion amplifier a second time where it is amplified again and where it becomes horizontally polarized by passing through said rotator and said half waveplate exiting therefrom as a third amplified output laser; and,
   said polarization sensitive beam splitter transmitting said horizontally polarized third amplified output laser beam out of said laser amplifier.

20. A laser amplifier as claimed in claim 19 wherein said gain medium is Nd:YVO$_4$.

21. A laser amplifier as claimed in claim 19 wherein said gain medium is Nd:YAG.

22. A laser amplifier as claimed in claim 19 wherein said gain medium is Nd:Al$_2$O$_3$.

23. A laser amplifier as claimed in claim 19 wherein said side pump is a laser diode.

24. A laser as claimed in claim 19 wherein said side pump is a lamp.

25. A laser amplifier, comprising:
   means for producing a first amplified output laser, said first amplified output laser includes a beam having a cross-sectional area;
   adjustable means for expanding said beam;
   a half waveplate aligned with said expanded beam of said first amplified output laser;
   an external diffusion amplifier, said external diffusion amplifier includes a gain medium, said gain medium has a cross-sectional area;
   said external diffusion amplifier aligned with said half waveplate, said expanded beam of said first amplified output laser aligned with said gain medium of said external diffusion amplifier;
   said gain medium of said external diffusion amplifier being side pumped;
   said expanded beam of said first amplified output laser passes into and through said half waveplate;
   said adjustable means expanding said beam to match said cross-sectional area of said beam of said first amplified output laser to said cross-sectional area of said gain medium; and,
   said first amplified output laser being further amplified by said external diffusion amplifier and exits as a second amplified laser output.

26. A method of amplifying a laser, said laser includes a beam, comprising the steps of:
   adjustably expanding said beam of said laser, said beam of said laser includes a cross-sectional area;
   positioning a first single pass external diffusion amplifier in alignment with said beam of said laser, said first single pass external diffusion amplifier includes a first diffusion bonded gain medium, said first diffusion bonded gain medium includes a first polarization, and, said first diffusion bonded gain medium has a cross-sectional area;
   positioning a half waveplate between said first single pass external diffusion amplifier and said laser such that said laser passes into and through said half waveplate and into and through said first diffusion bonded gain medium of said first single pass external diffusion amplifier;
   adjustably expanding said beam of said laser enlarging said cross-sectional area of said beam of said laser to match said cross-sectional area of said first diffusion bonded gain medium;
   adjusting said half waveplate to optimize the polarization of said beam of said laser to said first polarization of said diffusion bonded gain medium;
   side pumping, optically, said first diffusion bonded gain medium of said first single pass external diffusion amplifier; and,
   generating, using said first single pass external diffusion amplifier, an amplified laser output.

27. A method of amplifying a laser, said laser includes a beam, as claimed in claim 26, further comprising the steps of:
   positioning a second single pass external diffusion amplifier in alignment with said beam of said laser, said second single pass external diffusion amplifier includes a second diffusion bonded gain medium, said second diffusion bonded gain medium includes a second polarization, and, said second diffusion bonded gain medium has a cross-sectional area;
   positioning a half waveplate between said second single pass external diffusion amplifier and said laser such that said laser passes into and through said half waveplate and into and through said second diffusion bonded gain medium of said second single pass external diffusion amplifier;

adjusting said half waveplate to optimize the polarization of said beam of said laser to said second polarization of said second diffusion bonded gain medium;

side pumping, optically, said first diffusion bonded gain medium of said first single pass external diffusion amplifier; and, generating, using said second single pass external diffusion amplifier, a second amplified laser output.

28. A method of amplifying a laser, said laser includes a beam, as claimed in claim 26 wherein said diffusion bonded gain medium is Nd:YVO$_4$.

29. A method of amplifying a laser, said laser includes a beam, as claimed in claim 26 wherein said diffusion bonded gain medium is Nd:YAG.

30. A method of amplifying a laser, said laser includes a beam, as claimed in claim 27 wherein said diffusion bonded gain medium is Nd:YVO$_4$.

31. A method of amplifying a laser, said laser includes a beam, as claimed in claim 27 wherein said diffusion bonded gain medium is Nd:YAG.

32. A method of amplifying a laser, said laser includes a beam, as claimed in claim 26 wherein said diffusion bonded gain medium is Nd:Al$_2$O$_3$.

33. A method of amplifying a laser, said laser includes a beam, as claimed in claim 27 wherein said diffusion bonded gain medium is Nd:Al$_2$O$_3$.

34. A method of amplifying a laser, said laser includes a beam, as claimed in claim 26 wherein said side pumping is performed with laser diodes.

35. A method of amplifying a laser, said laser includes a beam, as claimed in claim 26 wherein said side pumping is performed with lamps.

36. A method of amplifying a laser, said laser includes a beam, as claimed in claim 27 wherein said side pumping is performed with laser diodes.

37. A method of amplifying a laser, said laser includes a beam, as claimed in claim 27 wherein said side pumping is performed with lamps.

38. A method of amplifying a laser, said laser includes a beam, comprising the steps of:

positioning a polarization sensitive beam splitter in alignment with said beam of said laser;

positioning a half waveplate after said polarization sensitive beam splitter in alignment with said beam of said laser;

positioning a rotator after said half wave plate in alignment with said beam of said laser;

positioning a double pass external diffusion amplifier in alignment with said beam of laser, said double pass external diffusion amplifier includes a diffusion bonded gain medium, said diffusion bonded gain medium has a cross-sectional area;

positioning a mirror after said double pass external diffusion amplifier in alignment with said beam of said laser, said mirror being coated with maximum reflective coating R;

side pumping, optically, said gain medium of said double pass external diffusion amplifier; and, adjustably expanding said beam of said laser enlarging said cross-sectional area of said beam of said laser to match said cross-sectional area of said diffusion bonded gain medium;

generating, using said double pass external diffusion amplifier, a right circularly polarized laser beam from said half waveplate and said rotator passing through said gain medium of said external diffusion amplifier and being reflected by said mirror as a left circularly polarized laser beam passing through said gain medium a second time and entering said half waveplate converting said laser beam into a horizontally polarized laser beam by said half waveplate, and said polarization sensitive beam splitter transmitting said horizontally polarized laser beam out of said external diffusion amplifier as a third amplified output laser.

39. A method of amplifying a laser as claimed in claim 38 wherein said diffusion bonded gain medium is Nd:YVO$_4$.

40. A method of amplifying a laser as claimed in claim 38 wherein said diffusion bonded gain medium is Nd:YAG.

41. A method of amplifying a laser as claimed in claim 38 wherein said diffusion bonded gain medium is Nd:Al$_2$O$_3$.

42. A method of amplifying a laser as claimed in claim 38 wherein said side pumping is performed with laser diodes.

43. A method of amplifying a laser as claimed in claim 38 wherein said side pumping is performed with lamps.

44. A laser amplifier as claimed in claim 25 wherein said adjustable means for expanding said beam is mirrors to match the picosecond beam cross sectional area to the cross sectional area of the gain medium which is cylindrically shaped in the form of a rod.

45. A laser amplifier as claimed in claim 25 wherein said adjustable means is a lens.

46. A laser amplifier, comprising:

an internal amplifier includes a first amplified output laser, said first amplified output laser includes a beam having a cross-sectional area;

an external double pass diffusion amplifier, said external double pass diffusion amplifier includes a gain medium, and, said gain medium has a cross-sectional area;

adjustable means to expand and substantially match said cross sectional area of said beam to said cross sectional area of said gain medium, said cross sectional area of said gain medium is substantially circularly shaped;

a polarization sensitive beam splitter, said polarization beam splitter in alignment with said expanded beam of said first amplified output laser;

a half waveplate resides after said polarization sensitive beam splitter;

said half waveplate aligned with said expanded beam of said first amplified output laser and, said half waveplate aligned with said polarization sensitive beam splitter;

a rotator, said rotator resides after said half waveplate, and, said rotator is in alignment with said half waveplate and said expanded beam of said first amplified output laser;

said gain medium of said external diffusion amplifier aligned with said rotator and said half waveplate;

said gain medium of said double pass external diffusion amplifier aligned with said expanded beam of said first amplified output laser;

a mirror after said double pass external diffusion amplifier, said mirror aligned with said gain medium of said double pass external diffusion amplifier;

said gain medium of said external diffusion amplifier being side pumped;

said rotator and said half waveplate generate a right circularly polarized beam output which is passed through said gain medium of said double pass external diffusion amplifier exiting therefrom as a second amplified output laser;

said right circularly polarized beam is reflected by said mirror as a left circularly polarized beam which then passes through said gain medium of said double pass external diffusion amplifier a second time where it is amplified again and where it becomes horizontally polarized by passing through said rotator and said half waveplate exiting therefrom as a third amplified output laser; and, said polarization sensitive beam splitter transmitting said horizontally polarized third amplified output laser beam out of said laser amplifier.

47. A laser amplifier as claimed in claim 46 wherein said adjustable means for expanding said beam includes mirrors to match the picosecond beam cross sectional area to the cross sectional area of the gain medium which is cylindrically shaped in the form of a rod.

48. A laser amplifier as claimed in claim 46 wherein said adjustable means is a lens.

\* \* \* \* \*